United States Patent
Ogura et al.

(10) Patent No.: US 7,154,620 B1
(45) Date of Patent: Dec. 26, 2006

(54) IMAGE FORMING DEVICE MANAGEMENT SYSTEM AND METHOD

(75) Inventors: Masaaki Ogura, Kanagawa (JP); Kiyoshi Ugajin, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 974 days.

(21) Appl. No.: 09/658,566

(22) Filed: Sep. 8, 2000

(30) Foreign Application Priority Data

Sep. 9, 1999 (JP) .................................. 11-255789
Sep. 1, 2000 (JP) ............................. 2000-266103

(51) Int. Cl.
*G06F 15/00* (2006.01)
*G06K 1/00* (2006.01)

(52) U.S. Cl. ...................... 358/1.15; 358/1.1; 358/1.9; 399/8; 399/10

(58) Field of Classification Search ............... 358/1.15, 358/1.1, 1.9, 1.16, 1.14; 355/204, 200, 202; 364/403; 399/8, 10; 705/28
See application file for complete search history.

(56) References Cited

U.S. PATENT DOCUMENTS

| | | | | |
|---|---|---|---|---|
| 5,216,461 A | | 6/1993 | Maekawa et al. ........... | 355/202 |
| 5,270,775 A | * | 12/1993 | Suzuki ........................... | 399/8 |
| 5,347,346 A | * | 9/1994 | Shimizu et al. ................ | 399/8 |
| 5,543,892 A | * | 8/1996 | Hirata et al. .................... | 399/8 |
| 5,631,724 A | | 5/1997 | Sawada et al. .............. | 355/205 |

FOREIGN PATENT DOCUMENTS

JP  7-311524  11/1995

OTHER PUBLICATIONS

U.S. Appl. No. 09/206,295, filed Dec. 7, 1998, Pending.
U.S. Appl. No. 09/314,939, filed May 20, 1999, Pending.
U.S. Appl. No. 09/603,917, filed Jun. 26, 2000, Pending.
U.S. Appl. No. 09/771,883, filed Jan. 30, 2001, Pending.
U.S. Appl. No. 09/874,994, filed Jun. 7, 2001, Pending.
U.S. Appl. No. 09/658,566, filed Sep. 8, 2000, Pending.
U.S. Appl. No. 10/141,875, filed May 10, 2002, Pending.
U.S. Appl. No. 09/658,566, filed Sep. 8, 2000, Ogura et al.
U.S. Appl. No. 10/668,007, filed Sep. 23, 2003, Ogura.

* cited by examiner

Primary Examiner—Gabriel Garcia
Assistant Examiner—Thierry L. Pham
(74) Attorney, Agent, or Firm—Oblon, Spivak, McClelland, Maier & Neustadt, P.C.

(57) ABSTRACT

In image forming device management system and method of the present invention, a data communication device transmits, on an early message date that is earlier than a normal message date for a corresponding one of a plurality of image forming devices, a usage data of the corresponding one of the image forming devices to a center management device via a telephone network by using a call sent by the data communication device. The center management device receives, on the early message date for the corresponding one of the image forming devices, the usage data of the corresponding one of the image forming devices that is transmitted by the data communication device, by using the call sent by the data communication device. The center management device issues a billing of a usage charge of the corresponding one of the image forming devices based on the usage data received by the center management device.

10 Claims, 47 Drawing Sheets

FIG. 19

MAIN DATA FILE

| SEQ | CUSTOMER NAME | MACHINE TYPE | MACHINE ID | DATA TYPE | RECEPTN TIME | ORDER TIME | STATUS | PERSON | COLOR DATA | ELAPSED TIME | CUSTOMER DATA | SERVICE CO. | OTHER |
|---|---|---|---|---|---|---|---|---|---|---|---|---|---|
| 511 | FFF | FFF | FF01 | 200 | 11:50 | 11:50 | ORDER | X | R | 3:00 | | A | |
| 512 | EEE | EEE | EE01 | 500 | 12:10 | 12:10 | ORDER | Y | B | 0:30 | MAJOR CO. | B | |
| 513 | DDD | DDD | DD01 | 300 | 12:33 | 12:33 | ORDER | Z | G | 0:30 | | A | |
| 514 | CCC | CCC | CC01 | 100 | 12:48 | | IN PROCESS | Y | G | 0:10 | LAWYER | C | |
| 515 | BBB | BBB | BB01 | 200 | 12:50 | | IN PROCESS | X | G | 0:05 | | A | |
| 516 | AAA | AAA | AA01 | 100 | 13:00 | | | | G | 0:00 | | D | |
| 517 | | | | | | | | | | | | | |
| 518 | | | | | | | | | | | | | |
| 519 | | | | | | | | | | | | | |

FIG. 20

CUSTOMER DATA FILE

| SEQ | CUSTOMER NAME | PHONE NO. | FAX NO. | ADDRESS | DEPT. | PERSON | DELIVERY DATE | MACHINE TYPE | MACHINE ID | SERVICE CO. | PHONE NO. | FAX | OTHER |
|---|---|---|---|---|---|---|---|---|---|---|---|---|---|
| 001 | AAA | 03-1234-5678 | 03-1234-5679 | SHINBASHI | IMPORT | AAA | 96/1/10 | AAAA | AA01 | ABC | 03-5234-5678 | 03-5234-5679 | URGENT |
| 002 | BBB | 03-2234-5678 | 03-2234-5679 | SHINBASHI | IMPORT | BBB | 97/1/10 | BBBB | BB01 | ABC | 03-5234-5678 | 03-5234-5679 | |
| 003 | CCC | 03-3234-5678 | 03-3234-5679 | SHINBASHI | IMPORT | CCC | 97/1/22 | AAAA | AA02 | ABC | 03-5234-5678 | 03-5234-5679 | POOR RELATN |
| 004 | DDD | 03-4234-5678 | 03-4234-5679 | SHINBASHI | IMPORT | DDD | 96/10/10 | CCCC | CC01 | DEF | 03-9234-5678 | 03-9234-5679 | URGENT |
| 005 | EEE | 03-7234-5678 | 03-7234-5679 | SHINBASHI | IMPORT | EEE | 96/9/10 | AAAA | AA03 | DEF | 03-9234-5678 | 03-9234-5679 | |
| 006 | FFF | 03-6234-5678 | 03-6234-5679 | SHINBASHI | IMPORT | FFF | 97/1/10 | DDDD | DD01 | ABC | 03-5234-5678 | 03-5234-5679 | GOOD RELATN |
| 007 | | | | | | | | | | | | | |
| 008 | | | | | | | | | | | | | |
| 009 | | | | | | | | | | | | | |

FIG.21

MACHINE DATA FILE

| SEQ | MACHINE TYPE | MACHINE ID | DELIVERY DATE | MACHINE COMPOSITN | ERROR RECORD | REPAIR RECORD | MACHINE RECORD | DESIGN DATA | OTHER |
|---|---|---|---|---|---|---|---|---|---|
| 001 | AAAA | AA01 | 96/1/10 | 112340 | 97/10/1 F/R JAM. | 97/102 SENSOR | TL:12300,JAM:20 | | |
| 002 | BBBB | BB01 | 97/1/10 | 120000 | | | TL:12400,JAM:40 | 97/5/1 DESIGN CHANGE | |
| 003 | AAAA | AA02 | 97/1/22 | 112000 | | | TL:33300,JAM:10 | | |
| 004 | CCCC | CC01 | 96/10/10 | 120000 | | | TL:1240,JAM:20 | | |
| 005 | AAAA | AA03 | 96/9/10 | 112340 | 97/10/1 SC200 | 97/10/2 F/R | TL:22300,JAM:40 | | |
| 006 | DDDD | DD01 | 97/1/10 | 100000 | | | TL:1230,JAM:5 | 97/9/1 DESIGN CHANGE | |
| 007 | | | | | | | | | |
| 008 | | | | | | | | | |
| 009 | | | | | | | | | |

FIG. 22

DETAILED MACHINE DATA FILE

| SEQ | MACHINE TYPE | MACHINE ID | RECEPTN DATE | ITEM | ORIGINAL DATE | MACHINE RECORD (COUNTER) | MACHINE RECORD (DESIGN) | OTHER |
|---|---|---|---|---|---|---|---|---|
| 001 | AAAA | AA01 | 96/1/10 10:20 | F/R JAM | 96/1/10 10:10 | TL:12300,JAM:20 | F/TEMP;180,D/CURR;10 | ROMVer1.02 |
| 002 | BBBB | AA03 | 97/1/10 20:10 | SC200 | 97/1/10 20:00 | TL:12400,JAM:40 | F/TEMP;182,D/CURR;11 | ROMVer1.04 |
| 003 | CCCC | CC01 | 97/9/22 01:10 | JAM ALM | 97/9/21 09:10 | TL:33300,JAM:10 | F/TEMP;178,D/CURR;9 | ROMVer1.12 |
| 004 | DDDD | DD01 | 96/9/25 15:20 | SC400 | 96/9/25 15:10 | TL:1240,JAM:20 | F/TEMP;185,D/CURR;15 | ROMVer2.02 |
| 005 | | | | | | | | |
| 006 | | | | | | | | |
| 007 | | | | | | | | |
| 008 | | | | | | | | |
| 009 | | | | | | | | |

FIG.24

MENU

| SQ No | CUSTOMER NAME | MACHINE TYPE | DATA TYPE | RECEPTN TIME | ORDER TIME | STATUS |
|---|---|---|---|---|---|---|
| 516 | AAA | AAAA | 100 | 13:00 | | |
| 515 | BBB | BBBB | 200 | 12:50 | | IN PROCESS (X) |
| 514 | CCC | CCCC | 100 | 12:48 | | IN PROCESS (Y) |
| 513 | DDD | BBBB | 300 | 12:30 | 12:33 | ORDER (Z) |
| 512 | EEE | AAAA | 500 | 12:10 | 12:15 | ORDER (Y) |
| 511 | FFF | BBBB | 200 | 11:50 | 11:52 | ORDER (X) |

FIG.25

| SQ No | CUSTOMER NAME | MACHINE TYPE | DATA TYPE | RECEPTN TIME | ORDER TIME | STATUS |
|---|---|---|---|---|---|---|
| 516 | AAA | AAAA | 100 | 13:00 | | |
| 515 | BBB | BBBB | 200 | 12:50 | | IN PROCESS (X) |
| 514 | CCC | CCCC | 100 | 12:48 | | IN PROCESS (Y) |
| 513 | DDD | BBBB | 300 | 12:30 | 12:33 | ORDER (Z) |
| 512 | EEE | | | | 12:35 | ORDER (Y) |
| 511 | FFF | | | | 11:52 | ORDER (X) |

S.N.515 IS NOW IN PROCESS AND CANNOT BE SELECTED. [OK]

WHEN DESIGNATED

FIG.26

| SQ No | CUSTOMER NAME | MACHINE TYPE | DATA TYPE | RECEPTN TIME | ORDER TIME | STATUS |
|---|---|---|---|---|---|---|
| 516 | AAA | AAAA | 100 | 13:00 | | |
| 515 | BBB | BBBB | 200 | 12:50 | | IN PROCESS (X) |
| 514 | CCC | CCCC | 100 | 12:48 | | IN PROCESS (Y) |
| 513 | DDD | BBBB | 300 | 12:30 | 12:33 | ORDER (Z) |
| 512 | EEE | | | | 12:15 | ORDER (Y) ← WHEN DESIGNATED |
| 511 | FFF | | | | 11:52 | ORDER (X) |

THIS ITEM WAS ORDERED

[OK] [RUN]

[MENU]

FIG.29

| No. | ITEMS | SETTINGS | REMARKS |
|---|---|---|---|
| 1 | MACHINE TYPE AND ID | EEE-EE01 | |
| 2 | TOTAL COPY COUNT1 | 123456 | |
| 3 | TOTAL COPY COUNT2 | 1500 | |
| 4 | TOTAL COPY COUNT3 | 3000 | |
| 5 | TOTAL COPY COUNTn | 1000 | |
| 6 | TOTAL COPY COUNT1(PRIOR MONTH) | 110456 | |
| 7 | TOTAL COPY COUNT2(PRIOR MONTH) | 1000 | |
| 8 | TOTAL COPY COUNT3(PRIOR MONTH) | 2000 | |
| 9 | TOTAL COPY COUNTn(PRIOR MONTH) | 800 | |
| 10 | TOTAL COPY COUNT1(AVERAGE) | 13000 | |
| 11 | TOTAL COPY COUNT2(AVERAGE) | 500 | |
| 12 | TOTAL COPY COUNT3(AVERAGE) | 1000 | |
| 13 | TOTAL COPY COUNTn(AVERAGE) | 200 | |

FIG.30

| No. | MACHINE TYPE | MACHINE ID | MONTHLY DEADLINE DATE | NORMAL MESSAGE DATE | CALL BY DCD |
|---|---|---|---|---|---|
| 1 | FFF | FF01 | 5 | 4 | YES |
| 2 | EEE | EE01 | 15 | 14 | YES |
| 3 | DDD | DD01 | 15 | 14 | YES |
| 4 | CCC | CC01 | 5 | 4 | YES |
| 5 | BBB | BB01 | 20 | 19 | YES |
| 6 | AAA | AA01 | 15 | 14 | YES |
| : | : | : | : | : | : |
| n | AAA | AA02 | 15 | 14 | NO |

FIG.31

| No. | MACHINE TYPE | MACHINE ID | MONTHLY DEADLINE DATE | NORMAL MESSAGE DATE | CALL BY DCD |
|---|---|---|---|---|---|
| 1 | EEE | EE01 | 15 | 14 | YES |
| 2 | DDD | DD01 | 15 | 14 | YES |
| 3 | BBB | BB01 | 20 | 19 | YES |
| 4 | AAA | AA01 | 15 | 14 | YES |
| : | : | : | : | : | : |
| n | AAA | AA02 | 15 | 14 | NO |

FIG.32

| No. | MACHINE TYPE | MACHINE ID | MONTHLY DEADLINE | DATE OF RECEPTN | TAG | TIME OF RECEPTN | STATE | CALL BY DCD | NO. OF CALLS | USAGE DATA1 | USAGE DATA2 | USAGE DATA3 | USAGE DATAn |
|---|---|---|---|---|---|---|---|---|---|---|---|---|---|
| 1 | EEE | EE01 | 15 | 6 | SET | | NO ERROR | YES | 1 | 123456 | 1500 | 3000 | 1000 |
| 2 | DDD | DD01 | 15 | 6 | SET | | NO ERROR | YES | 1 | 120056 | 5000 | 6500 | 2000 |
| 3 | BBB | BB01 | 20 | | SET | | | | | | | | |
| 4 | AAA | AA01 | 15 | | SET | | | | | | | | |
| ‥ | ‥ | ‥ | ‥ | | SET | | | | | | | | |
| n | AAA | AA02 | 15 | | SET | | NO ACK | NO | 2 | | | | |

FIG.33A

CENTER-SYSTEM HOLIDAYS IN AUGUST

| SUN | MON | TU | WED | THU | FRI | SAT |
|---|---|---|---|---|---|---|
|  |  |  |  |  |  | 1 |
| 2 | 3 | 4 | 5 | 6 | 7 | 8 |
| 9 | 10 | 11 | 12 | 13 | 14 | 15 |
| 16 | 17 | 18 | 19 | 20 | 21 | 22 |
| 23 | 24 | 25 | 26 | 27 | 28 | 29 |
| 30 | 31 |  |  |  |  |  |

FIG.33B

CUSTOMER HOLIDAYS IN AUGUST

| SUN | MON | TU | WED | THU | FRI | SAT |
|---|---|---|---|---|---|---|
|  |  |  |  |  |  | 1 |
| 2 | 3 | 4 | 5 | 6 | 7 | 8 |
| 9 | 10 | 11 | 12 | 13 | 14 | 15 |
| 16 | 17 | 18 | 19 | 20 | 21 | 22 |
| 23 | 24 | 25 | 26 | 27 | 28 | 29 |
| 30 | 31 |  |  |  |  |  |

FIG.36A

CALL MANAGEMENT TABLE

| ITEM | CONTENTS |
|---|---|
| CALL DESTINATION | 03-1234-4567 |
| MAX NO.OF CALLS | 10 |
| CALLING INTERVAL (SEC) | 65 |
| NO. OF CALL EVENTS | 6 |

FIG.36B

ERROR LOG

| ERROR NAME | ERROR CODE |
|---|---|
| NO ACK | 0-23 |
| BUSY STATE | 0-24 |
| : | : |

FIG.37

| SYN | SOH | SN | STX | ID CODE | MESSAGE CODE | TEXT DATA | ETX | LRC |
|---|---|---|---|---|---|---|---|---|

FIG.38

INTERNAL CLOCK DATA

| YEAR | MONTH | DAY | HOUR | MINUTE |
|---|---|---|---|---|
| 2000 | 08 | 10 | 08 | 30 |

FIG. 39

| PARAMETER NAME | NO. OF DIGITS | REMARKS |
|---|---|---|
| SC/MC CALL DESTINATION | 20 | |
| CALLING INTERVAL (SEC) | 3 | |
| MAX NO. OF CALLS | 2 | |
| ALARM CALL DESTINATION | 20 | |
| CALLING INTERVAL (SEC) | 3 | |
| MAX NO. OF CALLS | 2 | |
| SUPPLY CALL DESTINATION | 20 | |
| CALLING INTERVAL (SEC) | 3 | |
| MAX NO. OF CALLS | 2 | |
| USAGE-DATA CALL DESTINATION | 20 | |
| CALLING INTERVAL (SEC) | 3 | |
| MAX NO. OF CALLS | 2 | |
| DEVICE-CODE-0 CONVERT TABLE | 17 | |
| DEVICE-CODE-1 CONVERT TABLE | 17 | |
| DEVICE-CODE-2 CONVERT TABLE | 17 | |
| DEVICE-CODE-3 CONVERT TABLE | 17 | |
| DEVICE-CODE-4 CONVERT TABLE | 17 | |
| DEVICE-CODE-0 DEADLINE DATE | 2 | DAY 01-31 |
| DEVICE-CODE-1 DEADLINE DATE | 2 | DAY 01-31 |
| DEVICE-CODE-2 DEADLINE DATE | 2 | DAY 01-31 |
| DEVICE-CODE-3 DEADLINE DATE | 2 | DAY 01-31 |
| DEVICE-CODE-4 DEADLINE DATE | 2 | DAY 01-31 |
| DEVICE-CODE-0 EARLY M DATE1 | 4 | MONTH/DAY 0101-1231 |
| DEVICE-CODE-0 EARLY M DATE2 | 4 | MONTH/DAY 0101-1231 |
| DEVICE-CODE-0 EARLY M DATE3 | 4 | MONTH/DAY 0101-1231 |
| DEVICE-CODE-1 EARLY M DATE1 | 4 | MONTH/DAY 0101-1231 |
| DEVICE-CODE-1 EARLY M DATE2 | 4 | MONTH/DAY 0101-1231 |
| DEVICE-CODE-1 EARLY M DATE3 | 4 | MONTH/DAY 0101-1231 |
| DEVICE-CODE-2 EARLY M DATE1 | 4 | MONTH/DAY 0101-1231 |
| DEVICE-CODE-2 EARLY M DATE2 | 4 | MONTH/DAY 0101-1231 |
| DEVICE-CODE-2 EARLY M DATE3 | 4 | MONTH/DAY 0101-1231 |
| DEVICE-CODE-3 EARLY M DATE1 | 4 | MONTH/DAY 0101-1231 |
| DEVICE-CODE-3 EARLY M DATE2 | 4 | MONTH/DAY 0101-1231 |
| DEVICE-CODE-3 EARLY M DATE3 | 4 | MONTH/DAY 0101-1231 |
| DEVICE-CODE-4 EARLY M DATE1 | 4 | MONTH/DAY 0101-1231 |
| DEVICE-CODE-4 EARLY M DATE2 | 4 | MONTH/DAY 0101-1231 |
| DEVICE-CODE-4 EARLY M DATE3 | 4 | MONTH/DAY 0101-1231 |
| ALARM CALL TIME | 4 | 0000-2359 |
| USAGE-DATA CALL TIME | 4 | 0000-2359 |
| USAGE-DATA RECEPTION TIME | 4 | 0000-2359 |
| EXCHANGE TYPE | 1 | 1:10PPS,2:20PPS,OTHERS:PB |

FIG. 40

| PARAMETER NAME | NO. OF DIGITS | REMARKS |
|---|---|---|
| SC/MC CALL DESTINATION | 20 | |
| CALLING INTERVAL (SEC) | 3 | |
| MAX NO. OF CALLS | 2 | |
| ALARM CALL DESTINATION | 20 | |
| CALLING INTERVAL (SEC) | 3 | |
| MAX NO. OF CALLS | 2 | |
| SUPPLY CALL DESTINATION | 20 | |
| CALLING INTERVAL (SEC) | 3 | |
| MAX NO. OF CALLS | 2 | |
| USAGE-DATA CALL DESTINATION | 20 | |
| CALLING INTERVAL (SEC) | 3 | |
| MAX NO. OF CALLS | 2 | |
| DEVICE-CODE-0 CONVERT TABLE | 17 | |
| DEVICE-CODE-1 CONVERT TABLE | 17 | |
| DEVICE-CODE-2 CONVERT TABLE | 17 | |
| DEVICE-CODE-3 CONVERT TABLE | 17 | |
| DEVICE-CODE-4 CONVERT TABLE | 17 | |
| DEVICE-CODE-0 DEADLINE DATE | 2 | DAY 01-31 |
| DEVICE-CODE-1 DEADLINE DATE | 2 | DAY 01-31 |
| DEVICE-CODE-2 DEADLINE DATE | 2 | DAY 01-31 |
| DEVICE-CODE-3 DEADLINE DATE | 2 | DAY 01-31 |
| DEVICE-CODE-4 DEADLINE DATE | 2 | DAY 01-31 |
| DEVICE-CODE-0 EARLY M DATE1 | 4 | MONTH/DAY 0101-1231 NO USE:0000 |
| DEVICE-CODE-0 EARLY M DATE2 | 4 | MONTH/DAY 0101-1231 NO USE:0000 |
| DEVICE-CODE-0 EARLY M DATE3 | 4 | MONTH/DAY 0101-1231 NO USE:0000 |
| DEVICE-CODE-1 EARLY M DATE1 | 4 | MONTH/DAY 0101-1231 NO USE:0000 |
| DEVICE-CODE-1 EARLY M DATE2 | 4 | MONTH/DAY 0101-1231 NO USE:0000 |
| DEVICE-CODE-1 EARLY M DATE3 | 4 | MONTH/DAY 0101-1231 NO USE:0000 |
| DEVICE-CODE-2 EARLY M DATE1 | 4 | MONTH/DAY 0101-1231 NO USE:0000 |
| DEVICE-CODE-2 EARLY M DATE2 | 4 | MONTH/DAY 0101-1231 NO USE:0000 |
| DEVICE-CODE-2 EARLY M DATE3 | 4 | MONTH/DAY 0101-1231 NO USE:0000 |
| DEVICE-CODE-3 EARLY M DATE1 | 4 | MONTH/DAY 0101-1231 NO USE:0000 |
| DEVICE-CODE-3 EARLY M DATE2 | 4 | MONTH/DAY 0101-1231 NO USE:0000 |
| DEVICE-CODE-3 EARLY M DATE3 | 4 | MONTH/DAY 0101-1231 NO USE:0000 |
| DEVICE-CODE-4 EARLY M DATE1 | 4 | MONTH/DAY 0101-1231 NO USE:0000 |
| DEVICE-CODE-4 EARLY M DATE2 | 4 | MONTH/DAY 0101-1231 NO USE:0000 |
| DEVICE-CODE-4 EARLY M DATE3 | 4 | MONTH/DAY 0101-1231 NO USE:0000 |
| ALARM CALL TIME | 4 | 0000-2359 |
| USAGE-DATA CALL TIME | 4 | 0000-2359 |
| USAGE-DATA RECEPTION TIME | 4 | 0000-2359 |
| EXCHANGE TYPE | 1 | 1:10PPS,2:20PPS,OTHERS:PB |

FIG.43

CUSTOMER HOLIDAY DATA

| MACHINE TYPE/ID | 3012-123456 |
|---|---|
| HOLIDAY1 | START:12/26<br>END:01/07 |
| HOLIDAY2 | START:04/29<br>END:05/07 |
| HOLIDAY3 | START:08/12<br>END:08/20 |
| DEADLINE | 15 |

CENTER-SYSTEM HOLIDAY DATA

| HOLIDAY1 | START:12/26<br>END:01/06 |
|---|---|
| HOLIDAY2 | START:04/29<br>END:05/10 |
| HOLIDAY3 | START:08/12<br>END:08/20 |

DATA FORMAT OF CUSTOMER HOLIDAY DATA

HOLIDAY1 START DATE AND END DATE
HOLIDAY2 START DATE AND END DATE
HOLIDAY3 START DATE AND END DATE

DATA FORMAT OF CENTER-SYSTEM HOLIDAY DATA

HOLIDAY1 START DATE AND END DATE
HOLIDAY2 START DATE AND END DATE
HOLIDAY3 START DATE AND END DATE

FIG.49

| PARAMETER NAME | NO. OF DIGITS | REMARKS |
|---|---|---|
| SC/MC CALL DESTINATION | 20 | |
| CALLING INTERVAL (SEC) | 3 | |
| MAX NO. OF CALLS | 2 | |
| ALARM CALL DESTINATION | 20 | |
| CALLING INTERVAL (SEC) | 3 | |
| MAX NO. OF CALLS | 2 | |
| SUPPLY CALL DESTINATION | 20 | |
| CALLING INTERVAL (SEC) | 3 | |
| MAX NO. OF CALLS | 2 | |
| USAGE-DATA CALL DESTINATION | 20 | |
| CALLING INTERVAL (SEC) | 3 | |
| MAX NO. OF CALLS | 2 | |
| DEVICE-CODE-0 CONVERT TABLE | 17 | |
| DEVICE-CODE-1 CONVERT TABLE | 17 | |
| DEVICE-CODE-2 CONVERT TABLE | 17 | |
| DEVICE-CODE-3 CONVERT TABLE | 17 | |
| DEVICE-CODE-4 CONVERT TABLE | 17 | |
| DEVICE-CODE-0 DEADLINE DATE | 2 | DAY 01-31 |
| DEVICE-CODE-1 DEADLINE DATE | 2 | DAY 01-31 |
| DEVICE-CODE-2 DEADLINE DATE | 2 | DAY 01-31 |
| DEVICE-CODE-3 DEADLINE DATE | 2 | DAY 01-31 |
| DEVICE-CODE-4 DEADLINE DATE | 2 | DAY 01-31 |
| DEVICE-CODE-0 EARLY M DATE 1 | 4 | MONTH/DAY 0101-1231 NO USE:0000 |
| DEVICE-CODE-0 EARLY M DATE 2 | 4 | MONTH/DAY 0101-1231 NO USE:0000 |
| DEVICE-CODE-0 EARLY M DATE 3 | 4 | MONTH/DAY 0101-1231 NO USE:0000 |
| DEVICE-CODE-1 EARLY M DATE 1 | 4 | MONTH/DAY 0101-1231 NO USE:0000 |
| DEVICE-CODE-1 EARLY M DATE 2 | 4 | MONTH/DAY 0101-1231 NO USE:0000 |
| DEVICE-CODE-1 EARLY M DATE 3 | 4 | MONTH/DAY 0101-1231 NO USE:0000 |
| DEVICE-CODE-2 EARLY M DATE 1 | 4 | MONTH/DAY 0101-1231 NO USE:0000 |
| DEVICE-CODE-2 EARLY M DATE 2 | 4 | MONTH/DAY 0101-1231 NO USE:0000 |
| DEVICE-CODE-2 EARLY M DATE 3 | 4 | MONTH/DAY 0101-1231 NO USE:0000 |
| DEVICE-CODE-3 EARLY M DATE 1 | 4 | MONTH/DAY 0101-1231 NO USE:0000 |
| DEVICE-CODE-3 EARLY M DATE 2 | 4 | MONTH/DAY 0101-1231 NO USE:0000 |
| DEVICE-CODE-3 EARLY M DATE 3 | 4 | MONTH/DAY 0101-1231 NO USE:0000 |
| DEVICE-CODE-4 EARLY M DATE 1 | 4 | MONTH/DAY 0101-1231 NO USE:0000 |
| DEVICE-CODE-4 EARLY M DATE 2 | 4 | MONTH/DAY 0101-1231 NO USE:0000 |
| DEVICE-CODE-4 EARLY M DATE 3 | 4 | MONTH/DAY 0101-1231 NO USE:0000 |
| ALARM CALL TIME | 4 | 0000-2359 |
| USAGE-DATA CALL TIME | 4 | 0000-2359 |
| USAGE-DATA RECEPTION TIME | 4 | 0000-2359 |
| EXCHANGE TYPE | 1 | 1:10PPS,2:20PPS,OTHERS:PB |
| CENTER-SYSTEM HOLIDAY1 | 4 | MONTH/DAY 0101-1231 NO USE:0000 |
| CENTER-SYSTEM HOLIDAY2 | 4 | MONTH/DAY 0101-1231 NO USE:0000 |
| CENTER-SYSTEM HOLIDAY3 | 4 | MONTH/DAY 0101-1231 NO USE:0000 |

IMAGE FORMING DEVICE MANAGEMENT SYSTEM AND METHOD

BACKGROUND OF THE INVENTION

1. Field of the Invention

The present invention relates to an image forming device management system and method in which a center management device (or a center system) provides remote maintenance of a plurality of image forming devices, such as copiers and printers, which are connected to the center management device via a public switched telephone network by a data communication device within a customer system.

2. Description of the Related Art

An image forming device management system in which the center system carries out an automatic reception of usage data of a plurality of image forming devices, such as printers and copiers, in various customer premises, such as user offices or companies, through a data communication device linked to the center system via a public switched telephone network (PSTN) or the like is known.

In the image forming device management system of the above type, the center system receives, on a normal message date (for example, the fifth day of each month) for each of the respective image forming devices, a usage data of a corresponding one of the image forming devices via the telephone network by using a call sent by the data communication device or a call sent by the center system. The center system automatically issues a billing of a usage charge of the corresponding one of the image forming devices based on the usage data received by the center system.

In a conventional image forming device management system, each of the respective image forming devices usually transmits, on a monthly deadline date, the usage data from the data communication device to the center system via the telephone network. However, during long holidays (e.g., summer holidays) of the customer system, all the image forming devices of the customer system are often turned off for the purpose of economy and safety of the use. In such a case, the data communication device that connects the image forming devices to the telephone network is also turned off, and the transmission of the usage data of that month to the center system cannot be performed by the customer system. Even if the sales or service person is delivered from the center system to the customer system, the person never collects the usage data of the image forming device due to the off state of the customer system.

Further, in the conventional image forming device management system, the center system is sometimes turned off during long holidays of the center system or due to the system maintenance. In such a case, the reception of the usage data from the customer system cannot be achieved by the center system. The customer system sends a call to the center system at several times, in order to transmit the usage data to the center system, but the center system does not acknowledge the call in response due to the off state of the center system. The connection between the customer system and the center system via the telephone network is not established in such a case, and an error of the communication takes place. As the center system is not operating in such a case, it is impossible to request the sales or service person to visit the customer system. As a matter of course, the data communication device cannot perform the transmission of the usage data of that month to the center system. Hence, the center system cannot achieve the reception of the usage data of that month from the customer system.

By referring to FIG. 36A and FIG. 36B, a description will now be given of a usage data reception operation of a conventional image forming device management system. FIG. 36A shows a call management table of a data communication device, and FIG. 36B shows an error log of the data communication device.

In this conventional image forming device management system, the data communication device receives a monthly total copy count from a corresponding one of the image forming devices. When a transmission time of a monthly deadline date is reached, the data communication device sends a call to the center system in order to transmit the usage data of the corresponding image forming device to the center system. This calling operation is performed by the data communication device based on the contents of the call management table, as shown in FIG. 36A, which are retained in the data communication device.

In the call management table of FIG. 36A, the call destination is provided to specify a phone number of the center system facility. The maximum number of calls is provided to indicate a maximum number of calls that can be attempted by the data communication device in cases of the busy state or the off state of the center system or a communication error. The calling interval is provided to indicate a time interval (in seconds) between the current call and the following call. The number of call events is provided to indicate the number of calls that have actually been attempted by the data communication device. The number of call events is incremented by one every time the call from the data communication to the center system is repeated. In the example of FIG. 36A, the number of call events indicates that the call from the data communication device to the center system was already repeated six times.

In the above-described calling operation of the data communication device, when the number of call events is equal to or larger than the maximum number of calls after the maximum number of calls have been attempted, it is determined that a communication error has occurred due to no return of acknowledgement from the center system. In such a case, an error code "0-23", indicating no return of acknowledgement, is written to a recording area of the error log, as shown in FIG. 36B, by the data communication device. Then, the data communication device terminates the communication.

Accordingly, during long holidays of the center system or the customer system, it is impossible for the above-described conventional management system to achieve the reception of the usage data by the center system and to achieve the transmission of the usage data by the customer system. In addition, it is also impossible for the conventional management system to request the sales or service person to visit the customer system during the long holidays. This will significantly increase the number of non-received usage data cases as well as the cost of communications between the customer system and the center system.

SUMMARY OF THE INVENTION

In order to overcome the above-described problems, preferred embodiments of the present invention provide an improved image forming device management system and method that provide, with low cost and high reliability, reception of the usage data of the image forming devices at the center system.

An object of the present invention is to provide an image forming device management system that provides, with low cost and high reliability, reception of usage data of the image forming devices at the center system.

Another object of the present invention is to provide a data communication device for use in an image forming device management system, which enables the center system to carry out, with low cost and high reliability, reception of usage data of the image forming devices from the data communication device.

Another object of the present invention is to provide an image forming device management method that provides, with low cost and high reliability, reception of usage data of the image forming devices at the center system.

The above-mentioned objects of the present invention are achieved by an image forming device management system in which a customer system and a center system are connected by a public switched telephone network, the customer system including a data communication device connecting a plurality of image forming devices to the telephone network, the center system including a center management device connected to the telephone network, the data communication device comprising: a first message means for transmitting, on a normal message date for each of the respective image forming devices, a usage data of a corresponding one of the image forming devices to the center management device via the telephone network by using a call sent by the data communication device; and a second message means for transmitting, on an early message date that is earlier than the normal message date for a corresponding one of the image forming devices, a usage data of the corresponding one of the image forming devices to the center management device via the telephone network by using a call sent by the data communication device, and the center management device comprising: a first message reception means for receiving, on the normal message date for each of the respective image forming devices, the usage data of the corresponding one of the image forming devices that is transmitted by the first message means using the call sent by the data communication device; a second message reception means for receiving, on the early message date for each of the respective image forming devices, the usage data of the corresponding one of the image forming devices that is transmitted by the second message means using the call sent by the data communication device; and a remote management means for issuing a billing of a usage charge of the corresponding one of the image forming devices to the data communication device, based on the usage data received by either the first message reception means or the second message reception means.

In the above-preferred embodiment, the usage data of the corresponding one of the image forming devices is received not only on the normal message date for each of the respective image forming devices, but also on the early message date for each of the respective image forming devices. The image forming device management system of the above-preferred embodiment is effective in reducing the non-reception cases of the usage data of the image forming devices due to the off state of the customer system or the center system during the holidays, and in increasing the efficiency of the reception of the usage data of the image forming devices with a reduction of the cost of communications between the customer system and the center system.

The above-mentioned objects of the present invention are achieved by an image forming device management system in which a customer system and a center system are connected by a public switched telephone network, the customer system including a data communication device connecting a plurality of image forming devices to the telephone network, the center system including a center management device connected to the telephone network, the data communication device comprising: a first message means for transmitting, on a normal message date for each of the respective image forming devices, a usage data of a corresponding one of the image forming devices to the center management device via the telephone network by using a call sent by the center management device; and a second message means for transmitting, on an early message date that is earlier than the normal message date for a corresponding one of the image forming devices, a usage data of the corresponding one of the image forming devices to the center management device via the telephone network by using a call sent by the center management device, and the center management device comprising: a first message reception means for receiving, on the normal message date for each of the respective image forming devices, the usage data of the corresponding one of the image forming devices that is transmitted by the first message means using the call sent by the center management device; a second message reception means for receiving, on the early message date for each of the respective image forming devices, the usage data of the corresponding one of the image forming devices that is transmitted by the second message means using the call sent by the center management device; and a remote management means for issuing a billing of a usage charge of the corresponding one of the image forming devices to the data communication device, based on the usage data received by either the first message reception means or the second message reception means.

In the above-preferred embodiment, the usage data of the corresponding one of the image forming devices is received not only on the normal message date for each of the respective image forming devices, but also on the early message date for each of the respective image forming devices. The image forming device management system of the above-preferred embodiment is effective in reducing the non-reception cases of the usage data of the image forming devices due to the off state of the customer system or the center system during the holidays, and in increasing the efficiency of the reception of the usage data of the image forming devices with a reduction of the cost of communications between the customer system and the center system.

The above-mentioned objects of the present invention are achieved by a data communication device for use in an image forming device management system, in which a customer system and a center system are connected by a public switched telephone network, the customer system including a plurality of image forming devices connected to the telephone network by the data communication device, the center system including a center management device connected to the telephone network, the data communication device comprising: a first message means for transmitting, on a normal message date for each of the respective image forming devices, a usage data of a corresponding one of the image forming devices to the center management device via the telephone network by using a call sent by the data communication device; and a second message means for transmitting, on an early message date that is earlier than the normal message date for a corresponding one of the image forming devices, a usage data of the corresponding one of the image forming devices to the center management device via the telephone network by using a call sent by the data communication device.

In the above-preferred embodiment, the usage data of the corresponding one of the image forming devices is transmitted to the center management device not only on the normal message date for each of the respective image forming devices, but also on the early message date for each of the respective image forming devices. The data communication device of the above-preferred embodiment is effective in reducing the non-reception cases of the usage data of the image forming devices due to the off state of the customer system or the center system during the holidays, and in increasing the efficiency of the reception of the usage data of the image forming devices with a reduction of the cost of communications between the customer system and the center system.

The above-mentioned objects of the present invention are achieved by a data communication device for use in an image forming device management system in an image forming device management system in which a customer system and a center system are connected by a public switched telephone network, the customer system including a plurality of image forming devices connected to the telephone network by the data communication device, the center system including a center management device connected to the telephone network, the data communication device comprising: a first message means for transmitting, on a normal message date for each of the respective image forming devices, a usage data of a corresponding one of the image forming devices to the center management device via the telephone network by using a call sent by the center management device; and a second message means for transmitting, on an early message date that is earlier than the normal message date for a corresponding one of the image forming devices, a usage data of the corresponding one of the image forming devices to the center management device via the telephone network by using a call sent by the center management device.

In the above-preferred embodiment, the usage data of the corresponding one of the image forming devices is transmitted to the center management device not only on the normal message date for each of the respective image forming devices, but also on the early message date for each of the respective image forming devices. The data communication device of the above-preferred embodiment is effective in reducing the non-reception cases of the usage data of the image forming devices due to the off state of the customer system or the center system during the holidays, and in increasing the efficiency of the reception of the usage data of the image forming devices with a reduction of the cost of communications between the customer system and the center system.

The above-mentioned objects of the present invention are achieved by a management method for an image forming device management system including a customer system and a center system linked together by a public switched telephone network, the customer system including a plurality of image forming devices and a data communication device connected to the image forming devices, the center system including a data management device connected to the data communication device via the telephone network, the management method comprising the steps of: transmitting, on an early message date that is earlier than a normal message date for a corresponding one of the image forming devices, a usage data of the corresponding one of the image forming devices from the data communication device to the center management device via the telephone network by using a call sent by the data communication device; receiving, on the early message date for each of the respective image forming devices, the usage data of the corresponding one of the image forming devices that is transmitted by the data communication device, at the center management device, using the call sent by the data communication device; and issuing a billing of a usage charge of the corresponding one of the image forming devices to the data communication device, at the center management device, based on the usage data received by the center management device.

The image forming device management method of the above-preferred embodiment is effective in reducing the non-reception cases of the usage data of the image forming devices due to the off state of the customer system or the center system during the holidays, and in increasing the efficiency of the reception of the usage data of the image forming devices with a reduction of the cost of communications between the customer system and the center system.

BRIEF DESCRIPTION OF THE DRAWINGS

Other objects, features and advantages of the present invention will be apparent from the following detailed description when read in conjunction with the accompanying drawings.

FIG. 19 is a diagram of a main data file that is stored in a database of the server of FIG. 18.

FIG. 20 is a diagram of a customer data file that is stored in the database of the server of FIG. 18.

FIG. 21 is a diagram of a machine data file that is stored in the database of the server of FIG. 18.

FIG. 22 is a diagram of a detailed machine data file that is stored in the database of the server of FIG. 18.

FIG. 24 is a diagram of a message reception window of a display device in the client of FIG. 17.

FIG. 25 is a diagram of a message reception window of the display device in the client of FIG. 17.

FIG. 26 is a diagram of a message reception window of the display device in the client of FIG. 17.

FIG. 29 is a diagram of a usage data file including a total copy count data for one image forming device, which is stored in the database of FIG. 18.

FIG. 30 is a diagram of a normal message reception file that is stored in the database of FIG. 18.

FIG. 31 is a diagram of an early message reception file created based on the normal message reception file of FIG. 30.

FIG. 32 is a diagram of an early usage-data reception file created based on the early message reception file of FIG. 31.

FIG. 33A is a diagram of an example of a center-system holiday schedule and FIG. 33B is a diagram of an example of a customer holiday schedule.

FIG. 36A and FIG. 36B are diagrams for explaining a usage data reception operation of a conventional image forming device management system.

FIG. 37 is a diagram of the data format of a text data that is transmitted from the center system to the data communication device.

FIG. 38 is a diagram of the data format of an internal clock data of the data communication device.

FIG. 39 is a diagram of a configuration of the text data that is transmitted to the data communication device.

FIG. 40 is a diagram of a configuration of parameter areas of the data communication device that store the received text data.

FIG. 43 is a diagram of an example of a holiday data in which customer holidays and center-system holidays are set.

FIG. 49 is a diagram of a configuration of parameter areas of the data communication device that store the center-system holiday data of FIG. 48 that is received from the center management device.

DETAILED DESCRIPTION OF PREFERRED EMBODIMENTS

A description will now be provided of preferred embodiments of the present invention with reference to the accompanying drawings.

Figure 2:
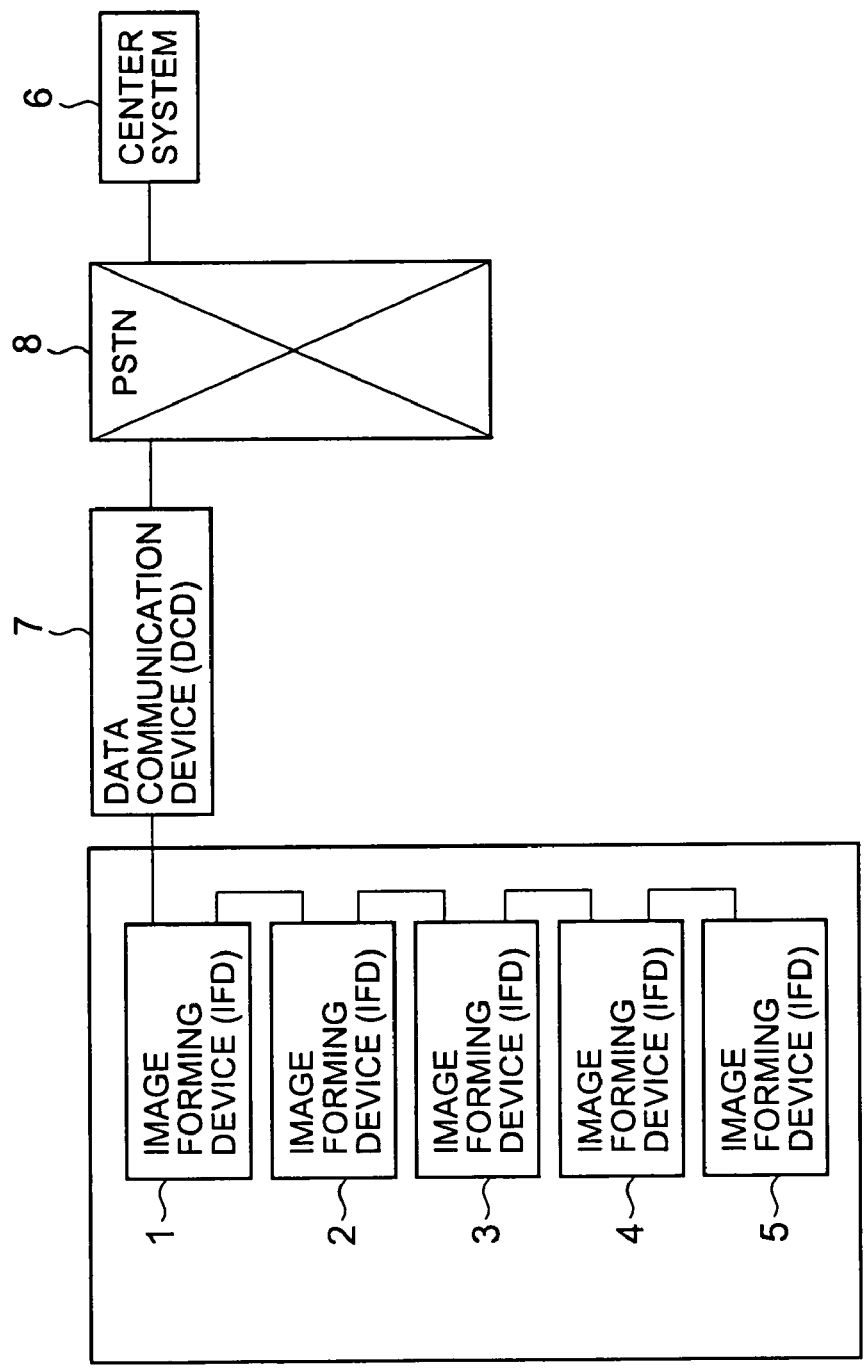
FIG. 2 is a block diagram of one preferred embodiment of the image forming device management system of the present invention.

FIG. 2 shows one preferred embodiment of the image forming device management system of the present invention.

As shown in FIG. 2, the image forming device management system of the present embodiment generally includes a plurality of image forming devices (IFDs) 1 through 5 (such as copiers), a data communication device 7 which connects the image forming devices 1–5 to a public switched telephone network (PSTM) 8, and a center system 6 which is connected to the PSTN 8. The image forming devices 1–5 and the data communication device 7 are provided in a customer system. The center system 6 is provided with a center management device (which will be described later) and configured to carry out a remote maintenance of the image forming devices 1–5 in a concentrated manner by using a connection between the center system 6 and the data communication device 7 via the PSTN 8.

The data communication device 7 delivers a command signal, received from the center system 6 via the PSTN 8, to a selected one of the image forming devices 1–5. The data communication device 7 transmits a data signal or a message, sent by any of the image forming devices 1–5, to the center system 6 via the PSTN 8.

In the customer system of the image forming device management system of FIG. 2, power is supplied to the data communication device 7 for 24 hours. Even during the night hours the image forming devices 1–5 are turned off, the data communication device 7 is always powered and can communicate with the center system 6 via the PSTN 8. The data communication device 7 and the image forming devices 1–5 are connected together by a multi-drop connection using RS-485 interfaces, and a communication between the data communication device and the image forming devices 1–5 is carried out by using a polling process or a selecting process that is executed by the data communication device 7 for the image forming devices 1–5.

Figure 3:
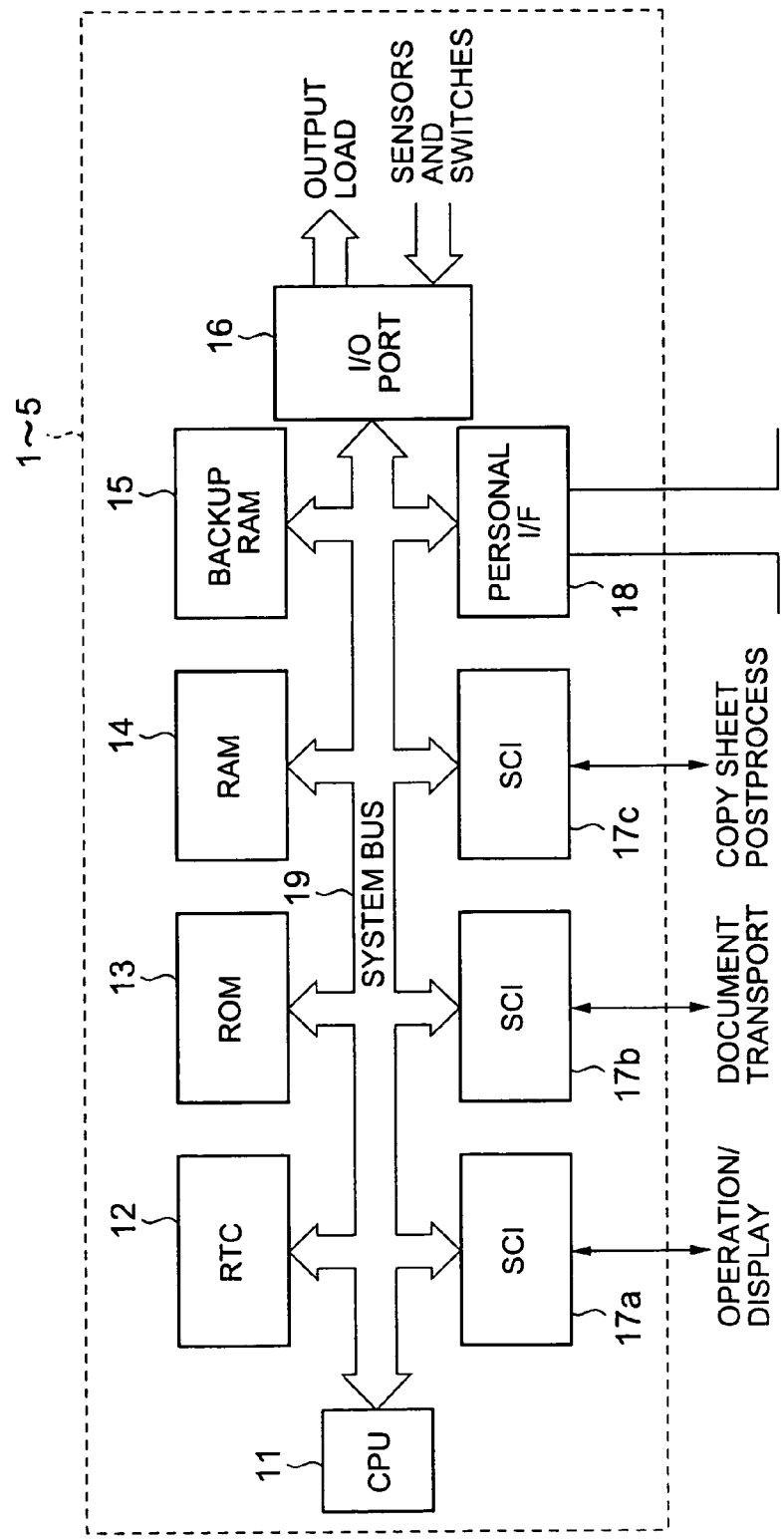
FIG. 3 is a block diagram of a detailed configuration of one of a plurality of image forming devices in the image forming device management system of FIG. 2.

FIG. 3 shows a detailed configuration of one of the image forming devices 1–5 in the image forming device management system of FIG. 2.

As shown in FIG. 3, the image forming device of the present embodiment generally comprises a CPU (central processing unit) 11, a RTC (real-time clock) 12, a ROM (read-only memory) 13, a RAM (random access memory) 14, a backup RAM 15, an I/O (input/output) port 16, a set of SCIs (serial communication interfaces) 17a, 17b and 17c for a PPC (plain paper copier) controller, a personal I/F (interface) 18, and a system bus 19.

In the image forming device of FIG. 3, the CPU 11 controls the elements of the image forming device in accordance with control program code instructions stored in the ROM 13. The RTC 12 provides the current date and time (the year, the month, the day, the hours, and the minutes).

The CPU 11 detects the current date and time by accessing the RTC 12. The ROM 13 provides a storage area of the control program code instructions for the CPU 11 and a storage area of various kinds of other fixed information for operational and control programs.

In the image forming device of FIG. 3, the RAM 14 provides a work storage area to temporarily store data used by the CPU 11 when performing a data processing. The backup RAM 15 provides a storage area of various kinds of mode indications for an operation/display portion (not shown). Power from a battery (not shown) is always supplied to the backup RAM 15, and the information of mode indications is retained by the backup RAM 15 even when the image forming device is turned off. The I/O port 16 provides the output load interfaces between the CPU 11 and the mechanical portions (such as motors, solenoid coils and clutches) of the image forming device. The I/O port 16 provides the input interfaces between the CPU 11 and the sensors and switches of the image forming device.

In the image forming device of FIG. 3, the SCI 17a receives a signal from and/or transmits a signal to the operation/display portion (not shown) of the image forming device. The SCI 17b receives a signal from and/or transmits a signal to a document transport portion (not shown) of the image forming device. The SCI 17c receives a signal from and/or transmits a signal to a copy-sheet post-process portion (not shown) of the image forming device.

Further, in the image forming device of FIG. 3, the personal I/F 18 is an interface circuit that controls a communication between this image forming device and the data communication device 7. The personal I/F 18 is provided to reduce the processing load of the CPU 11 needed to communicate with the data communication device 7. Alternatively, if the CPU 11 is configured to have an adequately high ability to communicate with the data communication device 7, the functions of the personal I/F 18 may be incorporated into the CPU 11.

The main functions that are provided by the personal I/F 18 in the image forming device of FIG. 3 are as follows.

(1) Monitoring of the polling and selecting by the data communication device 7.

(2) Sending an acknowledgement (ACK) or a negative acknowledgement (NAK) to the data communication device 7.

(3) Checking the correctness of data received from or sent to the data communication device 7, the parity checking and sending a request for re-transmission of data to the data communication device 7 upon an error.

(4) Detecting the header information of data received from or sent to the data communication device 7.

Further, in the image forming device of FIG. 3, the system bus 19 is constituted by an address bus, a control bus and a data bus, and provided to interconnect the CPU 11, the RTC 12, the ROM 13, the RAM 14, the backup RAM 15; the I/O port 16, the SCIs 17a–17c, and the personal I/F 18.

Figure 4:
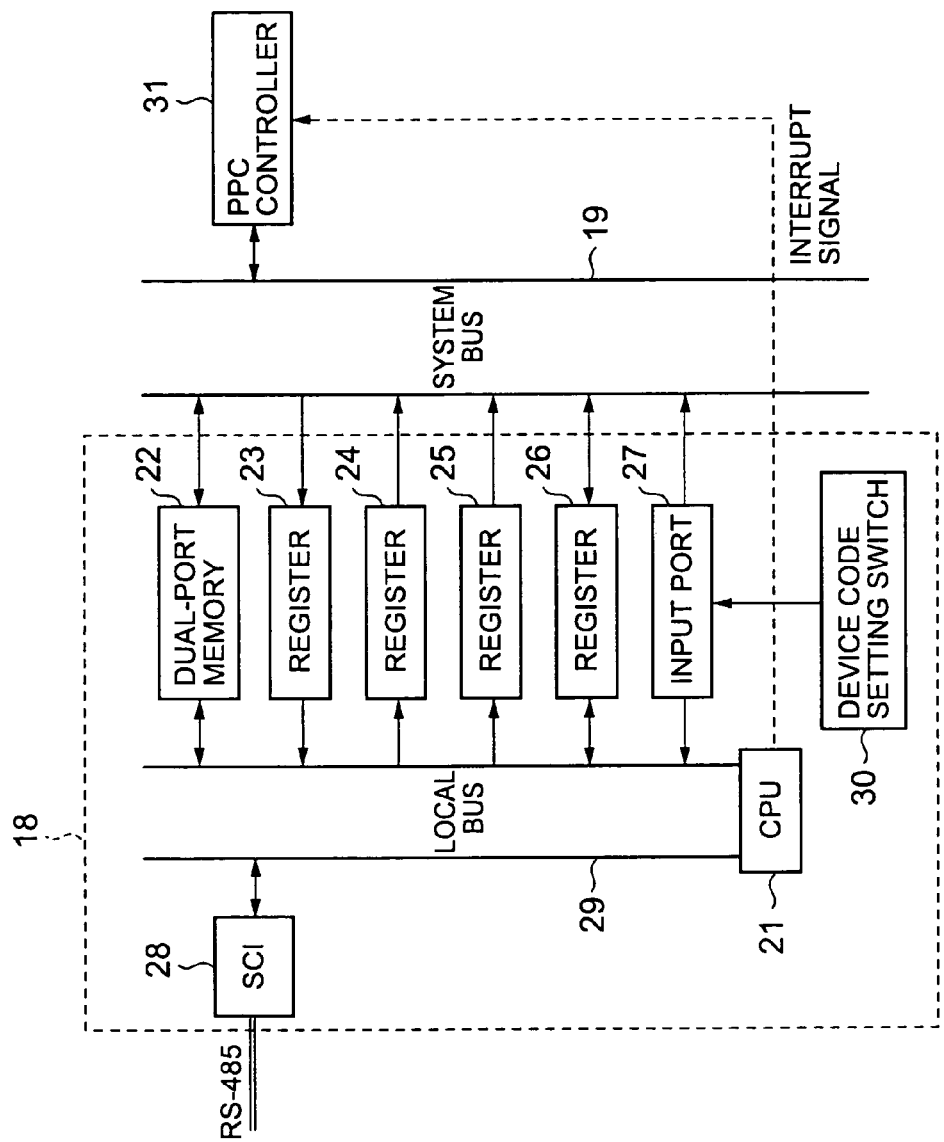
FIG. 4 is a block diagram of a detailed configuration of a personal interface unit in the image forming device of FIG. 3.

FIG. 4 shows a detailed configuration of the personal I/F 18 in the image forming device of FIG. 3.

As shown in FIG. 4, the personal I/F 18 of the present embodiment generally comprises a CPU 12, a dual-port memory 22, a set of registers 24 through 26, an input port 27, a SCI 28, a local bus 29, and a device-code setting switch 30.

In the personal I/F 18 of FIG. 4, the CPU 21 is a one-chip microcomputer including a ROM, a RAM and an I/O interface. The CPU 21 controls the elements of the entire personal I/F 18. The dual-port memory 22 provides a storage area the information of which can be accessed by either the CPU 21 or the CPU 11 of FIG. 3. The dual-port memory 22 is accessed by either the CPU 21 or the CPU 11 of FIG. 3 when a text data is exchanged between the personal I/F 18 and a PPC (plain paper copier) controller 31.

The PPC controller 31 of FIG. 3 is constituted by the above CPU 11, the RTC 12, the ROM 13, the RAM 14, the backup RAM 15, the I/O port 16 and the SCIs 17a, 17b and 17c. The registers 23 through 26 in the personal I/F 18 of FIG. 3 are used for control when a text data is exchanged between the personal I/F 18 and the PPC controller 31, and a detailed description of the registers 23–26 will be omitted.

In the personal I/F 18 of FIG. 3, the device-code setting switch 30 is provided to set a specific device code of the image forming device in which the personal I/F 18 is provided. The device code of each of the image forming devices 1 through 5 in the image forming device management system of FIG. 2 is detected to identify each image forming device when the polling process or the selecting process is performed by the data communication device 7. The SCI 28 is connected to the data communication device 8 and/or the personal I/F 18 of another image forming device.

Figure 5:
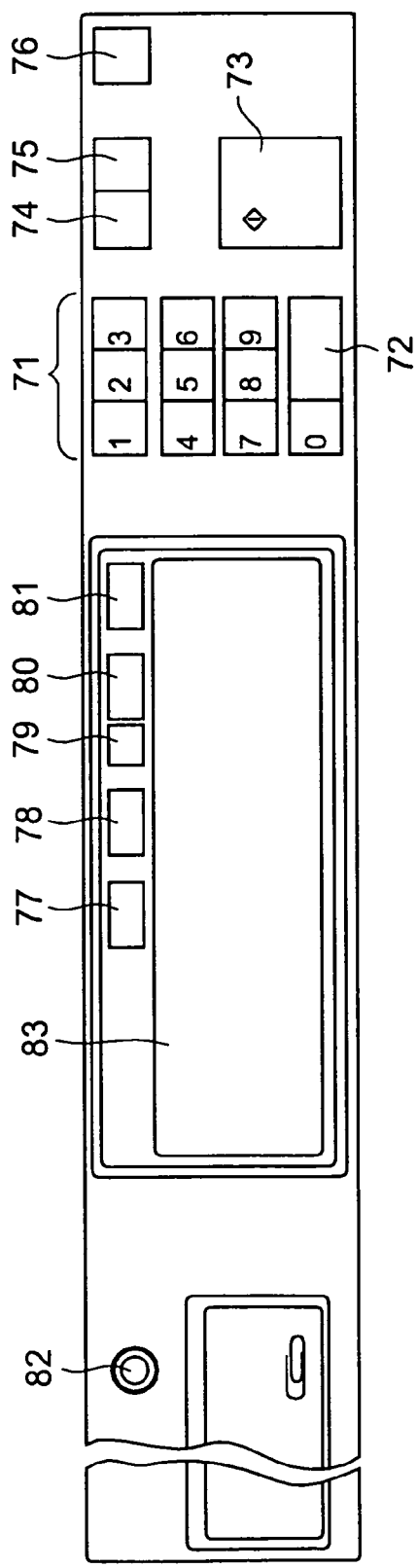
FIG. 5 is a diagram showing an operation/display portion in the image forming device of FIG. 3.

FIG. 5 shows an operation/display portion in the image forming device of FIG. 3.

Similar to the configuration of the control portion of the image forming device (such as that shown in FIG. 3), the operation/display portion of the present embodiment includes a control part (not shown) that generally comprises a CPU controlling the operation/display portion, a ROM storing program code instructions for the CPU, a RAM providing a working storage area for the CPU, a backup RAM providing a storage area of various kinds of mode indications for the operation/display portion, an SCI, and an I/O port. The operation/display portion receives a data signal from and/or sends a data signal to the SCI 17a of FIG. 3, and a detailed description of the control part of the operation/display portion of the present embodiment will be omitted.

As shown in FIG. 5, the operation/display portion of the present embodiment generally includes, in addition to the above-mentioned control part, a set of ten keys 71, a clear/stop key 72, a print key 73, an enter key 74, an interrupt key 75, an preheat/mode clear key 76, a mode confirm key 77, a window change key 78, a call key 79, a registration key 80, a guidance key 81, a display contrast volume 82, and a character display unit 83.

In the operation/display portion of FIG. 5, the ten keys 71 are provided to input the number of copies to be formed or input the number of a scaling factor. The clear/stop key 72 is provided to cancel an input number of the character display device 83, such as the number of copies, or to stop an image forming operation of the image forming device. The print key 73 is provided to start an image forming operation of the image forming device. The enter key 74 is provided to determine an input number, such as a zooming factor or a staple size setting number. The interrupt key 75 is provided to insert another document copying operation in the current copying operation. The preheat/mode clear key 76 is provided to cancel all the previously set operations modes or to set a preheat mode of the image forming device for economy of power consumption.

In the operation/display portion of FIG. 5, the mode confirm key 77 is provided to display a list of several image forming modes on the character display device 83. The window change key 78 is provided to select one of a set of different types of display window formats for the character display device 83. The call key 79 is provided to call a user-defined control program.

In the operation/display portion of FIG. 5, the registration key 80 is provided to register a user-defined control program into the operation/display portion of the image forming device. The guidance key 81 is provided to display a guidance message on the character display device 83. The display contrast volume 82 is provided to adjust the contrast of the character display device 83.

Further, in the operation/display portion of FIG. 5, the character display unit 83 employs a liquid crystal device (LCD) or a full-dot fluorescent display device. A matrix touch panel of a generally transparent sheet which a number of touch sensors (one of which is provided for a matrix of 8×8 picture elements) are built in is overlapped onto the LCD or the like.

Figure 6:
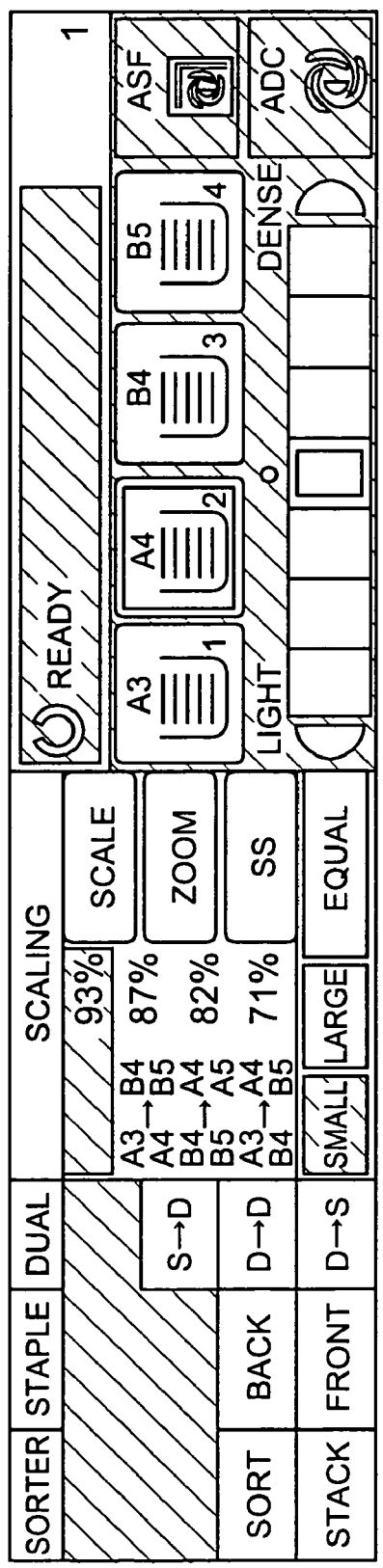
FIG. 6 is a diagram of an image-forming mode window of a character display in the operation/display portion of FIG. 5.

FIG. 6 shows an image-forming mode window of the character display device 83 in the operation/display portion of FIG. 5. This image-forming mode window appears on the character display device 83 when a power switch of the image forming device is turned on.

An operator of the image forming device can select a desired one or a desired number of the sheet sizes, the optical densities, the scaling factors, the single or dual mode, the staple mode or the sorter mode by depressing one of a number of touch keys of the character display device 83 as shown in FIG. 6. The display mode of a touch key that is depressed by the operator is turned from white into black or vice versa.

In the example of the image-forming mode window of FIG. 6, the scaling factor 93%, the automatic sheet feeder (ASF) mode, the automatic density control (ADC) mode and the input number 1 for the number of copies are selected by the operator.

Figure 7:
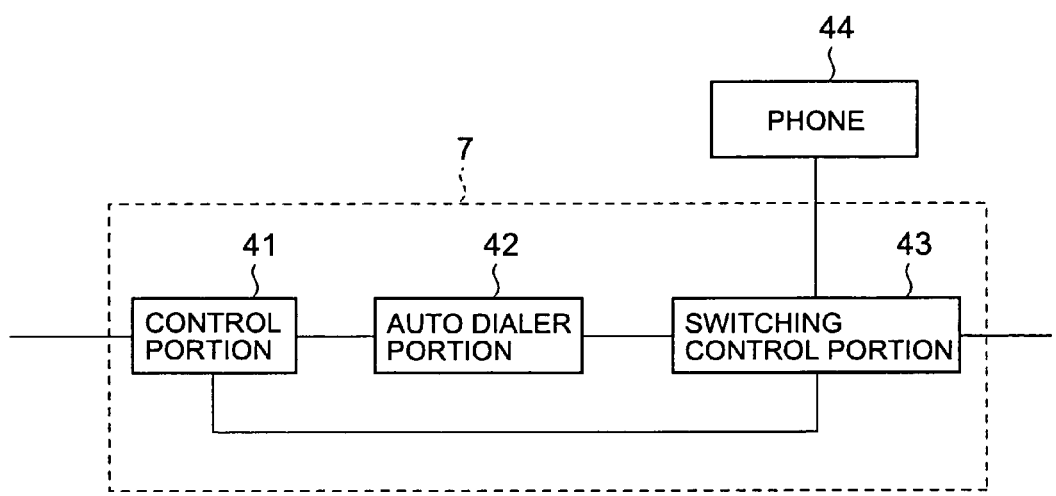
FIG. 7 is a block diagram of a configuration of a data communication device in the image forming device management system of FIG. 2.

FIG. 7 shows a configuration of the data communication device 7 in the image forming device management system of FIG. 2.

As shown in FIG. 7, the data communication device 7 of the present embodiment generally comprises a control portion 41, an auto dialer portion 42, and a switching control portion 43. The control portion 41 controls the plurality of image forming devices 1 through 5, and controls the reception of a command signal, which is transmitted by the center system 6 via the PSTN 8.

In the data communication device 7 of FIG. 7, the auto dialer portion 42 sends a call to the center system 6 in accordance with the messages sent by the image forming devices 1–5. The switching control portion 43 carries out a switching control for connecting the control portion 41 to either an external telephone unit 44 or to the PSTN 8.

Similar to the configuration of the control portion of the image forming device such as that shown in FIG. 3, the control portion 41 of the present embodiment generally comprises a CPU controlling the data communication device 7, a ROM storing program code instructions for the CPU, a RAM providing a working storage area for the CPU, a backup RAM, an SCI, an I/O port, and a RTC. The backup RAM of the control portion 41 provides a storage area for storing a text data transmitted between the data communication device 7 and the center system 6, the respective device codes and ID codes of the image forming devices 1–5, a phone number of the center system 6 (or the call destination), the maximum number of calls, the calling interval, and other parameters.

Next, a description will be provided of the major functions of the image forming device management system of the present embodiment. The image forming device management system of the present embodiment has three major functions: (1) the control of communications from the center system 6 to the image forming devices 1–5; (2) the control of communications from the image forming devices 1–5 to the center system 6 or to the data communication device 7; and (3) the control of the data communication device 7 itself.

Regarding the control of communications from the center system 6 to the image forming devices 1–5 as mentioned in the above item (1), there are three functions (a) through (c) that follows.

(a) Reading and resetting of various items including a total copy count of a corresponding one of the image forming devices 1–5, respective copy counts for a plurality of sheet feed cassettes of the corresponding image forming device, respective copy counts for a plurality of paper sizes of the corresponding image forming device, a total number of paper jam events of the corresponding image forming device, respective numbers of paper jam events for the plurality of paper sizes of the corresponding image forming device, and respective numbers of paper jam events for a plurality of sheet transport positions of the corresponding image forming device.

(b) Reading and setting of the adjustment values of the control voltage, the control current, the resistance, and the timing in the respective units of a corresponding one of the image forming devices 1–5.

(c) Transmission of the results of the control of the communications mentioned in the above item (2) from the image forming devices 1–5 back to the center system 6.

The control functions (a) through (c) described above are carried out by executing a selecting process for the image forming devices 1–5 by the data communication device 7 after a command signal sent by the center system 6 is received by the data communication device 7. The selecting process means that the data communication device 7 selects one of the image forming devices 1–5 and performs a communication between the data communication device 7 and the selected image forming device.

Figure 8:
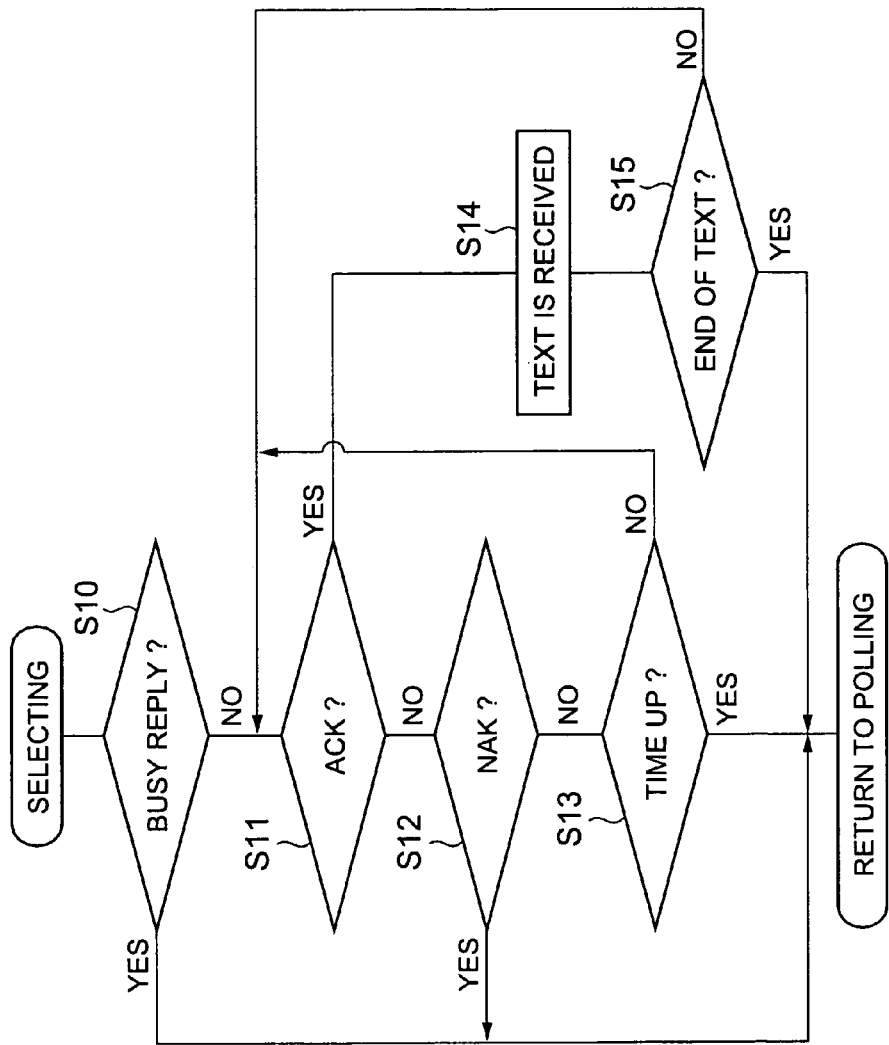
FIG. 8 is a flowchart for explaining a selecting process executed by the data communication device of FIG. 7.

FIG. 8 is a flowchart for explaining a selecting process executed by the data communication device 7 of FIG. 7.

In the selecting process shown in FIG. 8, it is assumed that each of the image forming devices 1–5 has a specific device code, and the data communication device 7 sends a predefined code (or a combination of predefined codes) of the selecting process and a device code of the image forming device to be selected, to the SCI 28 (which uses the RS-485 interface) of each of the image forming devices 1–5.

Each of the image forming devices 1–5, connected to the data communication device 7, checks the process code sent by the data communication device 7 and compares the device code followed by the process code, with the specific device code assigned for the corresponding image forming device. When the former device code matches with the latter device, the corresponding image forming device recognizes that it is to be selected by the data communication device 7. When the selected image forming device has a text data to be sent to the data communication device 7, the selected image forming device sends a busy signal (a predefined code or a combination of predefined codes) back to the data communication device 7. On the other hand, when the selected image forming device has no text data to be sent to the data communication device 7, the selected image forming device either sends an acknowledge signal ACK (a predefined code or a combination of predefined codes) to the data communication device 7, or sends a negative acknowledge signal NAK (a predefined code or a combination of predefined codes) to the data communication device 7.

As shown in FIG. 7, the data communication device 7 at step S10 determines whether a busy signal, sent by the selected one of the image forming devices 1–5, is received at the data communication device 7. When the result of the step S10 is affirmative, the data communication device 7 terminates the selecting process of FIG. 8, and the control of the data communication device 7 is transferred to a following polling process.

When the result of the step S10 is negative, the data communication device 7 at step S11 determines whether an acknowledge signal (ACK), sent by the selected one of the image forming devices 1–5, is received at the data communication device 7. When the result of the step S11 is affirmative, the data communication device 7 at step S14 receives the text data from the selected image forming device, and the control of the data communication device 7 is transferred to a following step S15. The data communication device 7 at step S15 determines whether the end of the text data sent by the selected image forming device is detected.

When the result of the step S15 is negative, the control of the data communication device 7 is transferred to the above step S11. Otherwise the data communication device 7 terminates the selecting process of FIG. 8, and the control of the data communication device 7 is transferred to the following polling process.

On the other hand, when the result of the step S12 is negative, the data communication device at step S12 determines whether a negative acknowledge signal (NAK), sent by the selected image forming device, is received at the data communication device 7.

When the result of the step S12 is negative, the data communication device 7 at step S13 determines whether a predetermined time period has been elapsed. When the result of the step S13 is negative, the control of the data communication device 7 is transferred to the above step S11. Otherwise the data communication device 7 terminates the selecting process of FIG. 8, and the control of the data communication device 7 is transferred to the following polling process.

Regarding the control of communications from the image forming devices 1–5 to the center system 6 as mentioned in the above item (2), there are five functions (a) through (e) that follows.

(a) Sending an error message (an emergency message) from a corresponding one of the image forming devices 1–5 to the data communication device 7 and to the center system 6 via the PSTN 8 when a malfunction in the corresponding one of the image forming devices 1–5 takes place.

(b) Sending a repair request (an emergency message) from a corresponding one of the image forming devices 1–5 to the data communication device 7 and to the center system 6 via the PSTN 8 when a repair request message window appears on the character display device 83 of the corresponding one of the image forming devices 1–5 and a repair request transmit button of the repair request message window is depressed by the operator.

(c) Sending a usage data or a supply request (an emergency message) from a corresponding one of the image forming devices 1–5 to the data communication device 7 and to the center system 6 via the PSTN 8 when a contract copy count (or a predetermined count number of copies) is reached by the total copy count of the corresponding one of the image forming devices 1–5 is reached.

(d) Sending, on a normal message date for a corresponding one of the image forming devices 1–5, a usage data thereof (a non-emergency message) from the corresponding one of the image forming devices 1–5 to the data communication device 7 and to the center system 6 via the PSTN 8 when the current date and time of the corresponding one of the image forming device 1–5 matches with a predetermined date and time.

(e) Sending, on a normal message date for a corresponding one of the image forming devices 1–5, a supply request or a maintenance request thereof (a non-emergency message) from the corresponding one of the image forming devices 1–5 to the data communication device 7 and to the center system 6 via the PSTN 8 when a maintenance event (such as a change of consumable materials or a supply of copy sheets) in the corresponding one of the image forming device 1–5 takes place.

The control functions (a) through (e) described above are carried out by executing a polling process for the image forming devices 1–5 by the data communication device 7. The polling process means that the data communication device 7 sequentially designates one of the image forming devices 1–5 and confirms the reception of a communication request from each selected image forming device at the data communication device 7.

Figure 9:
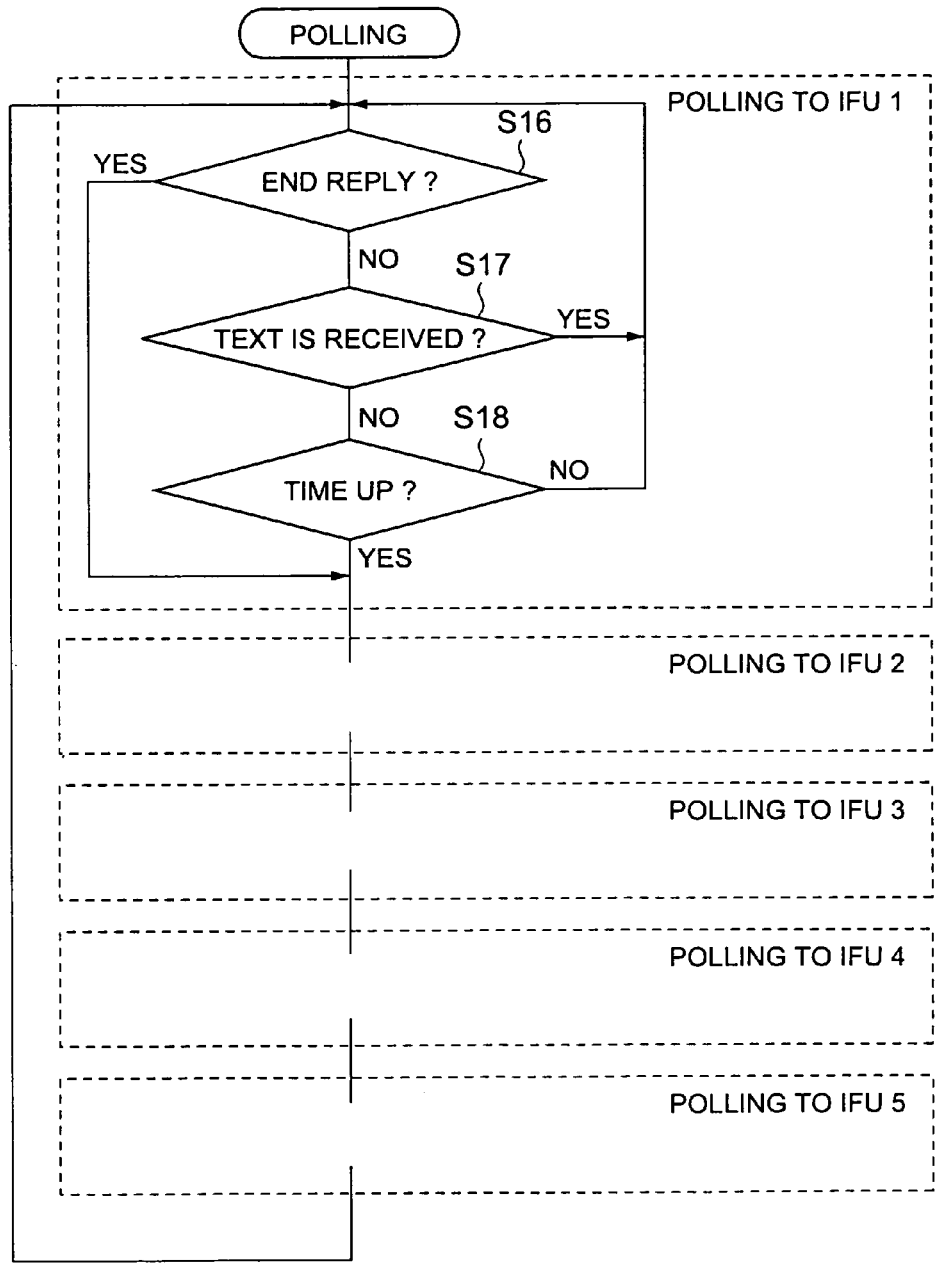
FIG. 9 is a flowchart for explaining a polling process executed by the data communication device of FIG. 7.

FIG. 9 is a flowchart for explaining a polling process executed by the data communication device of FIG. 7.

In the polling process shown in FIG. 9, it is assumed that each of the image forming devices 1–5 has a specific device code, and the data communication device 7 sends a predefined code (or a combination of predefined codes) of the polling process and a device code of the image forming device to be designated, to the SCI 28 (which uses the RS-485 interface) of each of the image forming devices 1–5.

Each of the image forming devices 1–5, connected to the data communication device 7, checks the process code sent by the data communication device 7 and compares the device code followed by the process code, with the specific device code assigned for the corresponding image forming device. When the former device code matches with the latter device code, the corresponding image forming device recognizes that it is designated for the polling process by the data communication device 7. When the designated image forming device has a text data (or a transmission request being sent to the data communication device 7 or to the center system 6), the image forming device starts the communication with the data communication device 7. On the other hand, when the designated image forming device has no transmission request, or when the communication is terminated, the image forming device sends a communication end reply (a predefined code or a combination of predefined codes) to the data communication device 7 to terminate the communication with the data communication device 7.

As shown in FIG. 9, the data communication device 7 at step S16 determines whether a communication end reply, sent by the designated one (in this case, the image forming device 1) among the image forming devices 1–5, is received at the data communication device 7. When the result of the step S16 is affirmative, the control of the data communication device 7 is transferred to a following polling process for the image forming device 2.

When the result of the step S16 is negative, the data communication device 7 at step S17 determines whether a text data, sent by the designated one of the image forming devices 1–5, is being received at the data communication device 7. When the result of the step S17 is affirmative, the control of the data communication device 7 is returned to the above step S16.

On the other hand, when the result of the step S17 is negative, the data communication device 7 at step S18 determines whether a predetermined time period has elapsed. When the result of the step S18 is affirmative, the control of the data communication device 7 is transferred to the following polling process for the image forming device 2. Otherwise the control of the data communication device 7 is returned to the above step S16.

When a corresponding one of the image forming devices 1–5 for the device code output by the data communication device 7 is in the off state, the corresponding image forming device cannot start the communication with the data communication device 7 or cannot send a communication end reply to the data communication device 7. Hence, after the predetermined time period has elapsed, the data communication device 7 terminates the polling process for the corresponding image forming device. Unless the selecting process is started, the polling process is sequentially performed for the image forming devices 1 through 5 connected to the data communication device 7 as shown in FIG. 9.

Regarding the control of the data communication device 7 itself as mentioned in the above item (3), there are two functions (a) and (b) that follows.

(a) Reading a total copy count from each of the image forming devices 1–5.

(b) Sending a result of the communication, performed by the control mentioned in the above item (2), from a corresponding one of the image forming devices 1–5 to the data communication device 7.

The reading of the total copy count in the above control function (a) is carried out by the data communication device 7 by executing the selecting process for the image forming devices 1–5 by the data communication device 7 at a regular time of every day (for example, 00:00). When the corresponding image forming device is in the off state during the selecting process, the selecting process will be executed as soon as the corresponding image forming device is turned ON.

The data communication device 7 is provided with two memories (which are called a memory A and a memory B) for storing the total copy count of a corresponding one of the image forming devices 1–5. The total copy count (or the usage data of the corresponding image forming device), read through the selecting process, is stored in the memory A. As the selecting process is performed at a regular time of every day, the previous total copy count stored in the memory A is updated by a new total copy count read through the selecting process every day. Suppose that the corresponding image forming device is not in the off state during the selecting process.

On a predetermined monthly message date and time that is set in the backup RAM of the data communication device 7 by the center system 7, the total copy count of the memory A is copied to the memory B in the data communication device 7, and the data communication device transmits, on the message date, the total copy count of the memory B to the center system 6.

There are two methods (a) and (b) of the reception of the total copy count sent by the data communication device 7 at the center system 6:

(a) The center system 6 receives the total copy count (stored in the memory B) of a corresponding one of the image forming devices 1–5 from the data communication device 7 by using a call sent by the center system 6 at a date and time that is subsequent to the monthly message date and time.

(b) The data communication device 7 transmits the total copy count (stored in the memory B) of a corresponding one of the image forming devices 1–5 to the center system 6 by using a call sent by the data communication device 7 at a date and time that is subsequent to the monthly message date and time.

Further, the data communication device 7 may be provided with a plurality of pairs of the memories A and B for storing several sub-total copy counts (monochrome copies, application copies, color copies, and others) for each of the image forming devices 1–5.

Figure 10:
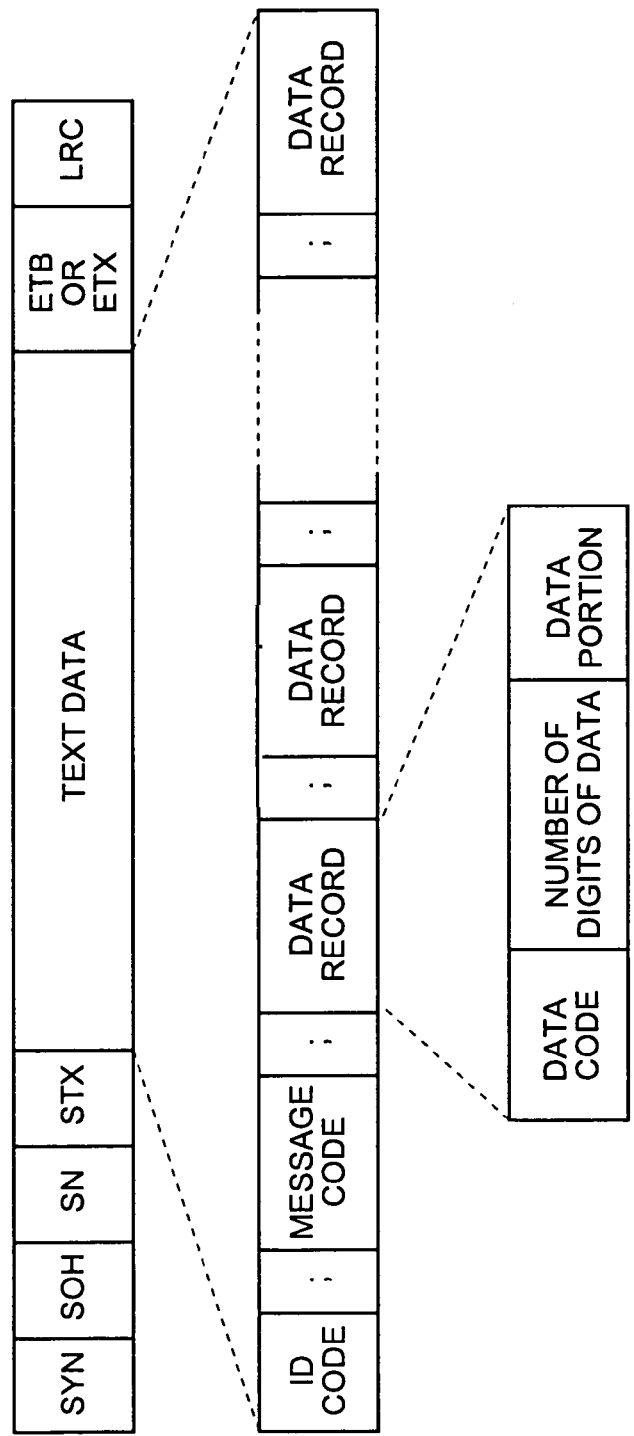
FIG. 10 is a diagram of the data format of a text data that is transmitted between the center system and the data communication device.

FIG. 10 shows the data format of a text data that is transmitted between the center system and the data communication device.

As shown in FIG. 10, a header portion of the text data includes a serial number SN that indicates a data block number of one of a sequence of data blocks transmitted at a time. The SN of a first data block is indicated by "01", and the SN of a subsequent data block is indicated by a 2-digit number of "02" through "99". The ID code of the text data is a device number indicating a specific one of the image forming devices 1–5 and the data communication device 7. The message code of the text data is indicated by a process code with a message source ID and a message destination ID attached. The process code indicates a specific type of the text data message transmitted, and is predefined as in the following TABLE 1.

TABLE 1

| CODE | PROCESS NAME | DESCRIPTION |
| --- | --- | --- |
| 30 | SERVICE CALL (SC) | AUTO MESSAGE BY SC |
| 31 | MANUAL CALL (MC) | AUTO MESSAGE BY MC SW |
| 32 | ALARM TRANSMIT | AUTO MESSAGE BY ALARM |
| 22 | BLOCK BILLING | AUTO MESSAGE WHEN BILLING LEVEL IS REACHED |
| 02 | DATA READING | READ DATA FROM PPC PARA. |
| 04 | DATA WRITING | WRITE DATA TO PPC PARA. |
| 03 | EXECUTION | TEST BY REMOTE OPERATION |
| 08 | DEVICE CODE CHECK | COMMUNICATION FUNCTION CHECKING |

In the data format of FIG. 10, each of a plurality of data records in the text data is divided into a data code, the number of digits of data and a data portion, which are predefined as in the following TABLE 2.

TABLE 2

| CODE | DATA LENGTH | DESCRIPTION |
| --- | --- | --- |
| DATA CODE | 11 | A CODE INDICATING A KIND OF DATA |
| NO. OF DIGITS | 2 | A LENGTH OF DATA PORTION. ASCII CODES. IN CASE OF NO DATA PORTION: "00". |
| DATA RECORD | VARIABLE | THE CONTENTS OF EACH DATA PORTION |

Figure 11:
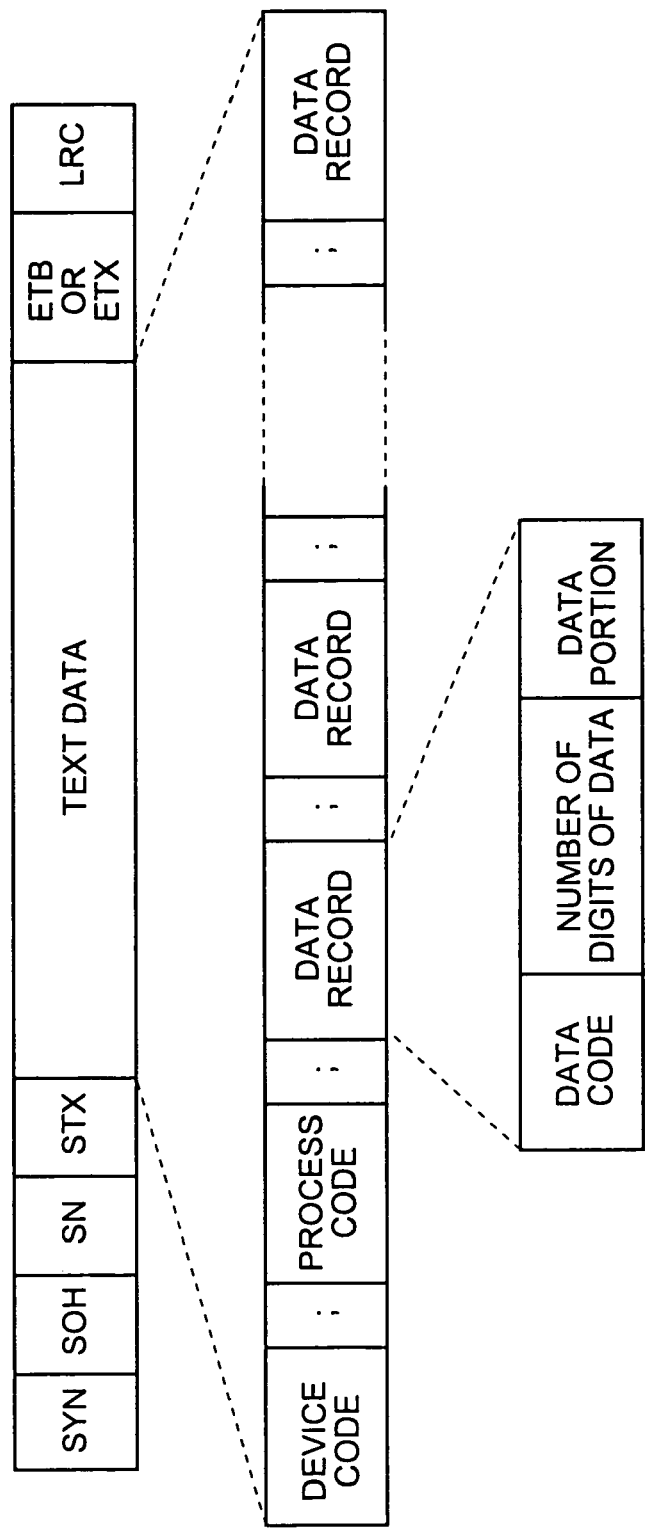
FIG. 11 is a diagram of the data format of a text data that is transmitted between the data communication device and a personal interface of the image forming device.

FIG. 11 shows the data format of a text data that is transmitted between the data communication device 7 and the personal I/F 18 of each of the image forming devices 1–5.

In the data format of FIG. 11, the device code is a device number that indicates a specific one of the image forming devices 1–5. Each device code of the image forming devices 1–5 is preset by using the device-code setting switch 30 (FIG. 4). The correlation of the ID code of FIG. 10 and the device code of FIG. 11 is stored in the backup RAM of the data communication device 7 when the image forming device is initially connected to the data communication device 7. The process code of FIG. 11 corresponds to the message code of FIG. 10 from which the message source ID and the message destination ID are removed.

Figure 12:
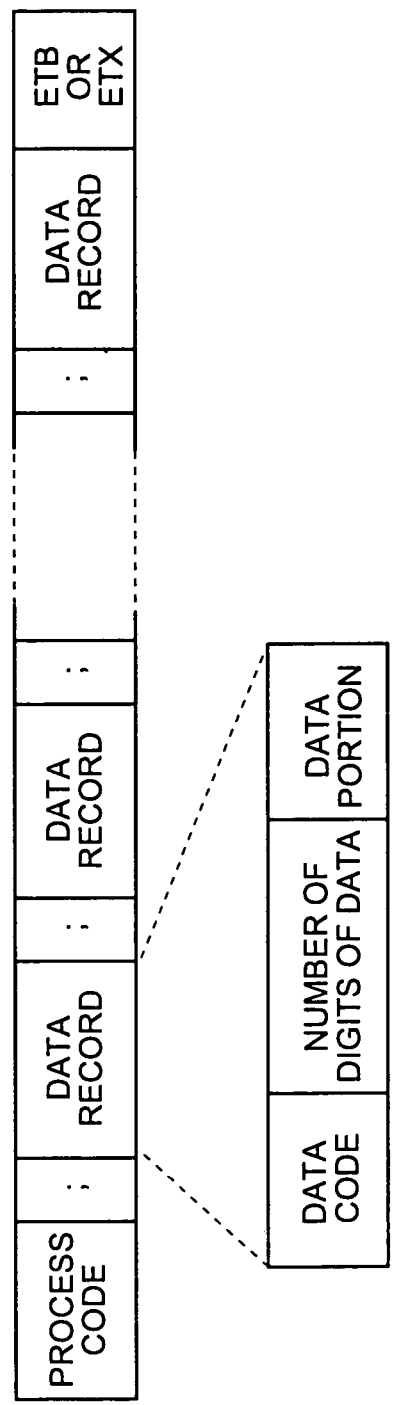
FIG. 12 is a diagram of the data format of a text data that is transmitted between the personal interface and a PPC controller.

FIG. 12 shows the data format of a text data that is transmitted between the personal I/F 18 and the PPC controller 31. The text data of FIG. 12 corresponds to the text data of FIG. 11 from which the header portion, the parity portion and the device code are removed.

Next, a description will be provided of several message processes executed by each of the image forming devices 1–5 with reference to FIG. 13 through FIG. 16.

There are three methods (a), (b) and (c) of the transmission of a message from one of the image forming devices 1–5 to the center system 6 that follows.

(a) Display window of the operation/display portion of the image forming device at the time of the message transmission (a-1) The image-forming mode window is kept to appear on the display device.

(a-2) An operational message concerning the message transmission is displayed on the display device.

(b) Timing of the message transmission to the center system 6

(b-1) A message is transmitted as soon as the cause of the message transmission occurs.

(b-2) The accumulated messages are transmitted together at a regular time of the day.

(c) Result of the message transmission to the center system 6

(c-1) The result of the message transmission is displayed.

(c-2) The result of the message transmission can be confirmed later.

(c-3) The result of the message transmission cannot be confirmed later (not needed).

For example, the message transmission is carried out by the image forming device in the following cases.

(1) A malfunction message is transmitted from the image forming device to the center system 6 when a malfunction that makes the image forming action impossible occurs. The methods of the above items (a-2), (b-1) and (c-1) are used.

(2) A repair request is transmitted from the image forming device to the center system 6 when a set of certain keys of the operation/display portion are depressed by the user. The methods of the above items (a-2), (b-1) and (c-1) are used.

(3) An emergency message is transmitted from the image forming device to the center system 6 when a total copy count reaches a predetermined billing level. The methods of the above items (a-1), (b-1) and (c-3) are used.

(4) A supply request is transmitted from the image forming device to the center system 6 when a maintenance event (such as a change of consumable materials or a supply of copy sheets) takes places. The methods of the above items (a-1), (b-2) and (c-3) are used.

(5) A non-emergency message is transmitted from the image forming device to the center system 6 at a regular time when the total copy count reaches the billing level within a predetermined period. The methods of the above items (a-1), (b-2) and (c-3) are used.

Figure 13:
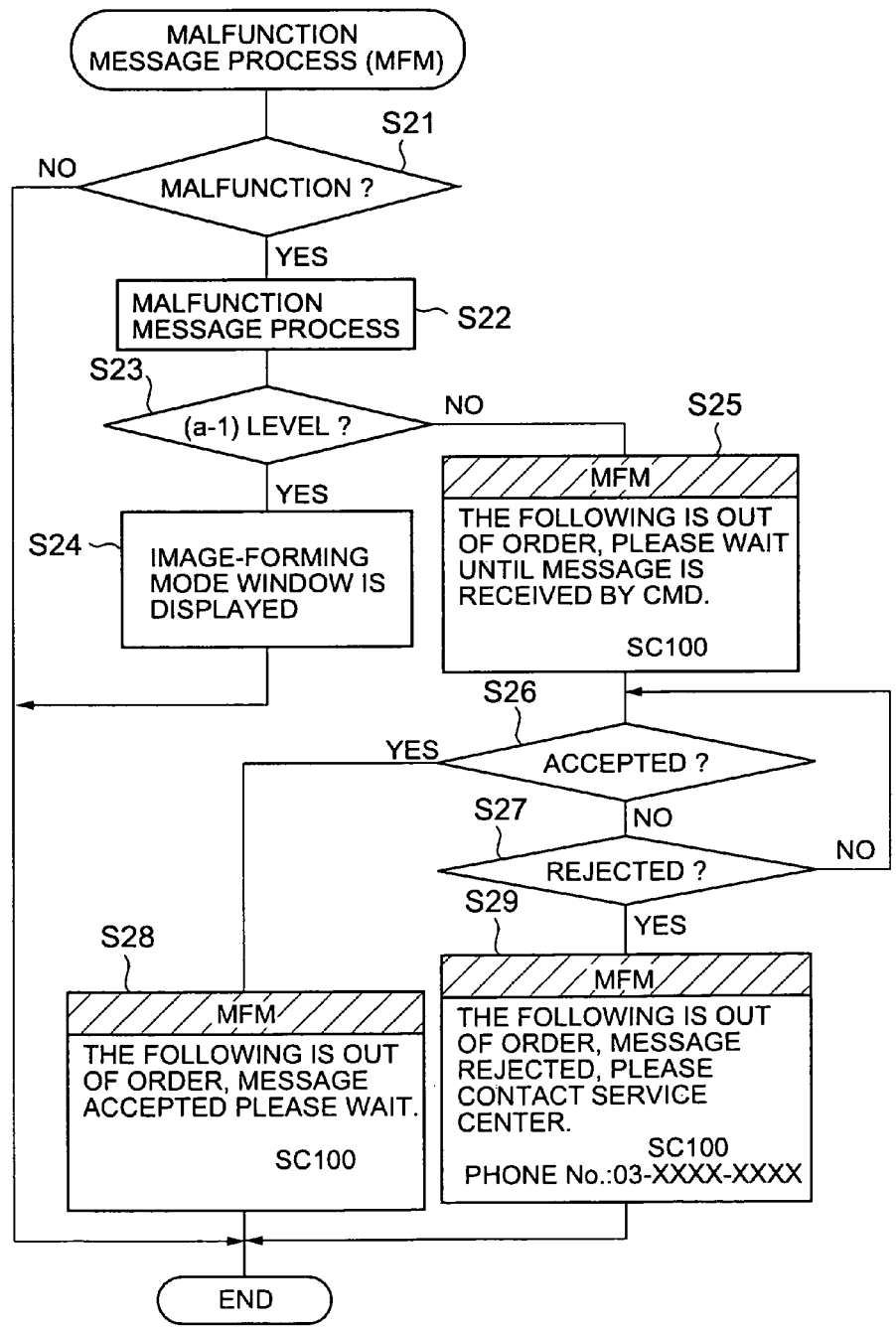
FIG. 13 is a flowchart for explaining a malfunction message process executed by the image forming device of FIG. 3.

FIG. 13 shows a malfunction message process executed by the image forming device of FIG. 3.

In the malfunction message process of FIG. 13, when a corresponding one of the image forming devices 1–5 detects a malfunction at step S21, a malfunction message process is performed at step S22 in which a malfunction message is transmitted to the data communication device 7 and to the center system 6 via the PSTN 8.

The image forming device at step S23 determines whether the malfunction is at the (a-1) level. When the result of the step S23 is affirmative, the image-forming mode window is kept to appear on the character display device 83 of the operation/display portion of FIG. 5 at step S24.

When the result of the step S23 is negative, the malfunction is at the (a-2) level. The image forming device at step S25 displays a malfunction message process (MFM) window on the character display device 83 of the operation/display portion of FIG. 5.

When it is determined at step S26 that the message transmission is accepted by the center system 6, the image forming device at step S28 displays an appropriate malfunction message process (MFM) window on the character display device 83 of the operation/display portion of FIG. 5.

When it is determined at step S27 that the message transmission is rejected by the center system 6, the image forming device at step S29 displays an appropriate malfunction message process (MFM) window on the character display device 83 of the operation/display portion of FIG. 5.

Accordingly, the malfunction message process of the present embodiment provides increased operability of the image forming devices for the customers.

Figure 14:
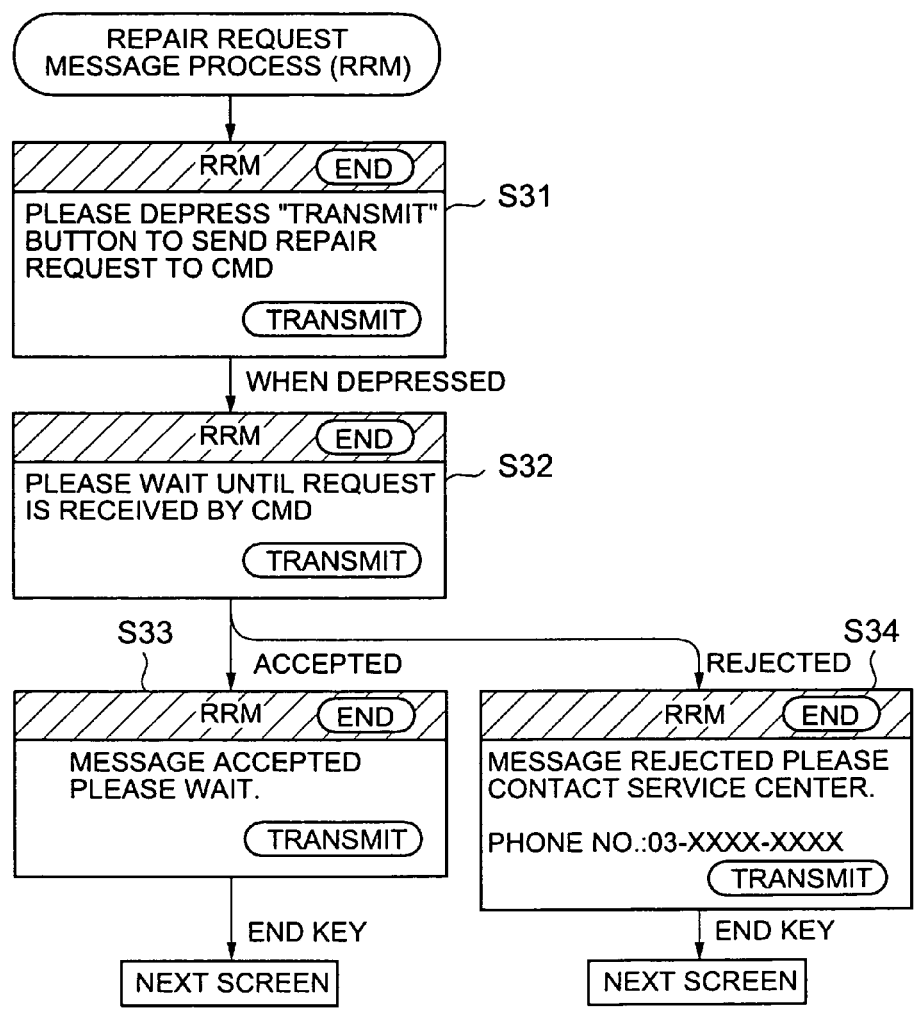
FIG. 14 is a flowchart for explaining a repair request message process executed by the image forming device of FIG. 3.

FIG. 14 shows a repair request message process executed by the image forming device of FIG. 3.

In the repair request message process of FIG. 14, when a repair request key of the operation/display portion of a corresponding one of the image forming devices 1–5 is depressed, a repair request message process (RRM) window appears on the character display device 83 at step S31. When a transmit key in the RRM window is depressed, a repair request message process is performed in which a repair request is transmitted to the data communication device 7 and to the center system 6 via the PSTN 8.

The other steps S32 through S34 of FIG. 14 are essentially the same as the steps S25 through S29 of FIG. 13, and a description thereof will be omitted. Similar to the process of FIG. 13, the repair request message process of the present embodiment provides increased operability of the image forming devices for the customers.

Figure 15:
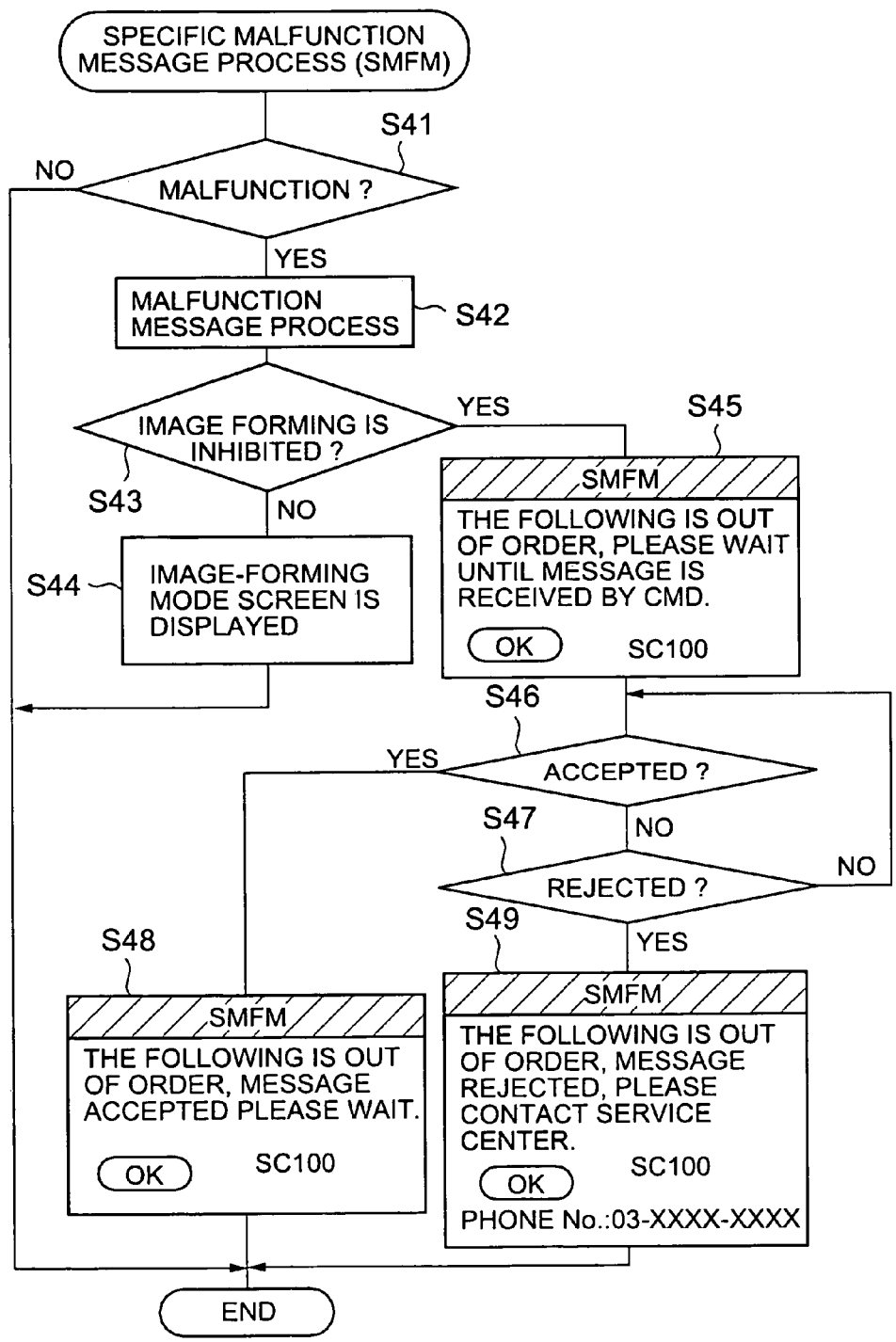
FIG. 15 is a flowchart for explaining a specific malfunction message process executed by the image forming device of FIG. 3.

FIG. 15 shows a specific malfunction message process executed by the image forming device of FIG. 3.

In the specific malfunction message process of FIG. 15, when a malfunction that makes the image forming action impossible if a specific function is used occurs, the corresponding image forming device displays a specific malfunction message process (SMFM) window on the character display device 83 of the operation/display portion of FIG. 5.

The steps S41 through S49 of FIG. 15 are essentially the same as the steps S21 through S29 of FIG. 13 except the above-mentioned matter, and a description thereof will be omitted. Similar to the process of FIG. 13, the specific malfunction message process of the present embodiment provides increased operability of the image forming devices for the customers.

Figure 16:
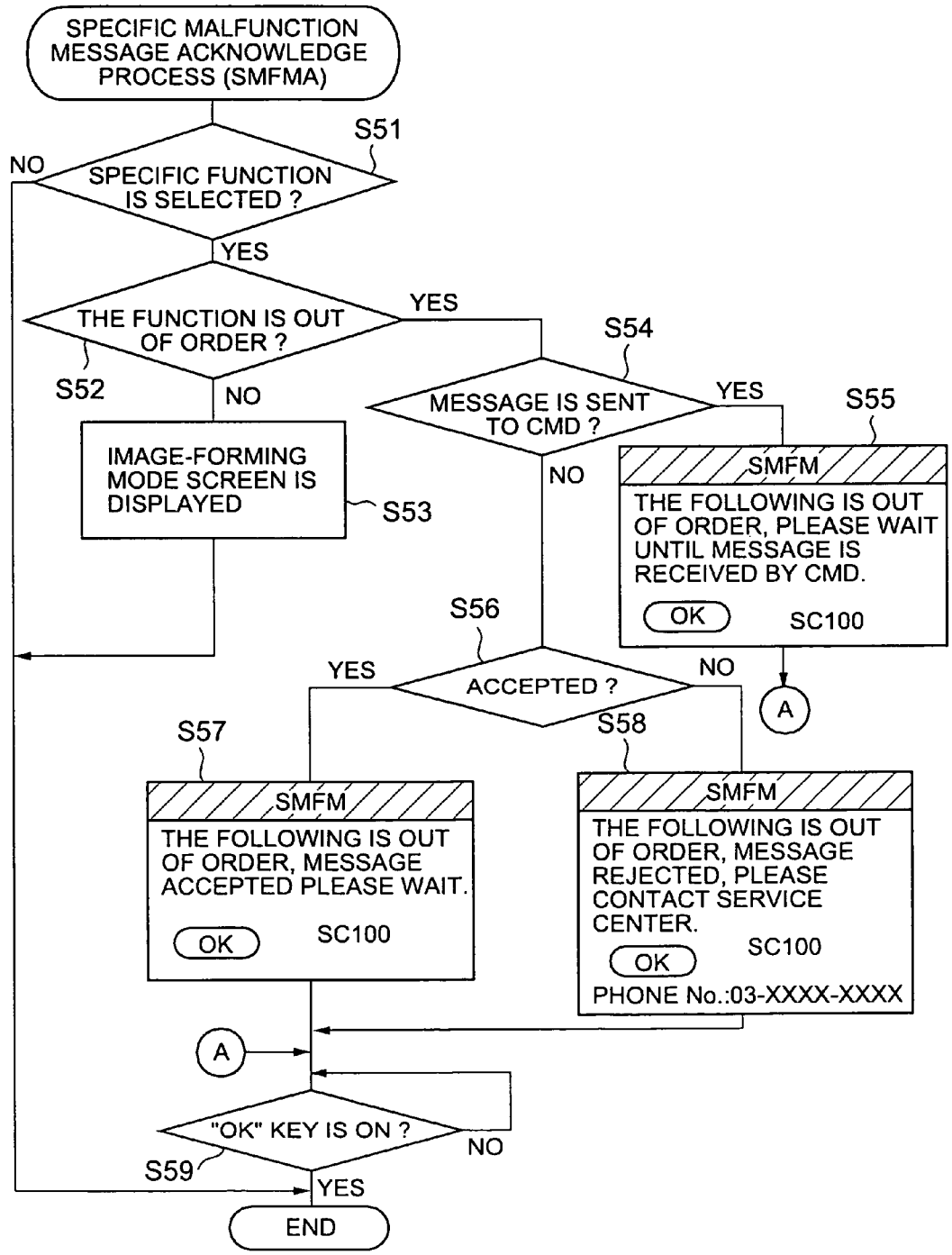
FIG. 16 is a flowchart for explaining a specific malfunction message acknowledge process executed by the image forming device of FIG. 3.

FIG. 16 shows a specific malfunction message acknowledge process executed by the image forming device of FIG. 3.

In the specific malfunction message acknowledge process of FIG. 16, when the specific malfunction message process of FIG. 15 is performed and a specific function is used, the corresponding image forming device displays a specific malfunction message acknowledge process (SMFM) window on the character display device 83 of the operation/display portion of FIG. 5. In the SMFM window, the result of the message transmission is displayed on the character display device 83 when the specific function is used against a malfunction occurring in the image forming device.

The steps S51 through S59 of FIG. 16 are essentially the same as the steps S21 through S29 of FIG. 13 except the above-mentioned matter, and a description thereof will be omitted. Similar to the process of FIG. 13, the specific malfunction message acknowledge process of the present embodiment provides increased operability of the image forming devices for the customers.

Figure 1:
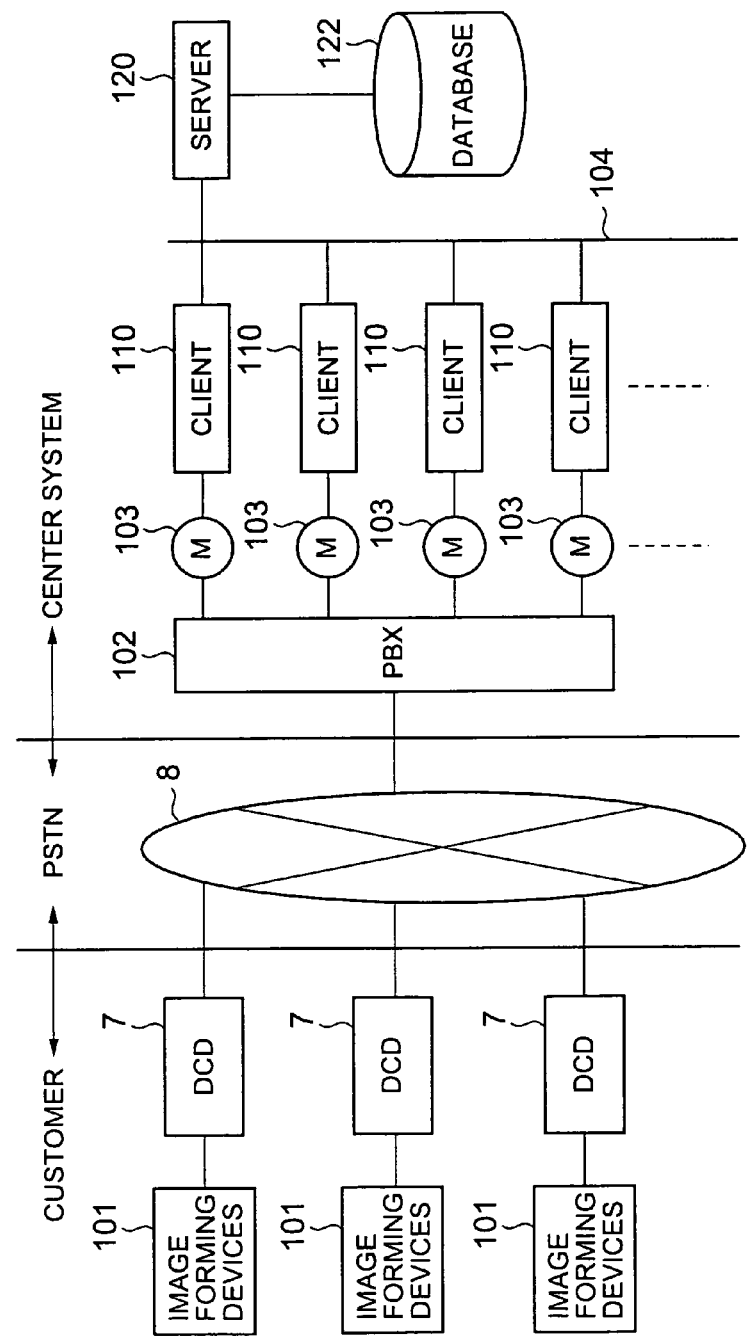
FIG. 1 is a block diagram of a detailed configuration of the image forming device management system of FIG. 2.

FIG. 1 shows a detailed configuration of the image forming device management system of FIG. 2.

As shown in FIG. 1, the center system in the image forming device management system of the present embodiment includes a private branch exchange (PBX) 102. The customer system in the image forming device management system of the present embodiment includes a set of data communication devices (DCD) 7 and a plurality of groups of image forming devices 101. The data communication devices 7 respectively connect the groups of image forming devices 101 to the PSTN 8. The image forming devices 1–5 in the embodiment of FIG. 2 are included in one of the groups of image forming devices 101 in the present embodiment.

The center system in the image forming device management system of FIG. 1 includes a plurality of modems 103, a plurality of clients 110, a server 120 and a LAN (local area network) 104, in addition to the PBX 102. The server 120 is provided with a database 122. The plurality of clients 110 and the server 120 are interconnected by the LAN 104.

When a malfunction occurs in any of the image forming devices 101 of the customer system, a malfunction message (an analog signal) is sent from that image forming device to the data communication device 7. The data communication device 7 transmits the malfunction message to the PBX 102 of the center system via the PSTN 8 by using the internal modem of the data communication device 7. One of the modems 103 that are connected to the PBX 102 converts the analog signal (the malfunction message) into a digital signal, and sends the digital signal to one of the clients 110. The PBX 102 is set in a dial-in connection scheme that allows an external terminal to have a direct access to any of the clients 110 via the PBX 102.

Figure 17:
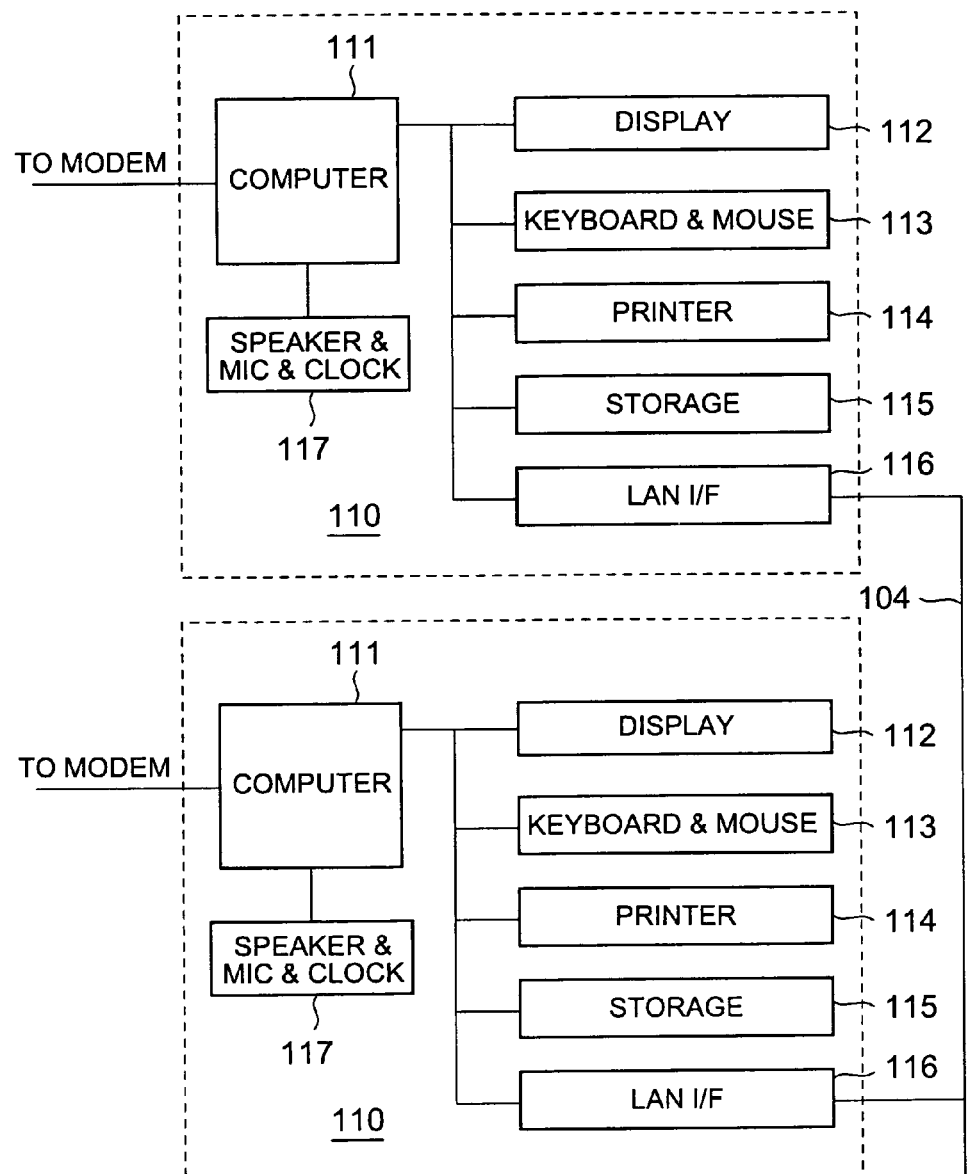
FIG. 17 is a block diagram of a detailed configuration of a plurality of clients in the image forming device management system of FIG. 1.

FIG. 17 shows a configuration of a plurality of clients in the image forming device management system of FIG. 1. As shown in FIG. 17, each of the clients 110 generally comprises a computer 111, a display device 112, a keyboard/mouse 113, a printer 114, a secondary storage 115, an LAN interface 116, and a speaker/microphone/clock module 117.

Figure 18:
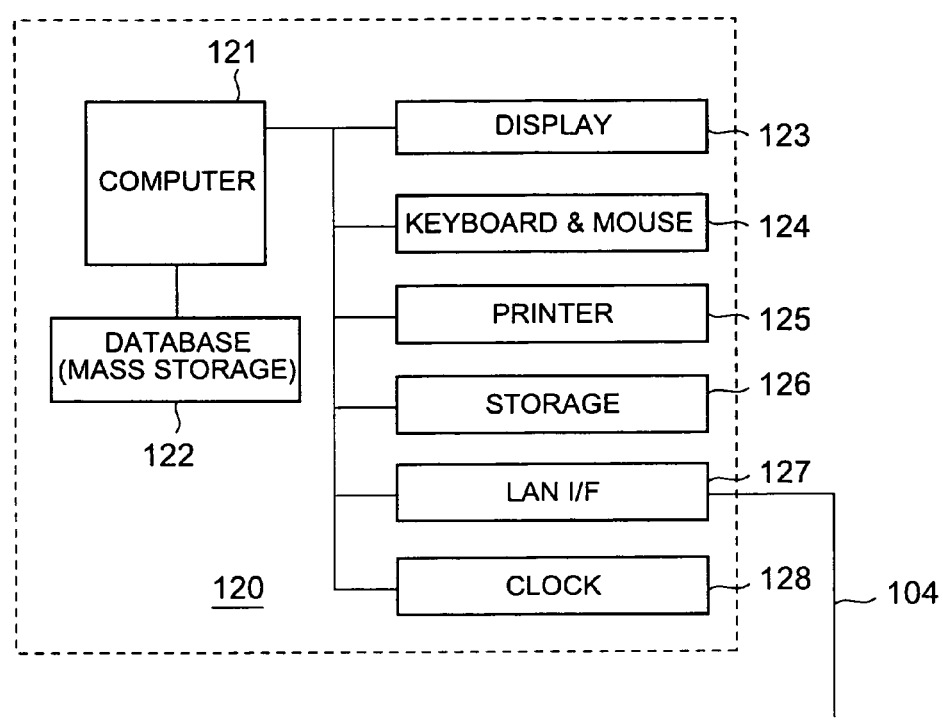
FIG. 18 is a block diagram of a server in the image forming device management system of FIG. 1.

FIG. 18 shows a configuration of a server in the image forming device management system of FIG. 1. As shown in FIG. 18, the server 120 generally comprises a computer 121, a database (a mass storage) 122, a display device 123, a keyboard/mouse 124, a printer 125, a secondary storage 126, an LAN interface 127, and a clock 128.

The database 122 of the server 120 contains a plurality of data files as shown in FIG. 19 through FIG. 22.

FIG. 19 shows a main data file that is stored in the database 122 of the server 120 of FIG. 18.

In the main data file of FIG. 19, the customer data (customer name, machine type, machine ID, data type), the service data (service company), and the log data (reception time, order time, status, person in charge, color data, elapsed time) are provided. The sequence number SEQ is incremented each time a new message is received at the client 110. If the sequence number reaches "999", the sequence number is reset to zero and it is subsequently set to "001".

The customer name in the main data file of FIG. 19 indicates a customer name of the message source that is extracted from a customer data file of FIG. 20 by accessing the customer data file by using the machine type and ID of the message received by the client 110. The data type indicates a type of the message that is received by the client 110 from the image forming device. The type of the received message includes, for example, service call (SC), alarm (AL), and manual call (MC).

The color data in the main data file of FIG. 19 indicates a color in which the message or data is displayed on the display device 112 of the client 110.

FIG. 20 shows a customer data file that is stored in the database 122 of the server 120 of FIG. 18. In the customer data file of FIG. 20, the call destination phone and fax numbers needed when a malfunction occurs in the image forming device are provided, and the machine type and ID of the image forming device are provided.

In the customer data file of FIG. 20, the person indicates a person in charge needed when a call is sent from a service center. The delivery date indicates a date on which the image forming device is installed in the customer system. The service company indicates a name of the service company providing a service for the image forming devices. The phone number adjacent to the service company indicates a phone number of the service company. The fax number adjacent to the phone number indicates a fax number of the service company.

FIG. 21 shows a machine data file that is stored in the database 122 of the server 120 of FIG. 18. In the machine data file of FIG. 21, data related to the respective image forming devices are provided.

In the machine data file of FIG. 20, the machine composition indicates an option component of the image forming device (for example, a sorter, an ADF or the like). The error record indicates records of malfunctions that occurred in the image forming device. The repair record indicates records of service that was conducted to the image forming device. The machine record indicates records of data that was transmitted from the image forming device to the client 110.

FIG. 22 shows a detailed machine data file that is stored in the database 122 of the server 120 of FIG. 18.

Figure 23:
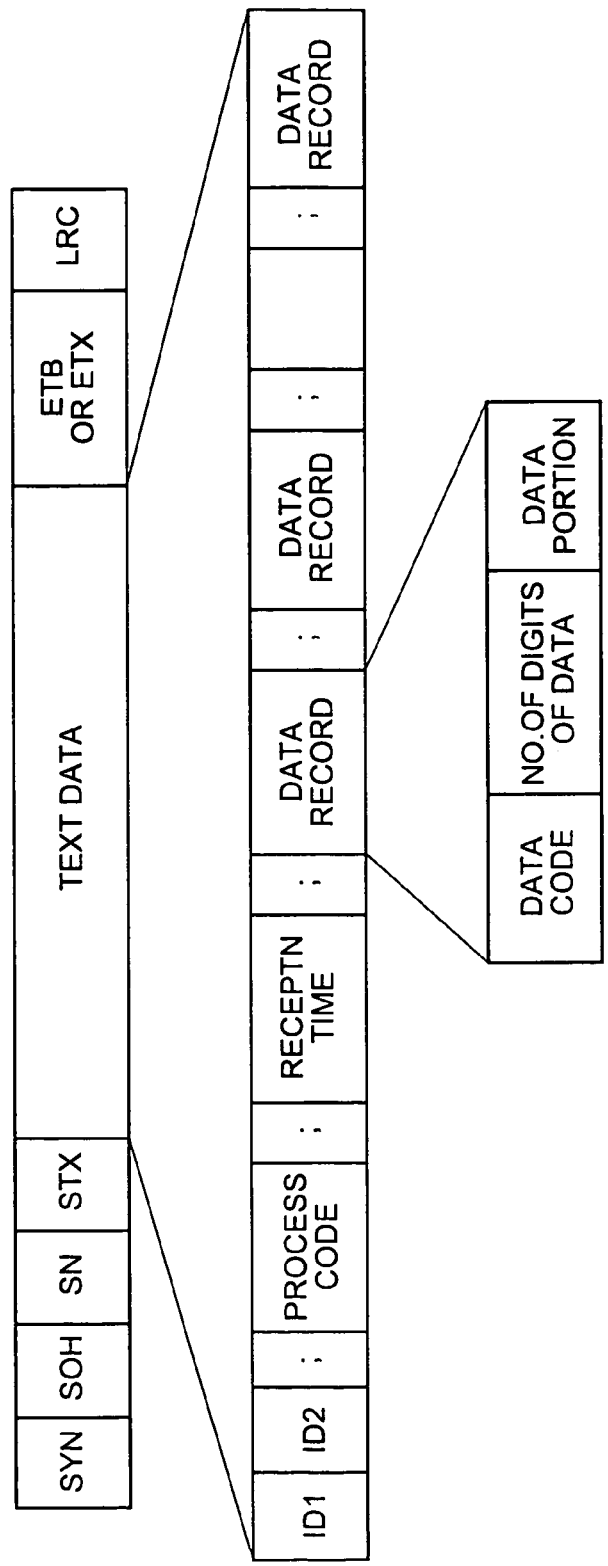
FIG. 23 is a diagram of the data format of a text data that is transmitted between the center system and the data communication device.

In the detailed machine data file of FIG. 22, the reception date indicates a reception date and time (year/month/day and hour/minute) when a message sent by the image forming device is received at the client 110. The item indicates a type of message such as JAM, SC, ALARM, system call, manual call (MC) and supply call (SC). The original date indicates a date and time (year/month/day and hour/minute) when a text data of FIG. 23 is transmitted by the image forming device. The machine record indicates a counter data and a design data that are extracted from a text data of FIG. 23.

FIG. 23 shows the data format of a text data that is transmitted between the center system 6 and the data communication device 7.

As shown in FIG. 23, the ID1 code of the text data is a 20-digit device number indicating a phone number of the data communication device 7 accompanied by a specific code of the data communication device 7. The ID2 code is a 17-digit device number indicating a machine type and ID of one of the image forming devices 1–5. The left-end data record indicates a necessary data that should be transmitted from the center management system. The process code indicates a specific type of the text data message transmitted, and is predefined as in the following. TABLE 1.

In the data format of FIG. 10, each of a plurality of data records in the text data is divided into a data code, the number of digits of data and a data portion, which are predefined as in the following TABLE 2.

Next, FIG. 24 through FIG. 28 respectively show various message reception windows of the display device 112 of the client 110 of FIG. 17. The computer 111 of each of the clients 110 of the center system 6 carries out the following processes.

(1) The computer 111 temporarily stores a plurality of messages, sent by the image forming devices 101, in the secondary storage 115 (or in the main memory of the computer 111). Then, the computer 111 creates the data files of FIG. 19 through FIG. 22 based on the stored information of the secondary storage 115, and stores them into the database 122 of the server 120.

After the data files of FIG. 19 through FIG. 22 are stored in the database 122, the computer 111 displays the message reception window of FIG. 24 on the display device 112 based on the stored information of the database 122.

(2) When an "in-process" record of the message reception window is designated by the operator of the subject computer 111, the computer 111 updates the corresponding record of the data files of the database 122 by inserting data of a registered operator name and the indication "in process" therein. Hence, the operator name and the indication "in process" are displayed at the status column of the related record of the message reception window on the display device 112.

(3) When an "in process" record of the message reception window is designated by the operator of another computer 111, that computer 111 updates the corresponding record of the data files of the database 122 by inserting data of a registered operator name and the indication "in process" therein. Hence, the operator name and the indication "in process" are displayed at the status column of the related record of the message reception window on the display device 112.

(4) When a record (e.g., S.N. 515) of the message reception window that was already designated by the operator of another computer 111 is erroneously designated by the operator 111 of the subject computer 111, the subject computer 111 displays the message reception window of FIG. 25 on the display device 112 based on the stored information of the database 122. The message reception window of FIG. 25 includes a sub-window providing a warning message "S.N. 515 is now in process and cannot be selected" to the operator of the subject computer 111. When an "OK" key in the sub-window is depressed by the operator, the sub-window is closed.

(5) When a record of the message reception window is designated by the operator of the subject computer 111 and a service person order flag is set in the record, the subject computer 111 updates the corresponding record of the data files of the database 122 by setting the service person order flag and inserting a name of the related service person therein. Hence, the indication "in process" of the record is changed to the indication "order" in the related record of the message reception window on the display device 112.

(6) When a record of the message reception window is designated by the operator of another computer 111 and a service person order flag is set in the record, that computer 111 updates the corresponding record of the data files of the database 122 by setting the service person order flag and inserting a name of the related service person therein. Hence, the indication "in process" of the record is changed to the indication "order" in the related record of the message reception window on the display device 112.

(7) When the service person order flag of a record of the message reception window that was already set by the operator of another computer 111 is erroneously set by the operator 111 of the subject computer 111, the subject computer 111 displays the message reception window of FIG. 26 on the display device 112 based on the stored information of the database 122. The message reception window of FIG. 26 includes a sub-window providing a warning message "This item was ordered" to the operator of the subject computer 111. When an "OK" key in the sub-window is depressed by the operator, the sub-window is closed. When a "RUN" key in the sub-window is depressed, a detailed data sub-window (not shown) appears on the display device 112.

Figure 27:
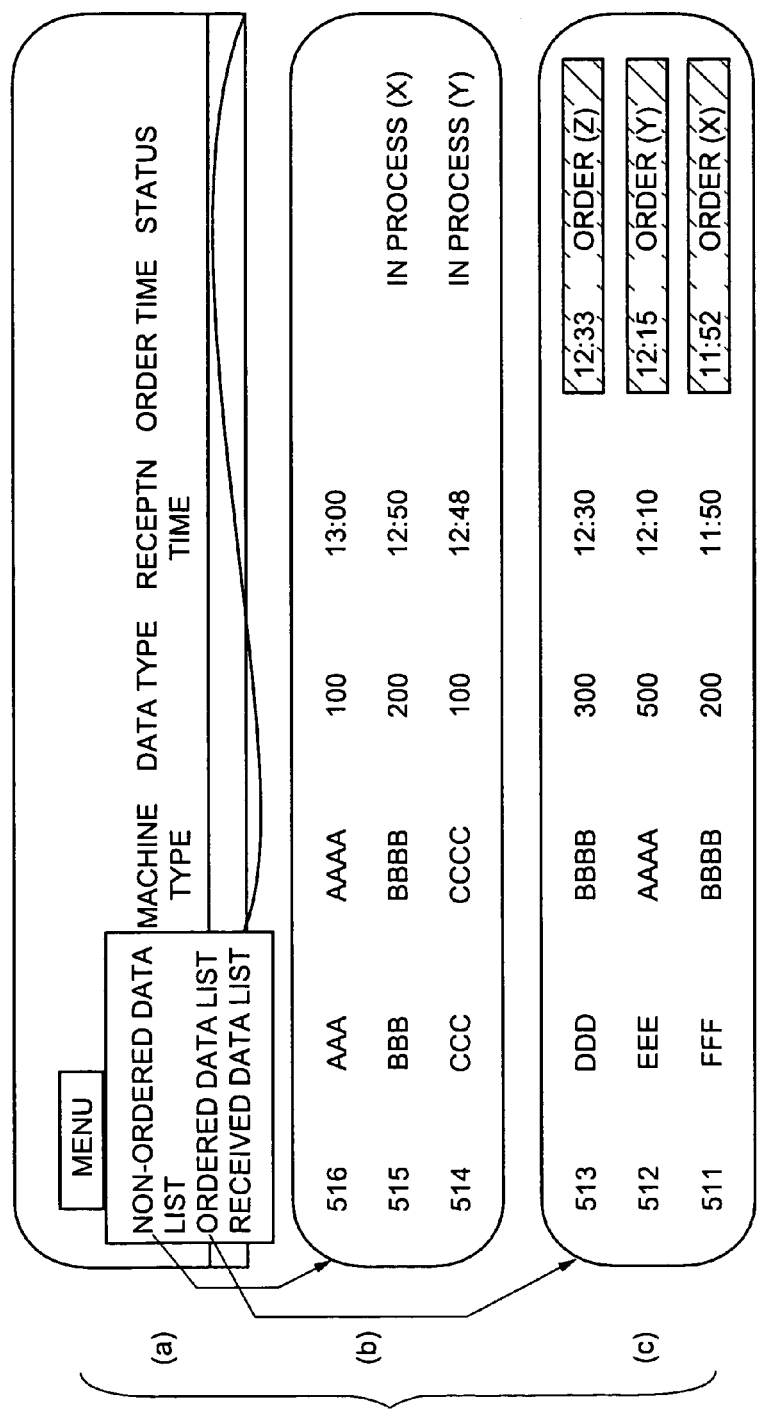
FIG. 27 is a diagram of a message reception window of the display device of FIG. 17 when a menu button is depressed in the condition shown in FIG. 26.

(8) When a "MENU" key in the message reception window of FIG. 26 is depressed, a sub-window which includes a non-ordered data list, an ordered data list and a received data list, as indicated by (a) in FIG. 27, appears on the display device 112. When the non-ordered data list of the sub-window is designated, a sub-window which includes a list of non-ordered records, as indicated by (b) in FIG. 27, appears on the display device 112. When the ordered data list of the sub-window is designated, a sub-window which includes a list of service-person ordered records, as indicated by (c) in FIG. 27, appears on the display device 112.

(9) When a process completion flag is set to an "in process" record of the message reception window by the operator of the computer 111, the computer 111 deletes the corresponding record of the data files of the database 122 by setting the process completion flag. Hence, the record disappears from the message reception window on the display device 112.

(10) When an action start flag is set to an "order" record of the message reception window by the operator of the computer 111, the computer 111 updates the corresponding record of the data files of the database 122 by setting the action start flag therein. Hence, the indication "order" of the record is changed to the indication "action start" in the related record of the message reception window on the display device 112.

(11) When a process completion flag is set to an "action start" record of the message reception window by the operator of the computer 111, the computer 111 deletes the corresponding record of the data files of the database 122 by setting the process completion flag. Hence, the record disappears from the message reception window on the display device 112.

Figure 28:
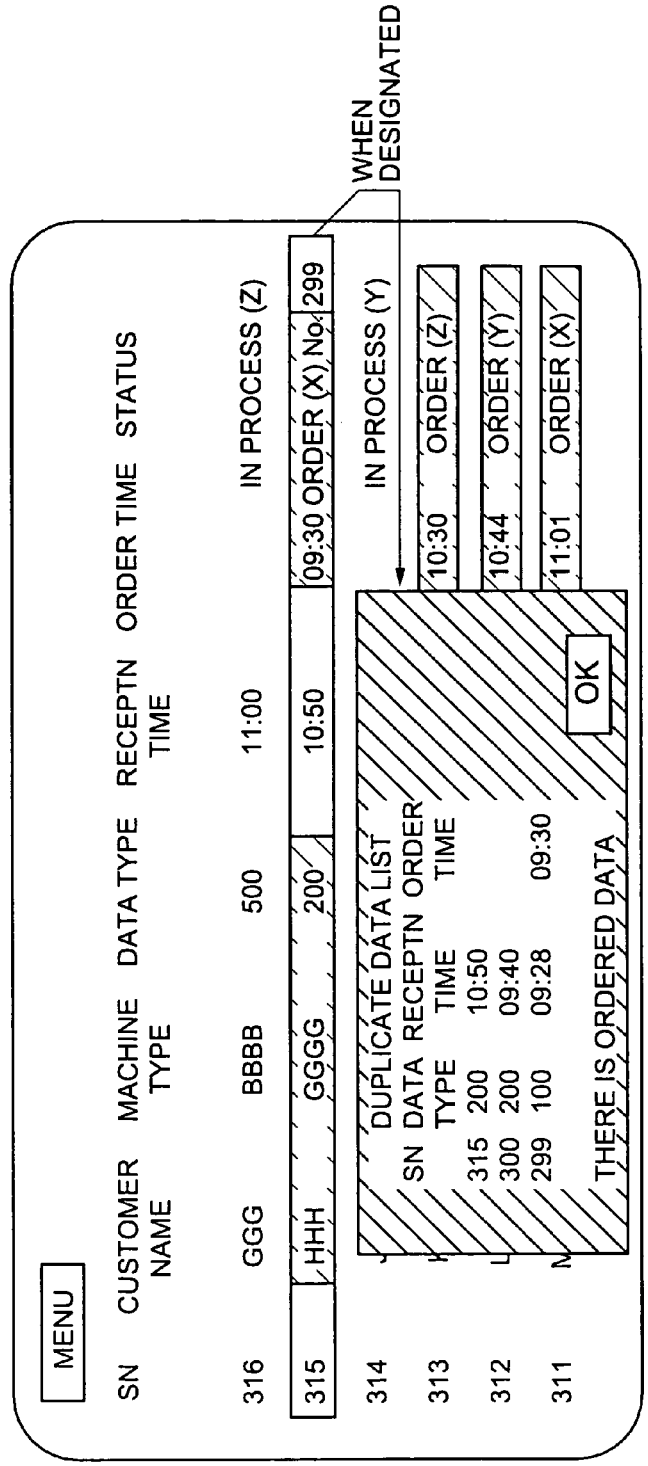
FIG. 28 is a diagram of a message reception window of the display device of FIG. 17 when one record in the received messages is designated.

When displaying the message reception window on the display device 112, there is a case in which a few duplicate records correspond to different messages that are transmitted by the same image forming device. As shown in FIG. 28, in such a case, only one of the duplicate records is displayed in the message reception window on the display device 112, together with the indication of the sequence number (S.N.) for another duplicate record. When the record with the S.N. indication is designated by the operator of the computer 111, the computer 111 enables a sub-window, which includes a list of duplicate records with the respective sequence numbers as shown in FIG. 28, to appear on the display device 112.

Next, a description will be provided of a usage data reception operation of the image forming device management system of the present invention.

In the image forming device management system of the present invention, the center system 6 receives, on a normal message date for each of the respective image forming devices, a usage data of a corresponding one of the image forming devices via the PSTN 8 by using a call sent by the data communication device 7 or a call sent by the center system 6. The center system 6 automatically issues a billing of a usage charge of the corresponding one of the image forming devices based on the usage data received by the center system 6.

In a conventional image forming device management system, each of the respective image forming devices usually transmits, on a monthly deadline date, the usage data from the data communication device to the center system via the PSTN. However, during long holidays (e.g., summer holidays) of the customer system, all the image forming devices of the customer system are often turned off for the purpose of economy and safety of the use. In such a case, the data communication device that connects the image forming devices to the PSTN is also turned off, and the transmission of the usage data of that month to the center system cannot be performed by the customer system. Even if the sales or service person is delivered from the center system to the customer system, the person never collects the usage data of the image forming device due to the off state of the customer system.

Further, in the conventional image forming device management system, the center system is sometimes turned off during long holidays of the center system or due to the system maintenance. In such a case, the reception of the usage data from the customer system cannot be achieved by the center system. The customer system sends a call to the center system at several times, in order to transmit the usage data to the center system, but the center system does not acknowledge the call in response due to the off state of the center system. The connection between the customer system and the center system via the telephone network is not established in such a case, and a communication error takes place. As the center system is not operating in such a case, it is impossible to request the sales or service person to visit the customer system. The data communication device cannot perform the transmission of the usage data of that month to the center system. Hence, the center system cannot achieve the reception of the usage data of that month from the customer system.

The image forming device management system of the present embodiment is configured to eliminate the above problem and to provide, with low cost and high reliability, reception of the usage data of the image forming devices at the center system.

In one preferred embodiment of the present invention, the data communication device 7 transmits, on an early message date that is earlier than a normal message date for a corresponding one of the image forming devices, the usage data of the corresponding one of the image forming devices to the center system 6 via the PSTN 8 by using a call sent by the data communication device 7. The center system 6 receives, on the early message date, the usage data of the corresponding one of the image forming devices that is transmitted by the data communication device 7 using the call sent by the data communication device 7. The center system 6 issues a billing of a usage charge of the corresponding one of the image forming devices to the data communication device 7 based on the received usage data.

In the above-preferred embodiment, the usage data of the corresponding one of the image forming devices is received not only on the normal message date for each of the respective image forming devices, but also on the early message date for each of the respective image forming devices. The image forming device management system of the above-preferred embodiment is effective in reducing the non-reception cases of the usage data of the image forming devices due to the off state of the customer system or the center system during the holidays, and in increasing the efficiency of the reception of the usage data of the image forming devices with a reduction of the cost of communications between the customer system and the center system.

In another preferred embodiment of the present invention, the data communication device 7 transmits, on an early message date that is earlier than a normal message date for a corresponding one of the image forming devices, the usage data of the corresponding one of the image forming devices to the center system 6 via the PSTN 8 by using a call sent by the center system 6. The center system 6 receives, on the early message date, the usage data of the corresponding one of the image forming devices that is transmitted by the data communication device 7 using the call sent by the center system 6. The center system 6 issues a billing of a usage charge of the corresponding one of the image forming devices to the data communication device 7 based on the received usage data.

In the above-preferred embodiment, the usage data of the corresponding one of the image forming devices is received not only on the normal message date for each of the respective image forming devices, but also on the early message date for each of the respective image forming devices. The image forming device management system of the above-preferred embodiment is effective in reducing the non-reception cases of the usage data of the image forming devices due to the off state of the customer system or the center system during the holidays, and in increasing the efficiency of the reception of the usage data of the image forming devices with a reduction of the cost of communications between the customer system and the center system.

In another preferred embodiment of the present invention, the data communication device 7 is configured to inhibit the transmission of the usage data of the corresponding one of the image forming devices only on the normal message date for the corresponding one of the image forming devices, which is subsequent to the early message date when the usage data is transmitted to the center system 6. The image forming device management system, including the data communication device of the above-preferred embodiment, is effective in reducing the cost of communications between the customer system and the center system.

In another preferred embodiment of the present invention, the center system 6 is configured to inhibit the reception of the usage data of the corresponding one of the image forming devices only on the normal message date for the corresponding one of the image forming devices, which is subsequent to the early message date when the usage data is received by the center system 6. The image forming device management system, including the center management device of the above-preferred embodiment, is effective in reducing the cost of communications between the customer system and the center system FIG. 29 shows a usage data file including a total copy count data for one image forming device (a copier), which is stored in the database 122 of the server 120 of FIG. 18.

In the usage data file of FIG. 29, the machine type and ID of No. 1 item indicate a machine type and identifier of a specific one of the plurality of image forming devices. The machine type and ID is used as the key that provides a relationship between the usage data file of FIG. 29 and the other data files of FIG. 19 through FIG. 22.

In the usage data file of FIG. 29, the total copy counts of the No. 2 to No. 5 items indicate respective total copy counts that are received from the image forming device in the current month. The total copy counts of the No. 6 to No. 9 items indicate respective total copy counts that are received from the image forming device in the previous month. The total copy counts of the No. 10 to No. 13 items indicate respective average total copy counts of those having been received.

FIG. 30 shows a normal message reception file that is stored in the database 122 of FIG. 18. In the normal message reception file of FIG. 30, the "CALL BY DCD" column indicates whether the center system 6 receives the usage data (the total copy count) of the image forming device from the data communication device 7 by using a call sent by the data communication device 7.

FIG. 31 shows an early message reception file created based on the normal message reception file of FIG. 30. In the early message reception file of FIG. 31, the normal message date and the monthly deadline date are included in predetermined long holidays of the customer system or the center system.

FIG. 32 shows an early usage-data reception file created based on the early message reception file of FIG. 31. The early usage-data reception file of FIG. 32 is created based on the early message reception file of FIG. 31 when an early usage data reception process is performed by the center system 6. See the flowchart of FIG. 35 and a corresponding description for the early usage data reception process.

FIG. 33A shows an example of a center-system holiday schedule and FIG. 33B shows an example of a customer holiday schedule. In the examples of these holiday data, the center system is in the off state during the holiday period between August 8 and August 16, and the customer system is in the off state during the holiday period between August 8 and August 23.

Figure 34:
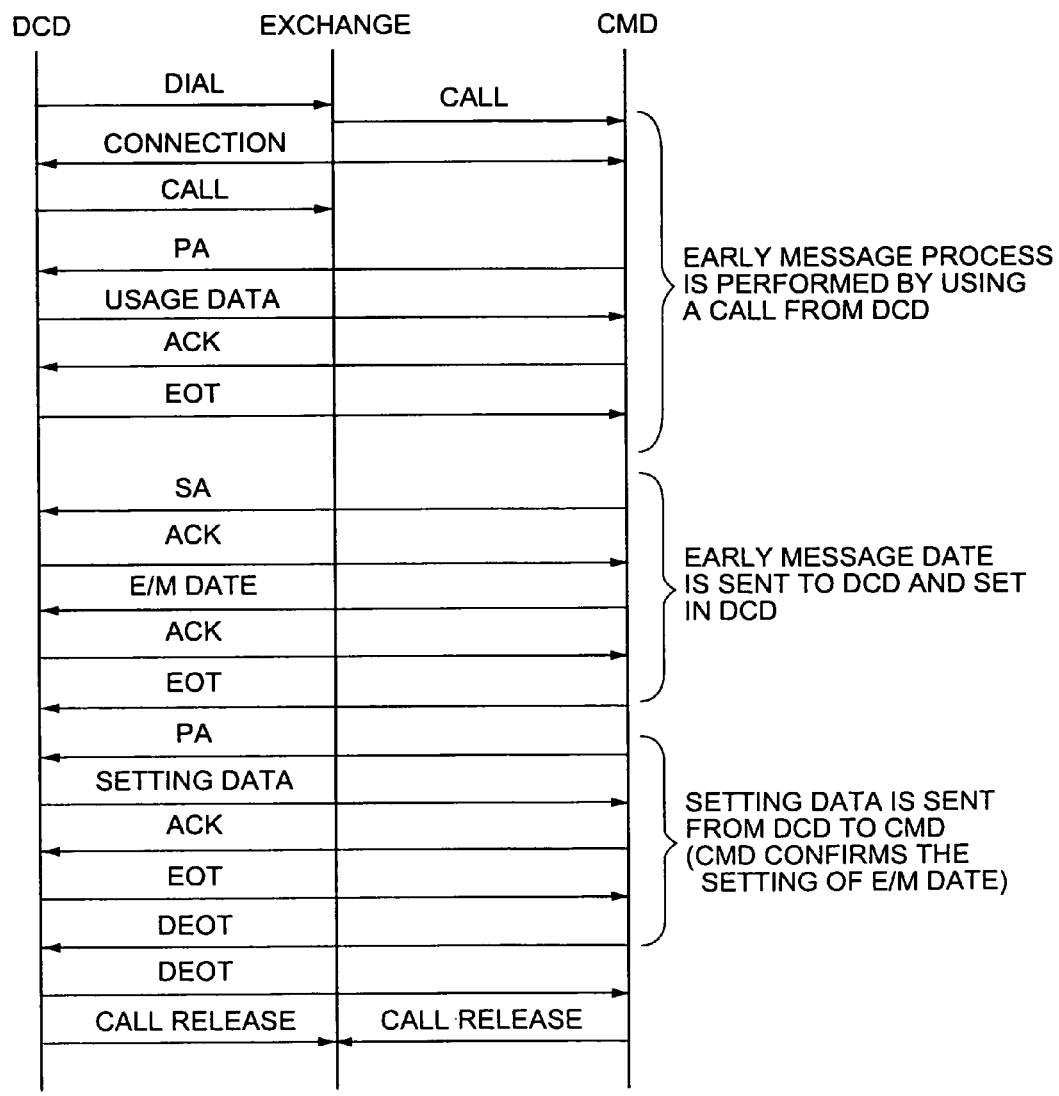
FIG. 34 is a diagram for explaining communication sequences between the data communication device and the center management device when a usage data reception process is performed by the image forming device management system of the present embodiment.

FIG. 34 shows communication sequences between the data communication device (DCD) and the center management device (CMD) when a usage data reception process is performed by the image forming device management system of the present embodiment.

An operation of the image forming device management system of the present embodiment will now be explained.

In the present embodiment, the operator of the computer 111 of one of the clients 110 in the center system 6 inputs the monthly deadline date and the normal message date for each of the image forming devices by using the keyboard/mouse 113. The computer 111 at this time creates the normal message reception file of FIG. 30 based on the input data, and stores the normal message reception file into the database 122.

When the center-system holiday data and the customer holiday data shown in FIG. 33A and FIG. 33B are input by the operator of the computer 111, the computer 111 creates the early message reception file of FIG. 31 based on the input data and the normal message reception file of the database 122, and stores the early message reception file into the database 122. See the flowchart of FIG. 44 and a corresponding description for the setting of the early message date.

Figure 35:
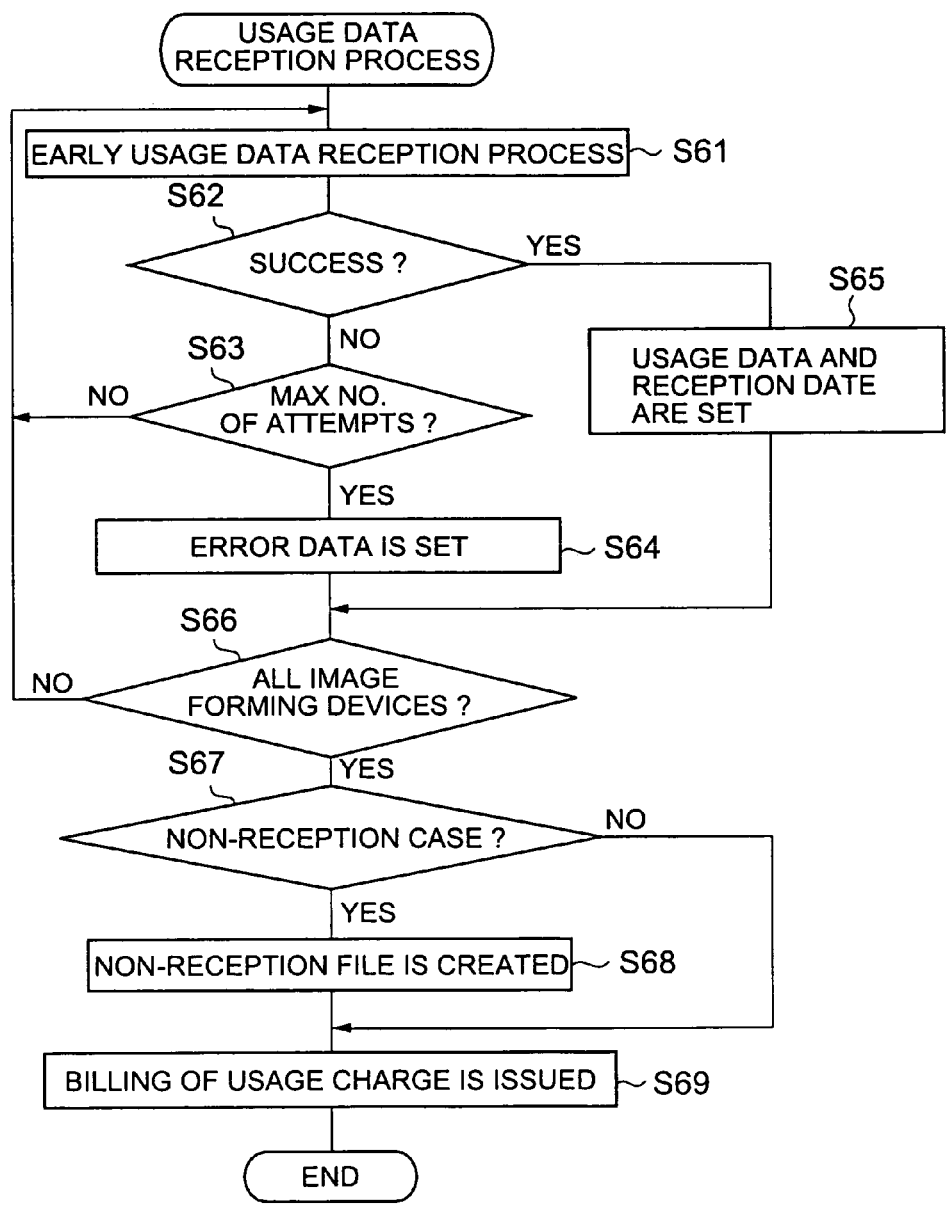
FIG. 35 is a flowchart for explaining a usage data reception process executed by the center management device of the image forming device management system of the present embodiment.

Further, the computer 111 creates the early usage-data reception file of FIG. 32 based on the early message reception file of FIG. 31 when the early usage data reception process of FIG. 35 is performed. The computer 111 stores the early usage-data reception file into the database 122.

As shown in FIG. 34, when the early usage data reception process is successfully performed by using a call sent to the center management device CMD (the computer 111) via the PBX 102 by the data communication device DCD, the center management device CMD (the computer 111) sets the usage data of the corresponding one of the image forming devices and the reception date in the corresponding areas of the early message reception file of the database 122. Further, the center management device CMD transmits the early message date to the data communication device DCD, so that the early message date is set in the data communication device DCD.

After the setting of the early message date in the data communication device DCD is completed, the data communication device DCD transmits the setting data back to the center management device CMD, so that the center management device CMD confirms that the setting of the early message date is correctly performed by comparison of the received setting data and the transmitted early message date.

Each time the setting of the early message date for one image forming device is completed, the center management device CMD (the computer 111) sets an early reception flag "TAG" to one in the corresponding area of the early usage data reception file of the database 122. A change of the early message date in the center management device CMD is inhibited until the early reception flag TAG is reset to zero.

In the above embodiment of FIG. 34, the early usage data reception process is performed by using a call sent to the center management device CMD by the data communication device DCD. However, the present invention is not limited to this embodiment. Alternatively, the early usage data reception process may be performed by using a call sent to the data communication device DCD by the center management device CMD.

FIG. 35 shows a usage data reception process executed by the center management device of the image forming device management system of the present embodiment.

In the present embodiment, when the customer holiday data and the center-system holiday data are input (and the early message process should be performed), the center system 6 (the computer 111 of a corresponding one of the clients 110) creates the early usage-data reception file and stores it in the database 122, as described above. Specifically, the center system 6 writes at least the early message date to a corresponding area of the early usage data reception file of the database 122.

Further, in the present embodiment, the center system 6 transmits the early message date for a corresponding one of the image forming devices, read from the early usage data reception file of the database 122, to the data communication device 7 via the PSTN 8, so that the early message date is set in the data communication device 7. Each time the setting of the early message date for one image forming device is completed, the center system 6 sets the early reception flag "TAG" to one in the corresponding area of the early usage data reception file of the database 122. A change of the early message date in the center system 6 is inhibited until the early reception flag TAG is reset to zero.

After the above setting of the early message date for all the image forming devices is completed, the computer 111 of the center system 6 starts execution of the early usage-data reception process of FIG. 35 when the current month-and-day number (or the hour and minute number) of the internal clock matches with the month-and-day number (or the hour and minute number) of the early message date for a corresponding one of the image forming devices.

As shown in FIG. 35, the computer 111 at step S61 performs the early usage data reception process in accordance with the early usage data reception file of the database 122, in which the usage data (the total copy count) of the corresponding one of the image forming devices, transmitted by the data communication device 7 via the PSTN 8, is received at the center system 6 by using either a call sent by the center system 6 or a call sent by the data communication device 7.

The computer 111 at step S62 determines whether the early usage data reception process is successfully performed in the step S62. When the result of the step S62 is affirmative, the computer 111 at step S65 sets the received usage data and the reception date in the corresponding areas of the early usage data reception file of the database 122. After the step S65 is performed, the computer 111 at step S66 determines whether the setting of the usage data for all the image forming devices is completed. When the result of the step S66 is negative, the control of the computer 111 is returned to the step S61.

When the result of the step S62 is negative, the computer 111 at step S63 determines whether a maximum number of attempts to perform the early usage data reception process is reached. When the result of the step S62 is affirmative, the computer 111 at step S64 sets an error data in the corresponding area of the early usage data reception file of the database 122. After the step S64 is performed, the control of the computer 111 is transferred to the step S66. On the other hand, when the result of the step S62 is negative, the control of the computer 111 is returned to the step S61.

The error data of the early usage data reception file is generated when an error occurs during the early usage data reception process executed by the center system 6 with respect to the data communication device 7 or the corresponding one of the image forming devices. The causes of the error at this time are, for example, (1) Disconnection of the data communication device 7 from the PSTN 8.

(2) A change of the phone number of the data communication device 7 to a new one (this is found from an announcement sent by the PSTN 8).

(3) A change of the location of the data communication device 7 to a new one.

(4) Disconnection of the image forming device from the data communication device 7.

(5) The off state of the image forming device (the power switch is turned off).

When the result of the step S66 is affirmative, the computer 111 at step S67 determines whether there are non-reception cases of the usage data (the total copy count). When the result of the step S67 is affirmative, the computer 111 at step S68 creates a non-reception file including the machine type and ID of the related image forming device and the error data related to the usage data, and stores it in the database 122 of the server 120. For example, in the step S68, the non-reception file of the database 122 may be printed out by using the printer 114. By using the printout sheet, the operator of the computer 111 may request a sales or service person to receive the usage data of the image forming devices in the non-reception cases by visiting the customer system.

When the result of the step S67 is negative, or after the step S68 is performed, the computer 111 at step S69 issues a billing of a usage charge of a corresponding one of the image forming devices based on the received usage data. For example, in the step S69, the billing of the usage charge may be printed out by using the printer 114. After the step S69 is performed, the computer 111 terminates the usage data reception process of FIG. 35.

In the above-described embodiment, the usage data of the corresponding one of the image forming devices is transmitted to the center management device not only on the normal message date for each of the respective image forming devices, but also on the early message date for each of the respective image forming devices. The image forming device management system, including the center management device of the above-described embodiment, is effective in reducing the non-reception cases of the usage data of the image forming devices due to the off state of the customer system or the center system during the holidays, and in increasing the efficiency of the reception of the usage data of the image forming devices with a reduction of the cost of communications between the customer system and the center system.

FIG. 37 shows the data format of a text data that is transmitted from the center system 6 to the data communication device 7. FIG. 39 shows a detailed configuration of the text data that is transmitted to the data communication device 7.

As shown in FIG. 37, the data format of the text data is essentially the same as that shown in FIG. 10. In the image forming device management system of FIG. 2, the data communication device 7 stores the parameters of the text data in internal parameter areas of the data communication device 7 when the text data is received from the center system 6.

FIG. 38 shows the data format of an internal clock data of the data communication device 7, which will be described later. FIG. 40 shows a detailed configuration of the parameter areas of the data communication device 7 that store the received text data. As shown in FIG. 40, the parameter areas of the data communication device 7 correspond to the parameters of the text data of FIG. 39.

In the image forming device management system of FIG. 2, when the text data of FIG. 39 sent by the center system 6 is received, the data communication device 7 stores the parameters of the received text data in the parameter areas of the data communication device 7, as shown in FIG. 40.

In the parameter areas of FIG. 40, each of device codes 0 through 4 is a device number that indicates a specific one of the image forming devices 1 through 5, which are connected to the data communication device 7. For example, the device code 0 is a device number indicating the image forming device 1 among the image forming devices 1–5. As shown in FIG. 40, the data communication device 7 of the present embodiment is configured to store three kinds of the early message date (e.g., EARLY M DATE1, EARLY M DATE2, EARLY M DATE3) in the parameter areas thereof with respect to each of the respective device codes (the image forming devices 1 through 5). In the present embodiment, the three kinds of the early message date include a new-year holiday period, a May holiday period and a summer holiday period. Alternatively, in practical applications, a larger or smaller number of kinds of the early message date for each of the respective device codes may be stored in the data communication device 7 when the necessity arises.

In the data communication device 7 of the present embodiment, the early message date stored in the parameter areas thereof is indicated by a 4-digit month-and-day number. When it is not necessary to set the early message date for a certain device code in the data communication device 7, the early message date is indicated by "0000", which can be distinguished from a normal month-and-day number.

Figure 51:
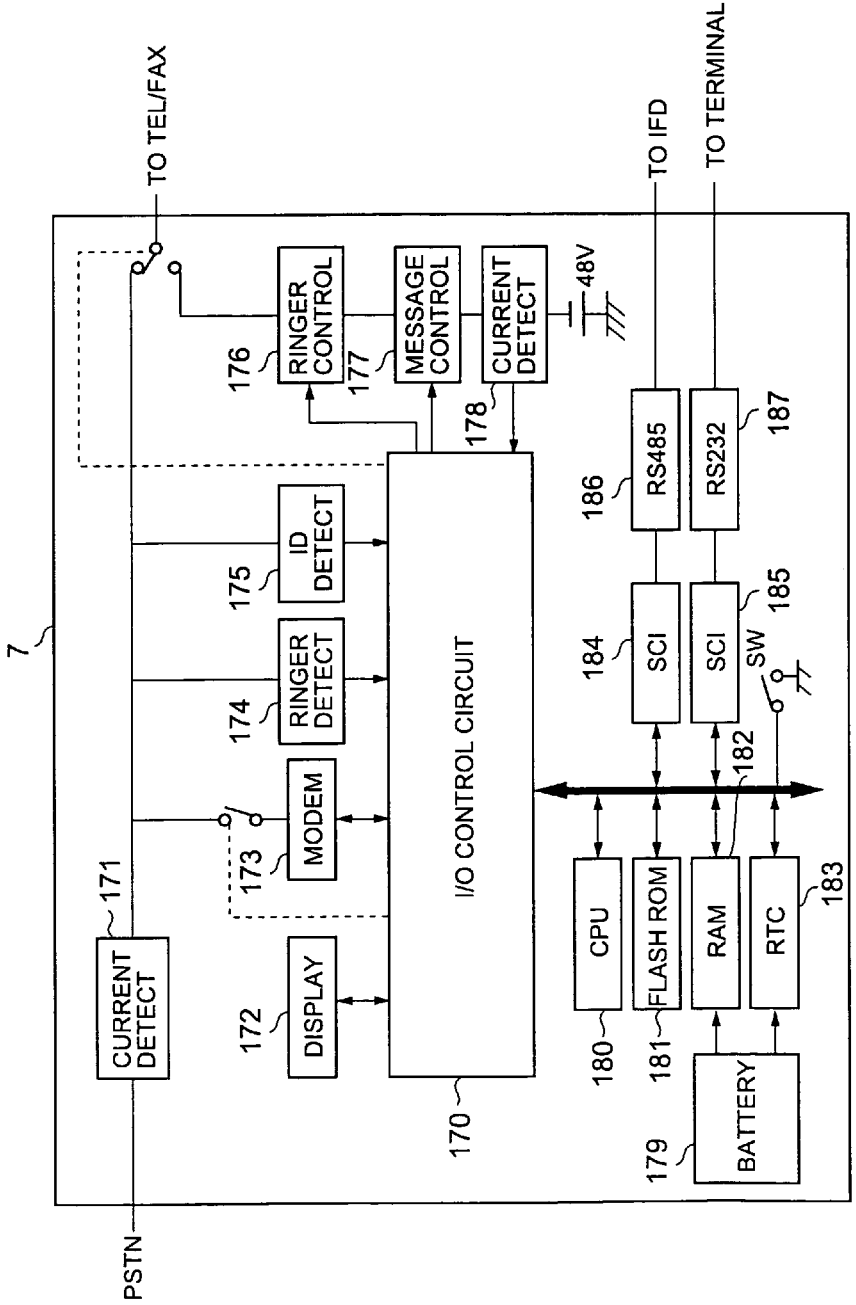
FIG. 51 is a block diagram of a detailed configuration of the data communication device in the image forming device management system of the present embodiment.

FIG. 51 shows a detailed configuration of the data communication device 7 in the image forming device management system of the present embodiment.

As shown in FIG. 51, the data communication device 7 of the present embodiment generally comprises an I/O control circuit 170, a current detection circuit 171, a display device 172, a modem 173, a ringer detection circuit 174, an ID detection circuit 175, a ringer control circuit 176, a message control circuit 177, a current detection circuit 178, a battery 179, a CPU 180, a flash ROM 181, a backup RAM 182, an RTC (real-time clock)183, SCIs (serial communication interfaces) 184 and 185, an RS-485 interface 186, and an RS-232 interface 187.

As previously described with respect to the configuration of FIG. 7, the data communication device 7 is divided into the three major portions: the control portion 41, the auto dialer portion 42 and the switching control portion 42. The control portion 41 controls the image forming devices 1 through 5, and controls the reception of a command signal transmitted by the center system 6 via the PSTN 8. The auto dialer portion 42 sends a call to the center system 6 in accordance with the messages sent by the image forming devices 1–5. The auto dialer portion 42 corresponds to the I/O control circuit 170 and the modem 173 in the configuration of FIG. 51. The switching control portion 43 carries out a switching control for connecting the control portion 41 to either an external telephone unit 44 or to the PSTN 8. The switching control portion 43 corresponds to the I/O control circuit 170, the current detection circuit 171, the ringer detection circuit 174, the ID detection circuit 175, the ringer control circuit 176, the message control circuit 177 and the current detection circuit 178 in the configuration of FIG. 51.

The control portion 41 is constituted by the flash ROM 181, the CPU 180, the backup RAM 182, the SCIs 184 and 185, the RS-485 interface 186, the RS-232 interface 187 and the RTC 183 in the configuration of FIG. 51. The backup RAM 182 provides a storage area for storing a text data transmitted between the data communication device 7 and the center system 6, the respective device codes and ID codes of the image forming devices 1–5, the phone number of the center system 6 (or the call destination), the maximum number of calls, the calling interval and the like. Further, the backup RAM 182 provides the internal parameter areas of the data communication device 7 for storing the parameters of the text data received from the center system 6 as shown in FIG. 40.

Figure 41:
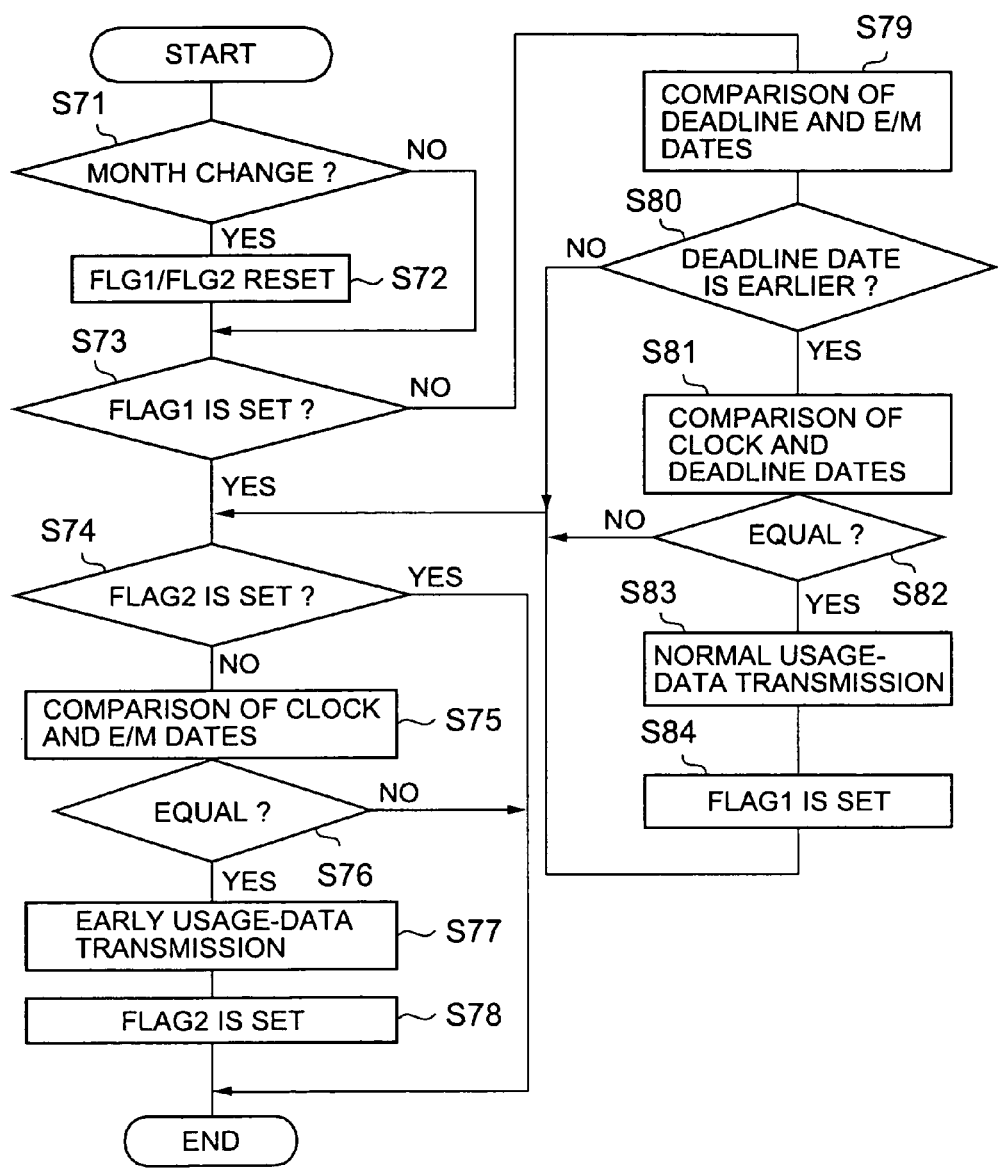
FIG. 41 is a flowchart for explaining a usage data transmission operation of one preferred embodiment of the image forming device management system when the early message date is set.

Next, FIG. 41 shows a usage data transmission operation of the image forming device management system of FIG. 2 when the early message date is set in the data communication device 7. In the present embodiment, the respective early message dates for the image forming devices 1–5 are set in the data communication device 7, which are the device-code-0 early message date1, . . . , the device-code-4 early message date3, as indicated in FIG. 40. In the following description, it is assumed that the device-code-0 deadline date is indicated by a 2-digit day number "20", the device-code-0 early message date1 is indicated by a 4-digit month-and-day number "1226", the device-code-0 early message date2 is indicated by a 4-digit month-and-day number "0430", and the device-code-0 early message date3 is indicated by a 4-digit month-and-day number "0809".

The usage data transmission process of FIG. 41 is executed by the CPU 180 of the data communication device 7 of FIG. 51. As shown in FIG. 41, the CPU 180 at step S71 determines whether the month has changed to a new month by reading the current month and day of the RTC 183. When the result of the step S71 is affirmative, the CPU 180 at step S72 resets both a first flag FLG1 and a second flag FLG2 to zero. The first flag FLG1 that is set to one indicates that a normal message process of the current month is completed. The second flag FLG2 that is set to one indicates that an early message process is completed. When the result of the step S71 is negative, the control of the CPU 180 is transferred to a next step S73 and the step S72 is not performed.

The CPU 180 at step S73 determines whether the first flag FLG1 is set to one. When the first flag FLG1 is set, the normal message process of the current month is completed. The CPU 180 in this case does not perform the normal message process.

The CPU 180 at step S74 determines whether the second flag FLG2 is set to one. When the second flag FLG2 is set, the early message process of the current month is completed. The CPU 180 in this case terminates the usage data transmission process of FIG. 41. On the other hand, when the second flag FLG2 is reset, the control of the CPU 180 is transferred to a next step S75.

When the result of the step S73 is negative, the first flag FLG1 is reset, and the CPU 180 at step S79 compares the deadline date and the early message date of the month that is the same as the month of the internal clock data. The CPU 180 at step S80 determines whether the deadline date is earlier than the early message date of the month corresponding to the internal clock data. When the result of the step S80 is affirmative, the early message date corresponds to an early message process of the next month, and it is necessary to perform both the normal message process and the early message process.

The CPU 180 at step S81 compares the deadline date and the date of the internal clock data. The CPU 180 at step S82 determines whether the deadline date is equal to the date corresponding to the internal clock data. When the result of the step S82 is affirmative, the CPU 180 at step S83 performs the normal message process (or the usage data transmission on the normal message date). The CPU 180 at step S84 sets the first flag FLG1 to one. After the step S84 is performed, the control of the CPU 180 is transferred to the step S74.

When the result of the step S80 is negative, or when the result of the step S82 is negative, the control of the CPU 180 is transferred to the step S74. The comparison of the deadline date and the internal clock date in the step S81 is performed for accurate detection of the normal message date.

The CPU 180 at step S75 compares the internal clock date and the early message date of the month that is the same as the month of the internal clock data. The CPU 180 at step S76 determines whether the internal clock date is equal to the early message date of the month corresponding to the internal clock data. When the result of the step S76 is affirmative, the CPU 180 at step S77 performs the early message process (or the usage data transmission on the early message date). Otherwise the CPU 180 terminates the usage data transmission process of FIG. 41.

After the step S77 is performed, the CPU 180 at step S78 sets the second flag FLG2 to one. After the step S78 is performed, the CPU 180 terminates the usage data transmission process of FIG. 41.

In the above-described embodiment, the usage data of the corresponding one of the image forming devices is transmitted to the center management device not only on the normal message date for each of the respective image forming devices, but also on the early message date for each of the respective image forming devices. The image forming device management system, including the data communication device of the above-described embodiment, is effective in reducing the non-reception cases of the usage data of the image forming devices due to the off state of the customer system or the center system during the holidays, and in increasing the efficiency of the reception of the usage data of the image forming devices with a reduction of the cost of communications between the customer system and the center system.

In the above usage data transmission process of FIG. 41, merely the comparison of the internal clock date and the normal message date and the comparison of the internal clock date and the early message date are performed. However, the usage data call time parameter can also be set in the parameter areas of the data communication device 7 of FIG. 40. Hence, the data communication device 7 may be configured to transmit the usage data of a corresponding one of the image forming devices 1–5 to the center system 6 when a current date and time reaches a predetermined message date and time by modifying the parameter areas of the data communication device 7 of FIG. 40.

Figure 42:
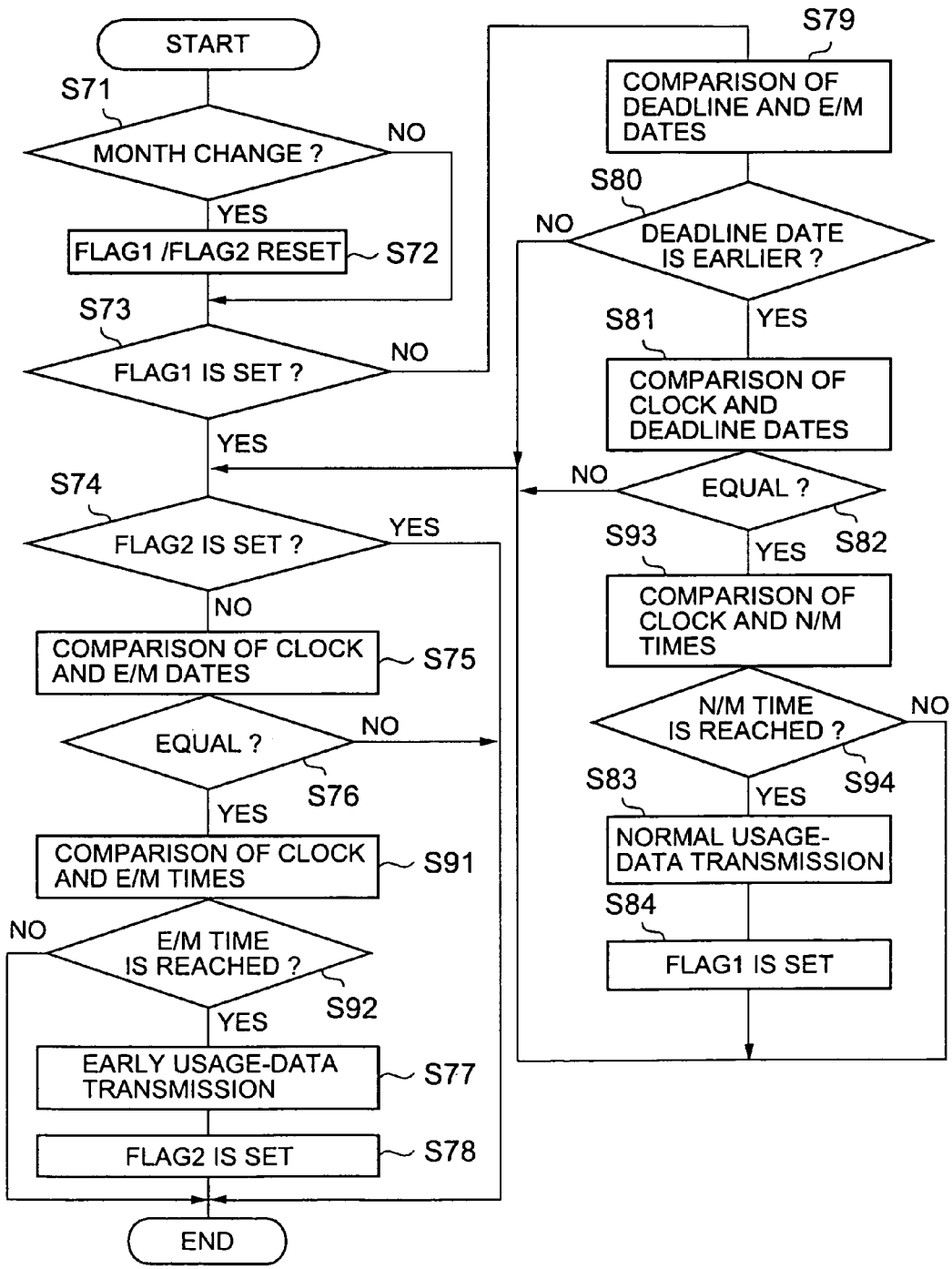
FIG. 42 is a flowchart for explaining a usage data transmission operation of one preferred embodiment of the image forming device management system when the early message date and time are set.

FIG. 42 shows a usage data transmission operation of the image forming device management system of FIG. 2 when the early message date and time are set in the data communication device 7. In FIG. 42, the steps which are essentially the same as corresponding steps in FIG. 41 are designated by the same reference numerals, and a description thereof will be omitted.

In the flowchart of FIG. 42, when the result of the step S82 is affirmative, the CPU 180 at step S93 compares the time of the internal clock data and a preset time of the normal message date in the modified parameter areas of the data communication device 7. The CPU 180 at step S94 determines whether the time of the internal clock data is equal to the preset time of the normal message data. When the result of the step S94 is affirmative, the CPU 180 performs the normal message process of the step S83 and the setting of the first flag FLG1 of the step S84. Otherwise the CPU 180 performs the step S74 without performing the steps S83 and S84.

Further, in the flowchart of FIG. 42, when the result of the step S76 is affirmative, the CPU 180 at step S91 compares the time of the internal clock data and a preset time of the early message date in the modified parameter areas of the data communication device 7. The CPU 180 at step S92 determines whether the time of the internal clock data is equal to the preset time of the early message date. When the result of the step S92 is affirmative, the CPU 180 performs the early message process of the step S77 and the setting of the second flag FLG2 of the step S78. Otherwise the CPU 180 terminates the process of FIG. 42 without performing the steps S77 and S78.

Similar to the previous embodiment of FIG. 41, in the above-described embodiment of FIG. 2, the usage data of the corresponding one of the image forming devices is transmitted to the center management device not only on the normal message date for each of the respective image forming devices, but also on the early message date for each of the respective image forming devices. The image forming device management system, including the data communication device of the above-described embodiment, is more effective in reducing the non-reception cases of the usage data of the image forming devices due to the off state of the customer system or the center system during the holidays, and in increasing the efficiency of the reception of the usage data of the image forming devices with a reduction of the cost of communications between the customer system and the center system.

Next, a description will be given of a setting of the early message data in the image forming device management system of the present embodiment which is performed by the center system 6, with reference to FIG. 43 and FIG. 44.

FIG. 43 shows an example of a holiday data in which customer holidays and center-system holidays are set. FIG. 44 is a flowchart for explaining an early message date setting process executed by the center system 6 of the image forming device management system of the present embodiment.

In the example of the holiday data of FIG. 43, three kinds of customer holiday data (HOLIDAY1, HOLIDAY2, HOLIDAY3) and three kinds of center-system holiday data (HOLIDAY1, HOLIDAY2, HOLIDAY3) are set. As described above, the data communication device 7 of the present embodiment is configured to store three kinds of the early message date in the parameter areas of the data communication device 7 with respect to each of the respective image forming devices 1 through 5. When the holiday data is set as in the example of FIG. 43, the early message date is set in the image forming device management system of the present embodiment by executing the early message date setting process of FIG. 44.

When setting the holiday data, an operator of the client 110 in the center system 6 of FIG. 17 inputs the machine type and ID of a corresponding one of the image forming devices 1–5 as well as a start date and an end date for each of the three kinds of customer holiday data on the data input window of the display device 112. Further, the operator inputs a start date and an end date for each of the three kinds of center-system holiday data on the data input window of the display device 112. After all the holiday data are input, the operator depresses an "execute" button (not shown) on the data input window of the display device 112. Then, the computer 111 of the client 110 starts execution of the early message date setting process of FIG. 44. As a result of the execution of the early message data setting process, an appropriate early message date is calculated and set in the image forming device management system.

In the following, a description will be given of the early message date setting process of FIG. 44 with respect to the holiday1 data only. It is readily understood that with respect to the holiday2 data and the holiday3 data, the early message date setting process may be formed in the same manner as in the process of the following description by reading out the holiday2 or holiday3 data, instead of the holiday1 data, from the setting holiday data (FIG. 43) of the center system 6.

Figure 44:
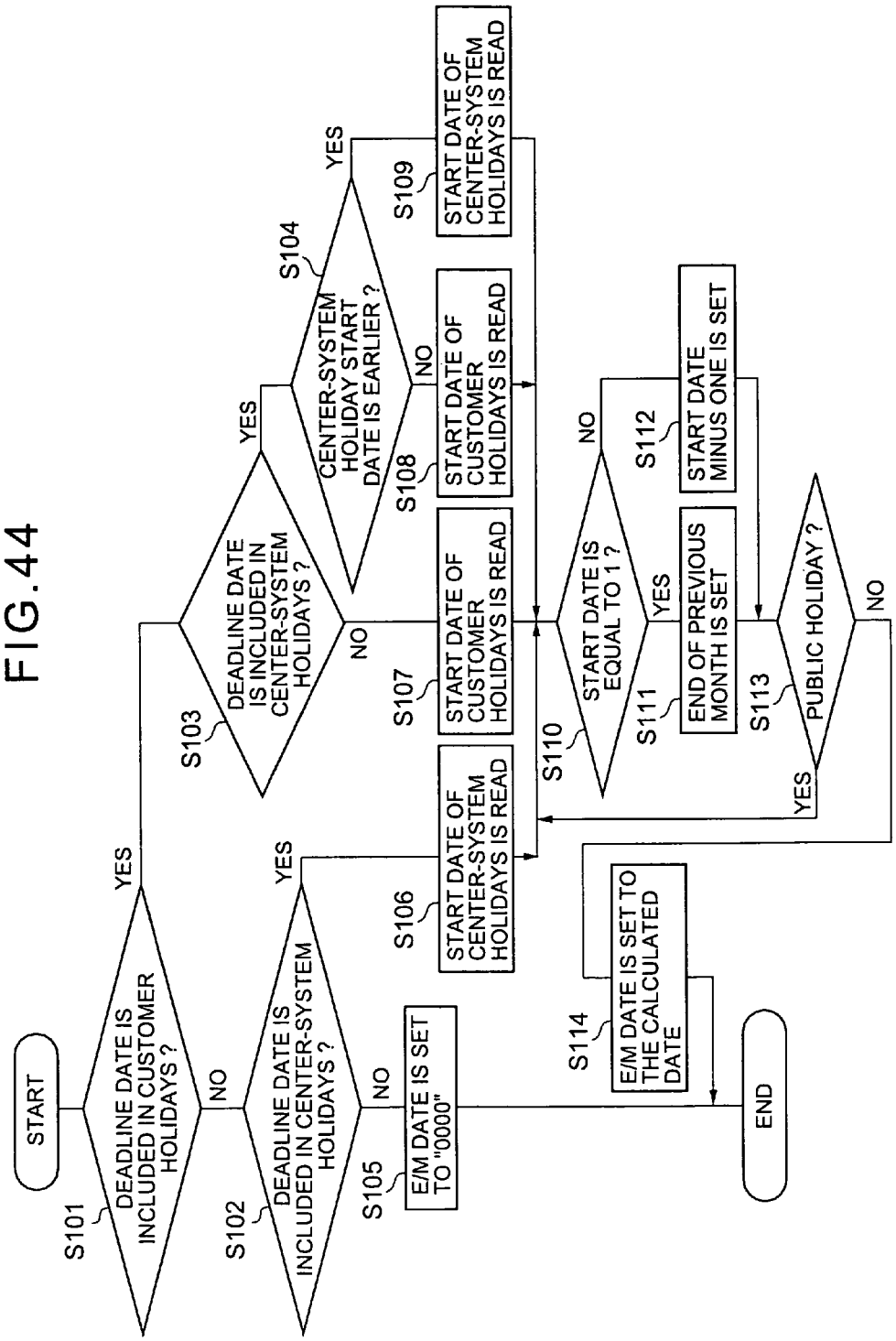
FIG. 44 is a flowchart for explaining an early message date setting process executed by the image forming device management system of the present embodiment.

When the early message date setting process of FIG. 44 starts, the computer 111 reads both the customer holiday data (or the holiday1 data and the deadline date) and the center-system holiday data (or the holiday1 data) from the setting holiday data (FIG. 43) of the center system 6. The computer 111 at step S101 determines whether the deadline date is included in the period between the start date and the end date of the customer holiday1 data.

When the result of the step S101 is negative, the calculation of the early message date is not needed. The computer 111 at step S102 determines whether the deadline date is included in the period between the start date and the end date of the center-system holiday1 data. When the result of the step S102 is negative, the execution of the early message process is not needed. The computer 111 at step S105 sets the early message date to "0000". After the step S105 is performed, the computer 111 terminates the early message date setting process of FIG. 44.

When the result of the step S101 is affirmative, the computer 111 at step S103 determines whether the deadline date is included in the period between the start date and the end date of the center-system holiday1 data. When the result of the step S103 is affirmative, the computer 111 at step S104 determines whether the start date of the center-system holiday1 date is earlier than the start date of the customer holiday1 data. When the result of the step S104 is negative, the computer 111 at step S108 reads out the start date of the customer holiday1 data. When the result of the step S104 is affirmative, the computer 111 at step S109 reads out the start date of the center-system holiday1 data. After the step S108 or S109 is performed, the control of the computer 111 is transferred to a next step S110.

When the result of the step S103 is negative, the deadline date is included only in the customer holiday1 period. The computer 111 at step S107 reads out the start date of the customer holiday1 data. After the step S107 is performed, the control of the computer 111 is transferred to the next step S110.

When the result of the step S102 is affirmative, the deadline date is included only in the center-system holiday1 period. The computer 111 at step S106 reads out the start date of the center-system holiday1 data. After the step S106 is performed, the control of the computer 111 is transferred to the next step S110.

The image forming device management system of the present embodiment will be in the off state from the start date that is read out in any of the steps S106 through S109. It is necessary to set an early message date that is preceded by the read-out start date.

The computer 111 at step S110 determines whether the read-out start date is equal to 1. When the start date of the customer or center-system holidays is equal to the first day of the month, the computer 111 at step S111 determines the end date of the previous month as being the early message date candidate. When the result of the step S110 is negative, the computer 111 at step S112 determines the previous date that is equal to the read-out start date minus one, as being the early message date candidate.

The computer 111 at step S113 determines whether the early message date candidate is a public holiday (e.g., Sunday or a national holiday). When the result of the step S113 is affirmative, the control of the computer 111 is transferred to the above step S110. When the result of the step S113 is negative, the computer 111 at step S114 sets the calculated date (or the early message date candidate) in the center system 6 as being the early message date. After the step S114 is performed, the computer 111 terminates the process of FIG. 44.

In the above-described early message date setting process, the operator of the center system 6 is required to inquire the customer holiday data of a person in charge of the customer system by telephone or the like. This will be inconvenient to the person in charge of the customer system. The image forming device management system of the present embodiment may be configured so as to eliminate the problem. In such embodiment of the image forming device management system, a service person of the center system 6 visits the customer system and inputs the customer holiday data on a data input window of the display device of a corresponding one of the image forming devices 1–5. The data communication device 7 receives the customer holiday data from that image forming device, and transmits the customer holiday data to the center system 6 via the PSTN 8.

Next, a description will be given of the above-mentioned early message date setting process with reference to FIG. 45 through FIG. 47.

Figure 45:
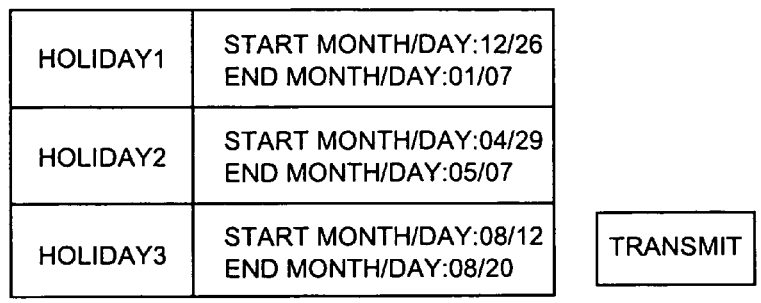
FIG. 45 is a diagram of a holiday data input window of a display device in the image forming device.

FIG. 45 shows a holiday data input window of a display device in the image forming device. When a set of certain keys in the operation/display portion of the image forming device of FIG. 5 are depressed, the holiday data input window shown in FIG. 45 appears on the character display device 83.

Figure 46:
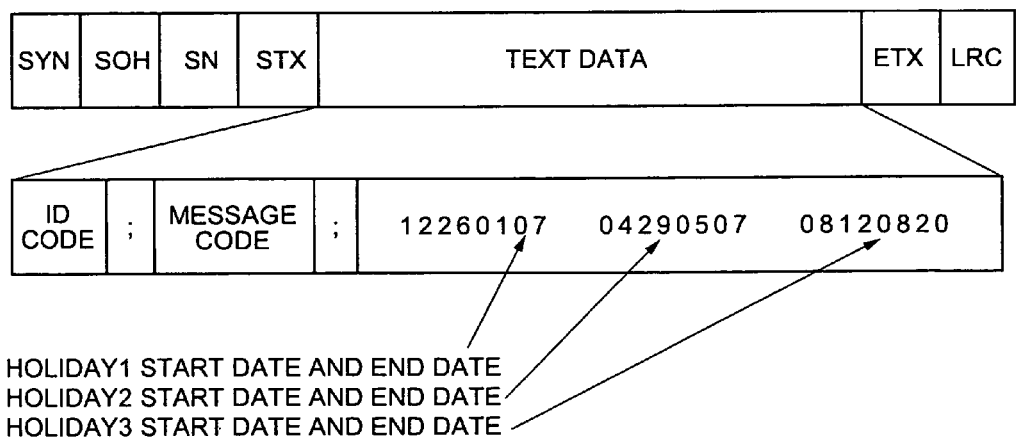
FIG. 46 is a diagram of the data format of a customer holiday data that is transmitted from the data communication device to the center management device.

FIG. 46 shows the data format of a customer holiday data that is transmitted from the data communication device 7 to the center management device (the computer 111) of the center system 6. FIG. 47 shows communication sequences between the image forming device (IFD), the data communication device (DCD) and the center management device (CMD) when the early message date setting process of the present embodiment is performed.

When setting the customer holiday data, the operator of a corresponding one of the image forming devices 1–5 inputs a start date and an end date for each of the three kinds (the holiday1, the holiday2, the holiday3) of customer holiday data on the customer holiday data input window of the character display device 83, as shown in FIG. 45. After all the holiday data are input, the operator depresses a "transmit" key on the customer holiday data input window of the character display device 83.

Figure 47:
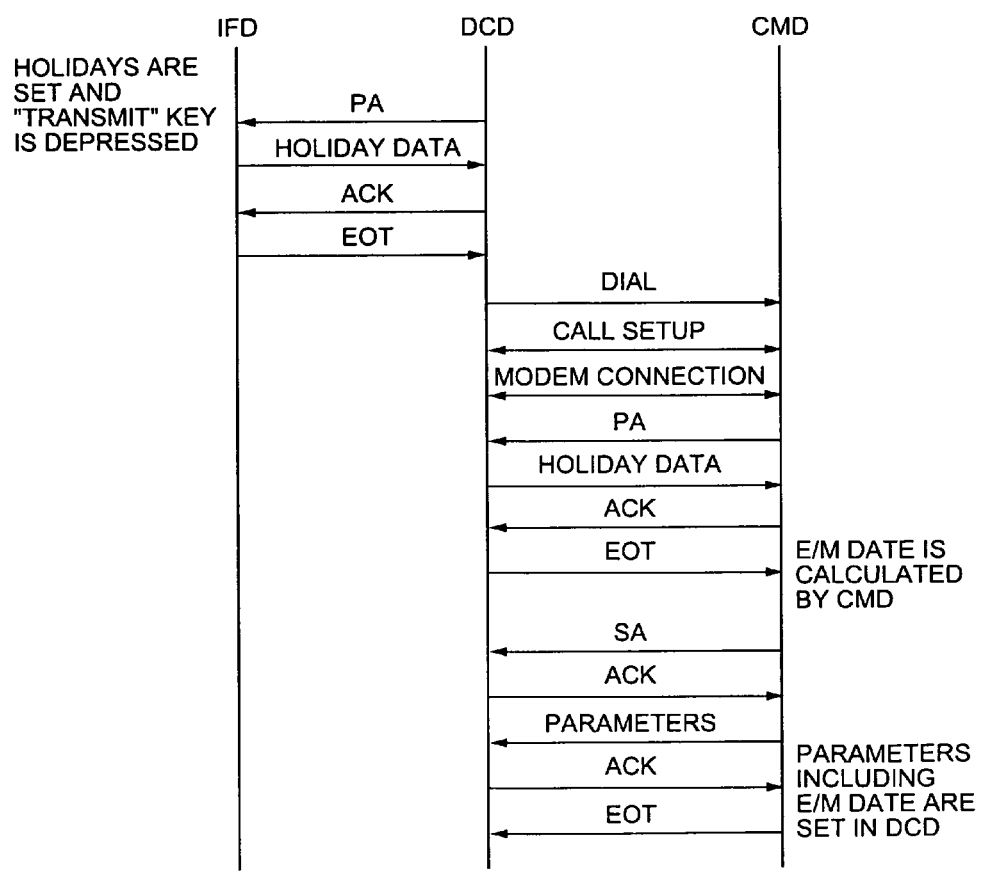
FIG. 47 is a diagram for explaining communication sequences between the image forming device, the data communication device and the center management device when an early message date setting process is performed.

As shown in FIG. 47, the holiday data is sent from the image forming device IFD to the data communication device DCD, and the data communication device DCD transmits the holiday data to the center management device CMD (or the computer 111 of the client 110 in the center system 6) via the PSTN 8. The center management device CMD calculates the early message date based on the received holiday data, by execution of the early message date setting process of FIG. 44. As a result of the execution of the early message data setting process, an appropriate early message date is calculated and set in the image forming device management system. The center management device CMD transmits the parameters including the early message date, to the data communication device DCD via the PSTN 8, so that the parameters including the early message date are set in the data communication device DCD.

In the above-described embodiment, the usage data of the corresponding one of the image forming devices is transmitted to the center management device not only on the normal message date for each of the respective image forming devices, but also on the early message date for each of the respective image forming devices. The image forming device management system, including the data communication device of the above-described embodiment, is effective in reducing the non-reception cases of the usage data of the image forming devices due to the off state of the customer system or the center system during the holidays, and in increasing the efficiency of the reception of the usage data of the image forming devices with a reduction of the cost of communications between the customer system and the center system.

As shown in FIG. 46, the data format of the customer holiday data is essentially the same as that shown in FIG. 10. A description of the data format of the customer holiday data will be omitted. However, in the above-described embodiment, a predefined code that indicates a specific process of the transmission of the holiday data from the data communication device 7 to the center system 6 is set in the message code of the text data.

Further, in order to eliminate the above problem, the image forming device management system of the present embodiment may be configured such that a service person of the center system 6 visits the customer system and inputs the customer holiday data on the data input window of the display device of a corresponding one of the image forming devices 1–5, and that the data communication device 7 receives the customer holiday data from that image forming device, calculates an appropriate early message date based on the holiday data, and transmits the early message date to the center system 6 via the PSTN 8, so that the early message date is set in the center system 6. A description will now be given of the above-mentioned early message date setting process with reference to FIG. 48 through FIG. 50.

Similar to the previous example of FIG. 45, when a set of certain keys in the operation/display portion of the image forming device of FIG. 5 are depressed, the holiday data input window of FIG. 45 appears on the character display device 83. In the present example, it is necessary that a center-system holiday data be transmitted, in advance, from the center system 6 to the data communication device 7.

Figure 48:
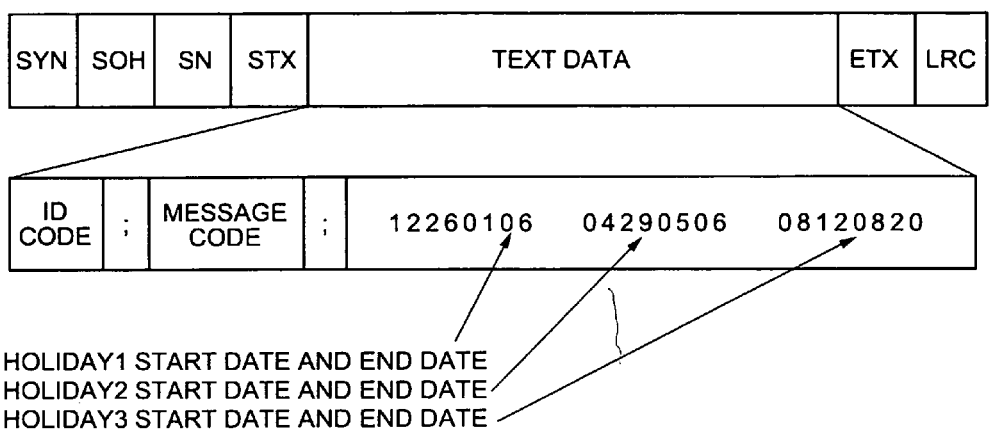
FIG. 48 is a diagram of the data format of a center-system holiday data that is transmitted from the center management device to the data communication device.

FIG. 48 shows the data format of a center-system holiday data that is transmitted from the center management device (the computer 111) to the data communication device 7. FIG. 49 shows a detailed configuration of the parameter areas of the data communication device 7 that store the center-system holiday data of FIG. 48 that is received from the center management device (the computer 111) at the data communication device 7.

Figure 50:
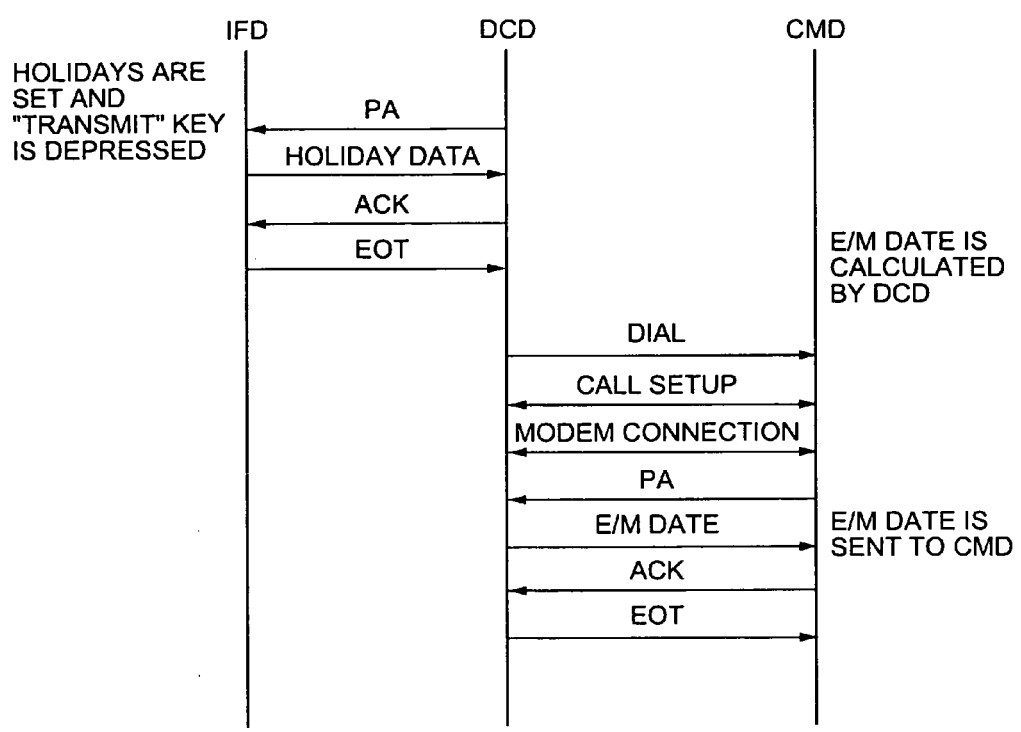
FIG. 50 is a diagram for explaining communication sequences between the image forming device, the data communication device and the center management device when the early message date setting process is performed.

FIG. 50 shows communication sequences between the image forming device (IFD), the data communication device (DCD) and the center management device (CMD) when the early message date setting process of the present embodiment is performed.

When setting the customer holiday data, the operator of a corresponding one of the image forming devices 1–5 inputs a start date and an end date for each of the three kinds (the holiday1, the holiday2, the holiday3) of customer holiday data on the customer holiday data input window of the character display device 83, as shown in FIG. 45. After all the holiday data are input, the operator depresses the "transmit" key on the customer holiday data input window of the character display device 83.

As shown in FIG. 50, the customer holiday data is sent from the image forming device IFD to the data communication device DCD, and the data communication device DCD calculates the early message date based on the received holiday data and based on the preset center-system holiday data, by execution of the early message date setting process of FIG. 44. As a result of the execution of the early message data setting process, an appropriate early message date is calculated by the data communication device DCD and set in the internal parameter areas of the data communication device DCD. The data communication device DCD transmits the parameters including the early message date to the center management device CMD (or the computer 111 of the client 110 in the center system 6) via the PSTN 8. The center management device CMD sets the received parameters including the early message date in the backup RAM of the computer 111.

Further, in the above-described embodiment, the usage data of the corresponding one of the image forming devices is transmitted to the center management device not only on the normal message date for each of the respective image forming devices, but also on the early message date for each of the respective image forming devices. The image forming device management system, including the data communication device of the above-described embodiment, is effective in reducing the non-reception cases of the usage data of the image forming devices due to the off state of the customer system or the center system during the holidays, and in increasing the efficiency of the reception of the usage data of the image forming devices with a reduction of the cost of communications between the customer system and the center system.

As shown in FIG. 48, the data format of the customer holiday data is essentially the same as that shown in FIG. 10. A description of the data format of the center-system holiday data will be omitted. However, in the above-described embodiment, a predefined code that indicates a specific process of the transmission of the center-system holiday data from the center system 6 to the data communication device 7 is set in the message code of the text data of FIG. 48.

In the image forming device management system of the present embodiment, when the usage data of a corresponding one of the image forming devices 1–5 is received on an early message date, the center management device compares that early message date with the early message date in the parameters stored in the center management device itself. When the former date matches with the latter date, the center management device considers the received usage data as a valid one.

The present invention is not limited to the above-described embodiments, and variations and modifications may be made without departing from the scope of the present invention.

Further, the present invention is based on Japanese priority application No. 11-255789, filed on Sep. 9, 1999, and Japanese priority application No. 2000-266103, filed on Sep. 1, 2000, the entire contents of which are hereby incorporated by reference.

What is claimed is:

1. An image forming device management system in which a customer system and a center system are connected by a network, the customer system including a data communication device connecting a plurality of image forming devices to the network, the center system including a center management device connected to the network, the data communication device comprising:

first message means for transmitting, on a normal message date for each of the respective image forming devices, a usage data of a corresponding one of the image forming devices to the center management device via the network by using a call sent by the data communication device; and second message means for transmitting, on an early message date that is earlier than the normal message date for a corresponding one of the image forming devices, a usage data of the corresponding one of the image forming devices to the center management device via the network by using a call sent by the data communication device, and the center management device comprising:

first message reception means for receiving, on the normal message date for each of the respective image forming devices, the usage data of the corresponding one of the image forming devices that is transmitted by the first message means using the call sent by the data communication device;

second message reception means for receiving, on the early message date for each of the respective image forming devices, the usage data of the corresponding one of the image forming devices that is transmitted by the second message means using the call sent by the data communication device;

remote management means for issuing a billing of a usage charge of the corresponding one of the image forming devices based on the usage data received by either the first message reception means or the second message reception means;

input means for inputting a holiday data of the center system and the customer system;

calculation means for calculating an early message date for a corresponding one of the image forming devices based on the holiday data, input by the input means, and based on the normal message date for the corresponding one of the image forming devices; and early message date setting means for transmitting the early message date, calculated by the calculation means, to the data communication device via the network, so that the calculated early message date is set in the data communication device.

2. The image forming device management system according to claim 1, wherein the early message date setting means transmits, on the normal message date for the corresponding one of the image forming devices, the early message date, calculated by the calculation means, to the data communication device via the network, so that the calculated early message date is set in the data communication device.

3. The image forming device management system according to claim 1, wherein the data communication device further comprises message inhibition means for inhibiting the transmission of the usage data of the corresponding one of the image forming devices by the first message means only on the normal message date for the corresponding one of the image forming devices, which is subsequent to the early message date when the usage data is transmitted to the center management device by the second message means.

4. The image forming device management system according to claim 1, wherein the normal message date is indicated by a 2-digit day number, and the early message date is indicated by a 4-digit month-and-day number.

5. The image forming device management system according to claim 1, wherein the normal message date is indicated by a 2-digit day number, and the early message date for each of the respective image forming devices is indicated by one of a plurality of 4-digit month-and-day numbers.

6. The image forming device management system according to claim 4, wherein the second message means transmits, by using the call sent by the data communication device, the usage data of the corresponding one of the image forming devices to the center management device when a current month-and-day number matches with a month-and-day number of the early message date for the corresponding one of the image forming devices.

7. An image forming device management system in which a customer system and a center system are connected by a network, the customer system including a data communication device connecting a plurality of image forming devices to the network, the center system including a center management device connected to the network, the data communication device comprising:

first message means for transmitting, on a normal message date for each of the respective image forming devices, a usage data of a corresponding one of the image forming devices to the center management device via the network by using a call sent by the center management device; and second message means for transmitting, on an early message date that is earlier than the normal message date for a corresponding one of the image forming devices, a usage data of the corresponding one of the image forming devices to the center management device via the network by using a call sent by the center management device, and the center management device comprising:

first message reception means for receiving, on the normal message date for each of the respective image forming devices, the usage data of the corresponding one of the image forming devices that is transmitted by the first message means using the call sent by the center management device;

second message reception means for receiving, on the early message date for each of the respective image forming devices, the usage data of the corresponding one of the image forming devices that is transmitted by the second message means using the call sent by the center management device;

remote management means for issuing a billing of a usage charge of the corresponding one of the image forming devices based on the usage data received by either the first message reception paeans or the second message reception means;

input means for inputting a holiday data of the center system and the customer system;

calculation means for calculating an early message date for a corresponding one of the image forming devices based on the holiday data, input by the input means, and based on the normal message date for the corresponding one of the image forming devices; and early message date setting means for transmitting the early message date, calculated by the calculation means, to the data communication device via the network, so that the calculated early message date is set in the data communication.

8. The image forming device management system according to claim 7, wherein the center management device further comprises message inhibition means for inhibiting the reception of the usage data of the corresponding one of the image forming devices by the first message reception means only on the normal message date for the corresponding one of the image forming devices, which is subsequent to the early message date when the usage data is received by the second message reception means.

9. The image forming device management system according to claim 7, wherein the normal message date is indicated by a 2-digit day number, and the early message date is indicated by a 4-digit month-and-day number.

10. The image forming device management system according to claim 7, wherein the normal message date is indicated by a 2-digit day number, and the early message date for each of the respective image forming devices is indicated by one of a plurality of 4-digit month-and-day numbers.

* * * * *